US012725770B2

(12) United States Patent
Grinfeld et al.

(10) Patent No.: US 12,725,770 B2
(45) Date of Patent: Sep. 1, 2026

(54) METHODS FOR PERFORMING CHARGE DETECTION MASS SPECTROMETRY WITH TEMPORAL RESOLUTION

(71) Applicants: Thermo Fisher Scientific (Bremen) GmbH, Bremen (DE); Thermo Finnigan LLC, San Jose, CA (US)

(72) Inventors: Dmitry Grinfeld, Bremen (DE); Michael W. Senko, Sunnyvale, CA (US); Ping F. Yip, Salem, MA (US)

(73) Assignees: Thermo Finnigan LLC, San Jose, CA (US); Thermo Fisher Scientific (Bremen) GmbH, Bremen (DE)

(*) Notice: Subject to any disclaimer, the term of this patent is extended or adjusted under 35 U.S.C. 154(b) by 309 days.

(21) Appl. No.: 18/643,938

(22) Filed: Apr. 23, 2024

(65) Prior Publication Data

US 2024/0371621 A1 Nov. 7, 2024

Related U.S. Application Data

(60) Provisional application No. 63/462,833, filed on Apr. 28, 2023.

(51) Int. Cl.

*H01J 49/02* (2006.01)
*H01J 49/00* (2006.01)
*H01J 49/42* (2006.01)

(52) U.S. Cl.

CPC ........ *H01J 49/027* (2013.01); *H01J 49/0031* (2013.01); *H01J 49/0036* (2013.01); *H01J 49/425* (2013.01)

(58) Field of Classification Search

CPC .. H01J 49/027; H01J 49/0031; H01J 49/0036; H01J 49/425

See application file for complete search history.

(56) References Cited

U.S. PATENT DOCUMENTS

2022/0246414 A1* 8/2022 Senko ................ H01J 49/4245

FOREIGN PATENT DOCUMENTS

WO WO2019231854 A1 12/2019
WO WO-2022262954 A1 * 12/2022 .......... H01J 49/4245
WO WO-2022262957 A1 * 12/2022 .......... H01J 49/0036

OTHER PUBLICATIONS

Kafader et al., "STORI Plots Enable Accurate Tracking of Individual Ion Signals", J. Am Soc. Mass Spectrom. (2019) 30:2200-2203 (Year: 2019).*

(Continued)

*Primary Examiner* — David E Smith

(57) ABSTRACT

A process for charge detection mass spectrometry includes acquiring a time-varying signal representative of a current induced on a detector by oscillatory motion of an ion within a trapping region; processing the time-varying signal to derive a frequency of the oscillatory motion; generating, based on the amplitude of the time-varying signal and the derived frequency of the oscillatory motion, Selective Temporal Overview of Resonant Ion (STORI) data representing $STORI_{real}$ values versus time and $STORI_{imag}$ values versus time; regenerating the STORI data based on a variation of the frequency of the oscillatory motion over time; and determining a charge state of the ion based on the regenerated STORI data.

20 Claims, 31 Drawing Sheets

(56) References Cited

OTHER PUBLICATIONS

Koster, "The Concept of Electrostatic Non-Orbital Harmonic Ion Trapping", International Journal of Mass Spectrometry, V. 287, pp. 114-118 (2009).
Kunpeng. Z et al. "Wavelet analysis of sensor signals for tool condition monitoring: A review and some new results." Department of Mechanical Engineering, National University of Singapore, Singapore 119260, Singapore. International Journal of Machine Tools & Manufacture 49 (2009) 537-553.
Miller, Zachary M., et al. "Apodization specific fitting for improved resolution, charge measurement, and data analysis speed in charge detection mass spectrometry." Journal of the American Society for Mass Spectrometry 33.11 (2022): 2129-2137.
Richardson, L. et al. "The Sliding Window Discrete Fourier Transform". arXiv:1807.07797v1 [stat.ME] Jul. 20, 2018.
International Search Report received in International Patent Application No. PCT/US24/25872 on Sep. 4, 2024.
Kafader et al., "STORI Plots Enable Accurate Tracking on Individual Ion Signals", Journal of the American Society for Mass Spectrometry, Elsevier Science Inc, US, col. 30, No. 11, Sep. 11, 2019.

* cited by examiner

METHODS FOR PERFORMING CHARGE DETECTION MASS SPECTROMETRY WITH TEMPORAL RESOLUTION

RELATED APPLICATIONS

The present application claims priority to U.S. Provisional Patent Application No. 63/462,833, filed Apr. 28, 2023, which is hereby incorporated by reference in its entirety.

BACKGROUND INFORMATION

Charge Detection Mass Spectrometry (CDMS) is a technique where the masses of individual ions are determined from concurrent measurement of each ion's mass-to-charge ratio (m/z) and charge. Conventional techniques for performing CDMS include the use of Fourier Transform (FT) mass spectrometry (FT-MS). In FT-MS, ions oscillate in an electrostatic field (e.g., in an orbital electrostatic trap mass analyzer, such as an Orbitrap® analyzer), in a magnetic field (e.g., in an FT-Ion Cyclotron Resonance (FT-ICR) mass analyzer), or a combination of both. A signal measured in time, referred to as a transient, is Fourier transformed to obtain an FT spectrum. An ion's oscillation frequency is a function of the ion's mass and, hence, m/z. Thus, each spectral component (peak) in the FT spectrum corresponds to a particular oscillation frequency of a trapped ion, from which the ion's m/z may be unambiguously determined. An ion's charge z may then be determined directly from the amplitude of the FT spectrum peak based on the assumption that the induced current signal is proportional to the ion's charge state. A simple CDMS approach would assume that the amplitude of the FT spectrum peak for a given frequency would be proportional to the ion's charge.

However, the FT spectrum peak amplitude is not a good measure of the induced current signal because the ion's dwelling time (lifetime) in the analyzing trap may be shorter than the signal acquisition period. An ion's lifetime may be shortened by a destructive collision with a molecule of a residual gas or by other mechanisms of ion fragmentation. As a result of fragmentation, the ion is either removed from the ensemble of trapped ions or its oscillation frequency changes abruptly due to a change in mass. In both cases, the induced-current signal terminates at the original frequency. In the case that a charged fragment with a different m/z remains trapped in the analyzer, a new FT component appears in the induced current signal on a different frequency at the same moment when the original signal from the parent ion is lost. The new frequency, although different than the original frequency, may be indistinguishable on the FT spectrum from the original frequency. However, as the new signal component starts not at the beginning of the acquisition period, its peak height is also underestimated.

US Patent Application Publication No. 2022/0246414A1, which is incorporated herein by reference in its entirety, describes the traditional Selective Temporal Overview of Resonant Ion (STORI) method that may be used to estimate an ion's actual lifetime within the signal acquisition period. Using an FT spectrum generated from a transient, the STORI method applies a special band filter centered at a particular FT spectrum frequency (also referred to as the STORI frequency) and constructs an incremental STORI signal as a function of time. The incremental STORI signal is a normally piecewise linear function of time that rises with a particular slope when the ion dwells in the analyzing trap and oscillates with a particular frequency. The slope of the STORI signal is proportional to the momentary value of the induced-current at this frequency and, therefore, is proportional to the ion's charge state. When the ion current for the particular frequency is missing, such as after loss or fragmentation of the ion, the STORI signal remains constant (flat). Using the STORI method, the momentary amplitudes of the induced ion current may be estimated with a temporal resolution, and hence the ion's charge state may be accurately determined, regardless of whether the ion survives the entire acquisition period.

The traditional STORI method is a significant improvement over prior techniques. However, two issues have arisen with the traditional STORI method. First, the traditional STORI method is sensitive to the choice of the STORI frequency at which the mentioned integrating band filter is centered. The STORI frequency may differ from the ion's true frequency of oscillation. As a result, the incremental STORI signal is no longer linear and its slope is underestimated. The STORI frequency may differ from the ion's true frequency of oscillation for various reasons. In some cases, the centroid of a FT spectrum peak is incorrectly determined, which often occurs in the presence of noise or low signal-to-noise ratio. This may occur even when the ion's frequency of oscillation remains constant over the acquisition period. In other cases, particularly for large molecules, the ion's oscillation frequency drifts over time due to changes in the ion's mass during the acquisition period. For example, desolvation of the ion (e.g., detaching of water or solvent molecules from the ion) or loss of other small neutral fragments from the ion in the vacuum environment results in a change of the ion's mass, which results in a change in the ion's oscillation frequency. The frequency drift makes the selected STORI frequency meaningless.

The second issue is related to the fundamental problem of the spectral uncertainty, which arises from the impossibility to have the frequency and the temporal resolution together. The presence of close FT spectrum peaks, including those from fragmentation products, affects the STORI integrating band filter and leads to irregular incremental STORI signal that is hard to interpret in the terms of a piecewise linear trend. As a result, CDMS experiments may have a low throughput and can be inefficient because few analytes of interest can be analyzed simultaneously.

SUMMARY

The following description presents a simplified summary of one or more aspects of the methods and systems described herein to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects of the methods and systems described herein in a simplified form as a prelude to the more detailed description that is presented below.

In some illustrative examples, a non-transitory computer-readable medium stores instructions that, when executed, direct at least one processor of a computing device for mass spectrometry to perform a process comprising: acquiring a time-varying signal representative of a current induced on a detector by oscillatory motion of an ion within a trapping region; processing the time-varying signal to derive a frequency of the oscillatory motion; generating, in accordance with equations (1) and (2), Selective Temporal Overview of Resonant Ion (STORI) data representing $STORI_{real}$ values versus time and $STORI_{imag}$ values versus time:

$$STORI_{real}(t_n) = S(t_n) * \cos(\omega * t_n) + STORI_{real}(t_{n-1}) \quad (1)$$

$$STORI_{imag}(t_n) = -S(t_n) * \sin(\omega * t_n) + STORI_{imag}(t_{n-1}) \quad (2)$$

where $S(t_n)$ is amplitude of the time-varying signal and w is the derived frequency of the oscillatory motion; regenerating the STORI data based on a variation of the frequency of the oscillatory motion over time; and determining a charge state of the ion based on the regenerated STORI data.

In some illustrative examples, a system for determining a charge state of an ion comprises: one or more processors; and memory storing executable instructions that, when executed by the one or more processors, cause a computing device to perform a process comprising: acquiring a time-varying signal representative of a current induced on a detector by oscillatory motion of an ion within a trapping region; processing the time-varying signal to derive a frequency of the oscillatory motion; generating, in accordance with equations (1) and (2).

In some illustrative examples, a system for performing charge detection mass spectrometry comprises: an ion trap mass analyzer that traps an ion within a trapping region and establishes a trapping field within the trapping region that causes the ion to undergo oscillatory motion; and a computing system configured to perform a process comprising: acquiring a time-varying signal representative of a current induced on a detector by oscillatory motion of an ion within a trapping region; processing the time-varying signal to derive a frequency of the oscillatory motion; generating, in accordance with equations (1) and (2).

In some illustrative examples, a non-transitory computer-readable medium stores instructions that, when executed, direct at least one processor of a computing device for mass spectrometry to perform a process comprising: acquiring a time-varying signal representative of a current induced on a detector by oscillatory motion of an ion within a trapping region; processing the time-varying signal to derive a frequency of the oscillatory motion; generating, in accordance with equation (8), Selective Temporal Overview of Resonant Ion (STORI) data representing $STORI_{mag}$ values versus time:

$$STORI_{mag}(t_n) = \sqrt{STORI_{real}(t_n)^2 + STORI_{imag}(t_n)^2} + STORI_{mag}(t_{n-1}) \quad (8)$$

where values of $STORI_{real}(t_n)$ and $STORI_{imag}(t_n)$ at time $t_n$ are determined in accordance with equations (6) and (7):

$$STORI_{real}(t_n) = S(t_n) * \cos(\omega * t_n) \quad (6)$$

$$STORI_{imag}(t_n) = -S(t_n) * \sin(\omega * t_n) \quad (7)$$

where $S(t_n)$ is amplitude of the time-varying signal and w is the derived frequency of the oscillatory motion; and determining a charge state of the ion based on the STORI data.

In some illustrative examples, a non-transitory computer-readable medium stores instructions that, when executed, direct at least one processor of a computing device for mass spectrometry to perform a process comprising: acquiring a transient for one or more ion species trapped and oscillating within a trapping region; generating a Fourier transform (FT) spectrum based on the transient; selecting, within the FT spectrum, a spectral interval including one or more FT components; estimating a frequency of each FT component within the spectral interval; processing the FT spectrum to determine a time-resolved frequency for an FT component within the spectral interval based on an isolated contribution of the FT component to the spectral interval; and determining, based on the time-resolved frequency for the FT component within the spectral interval, a charge state z of an ion species corresponding to the FT component.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1A:
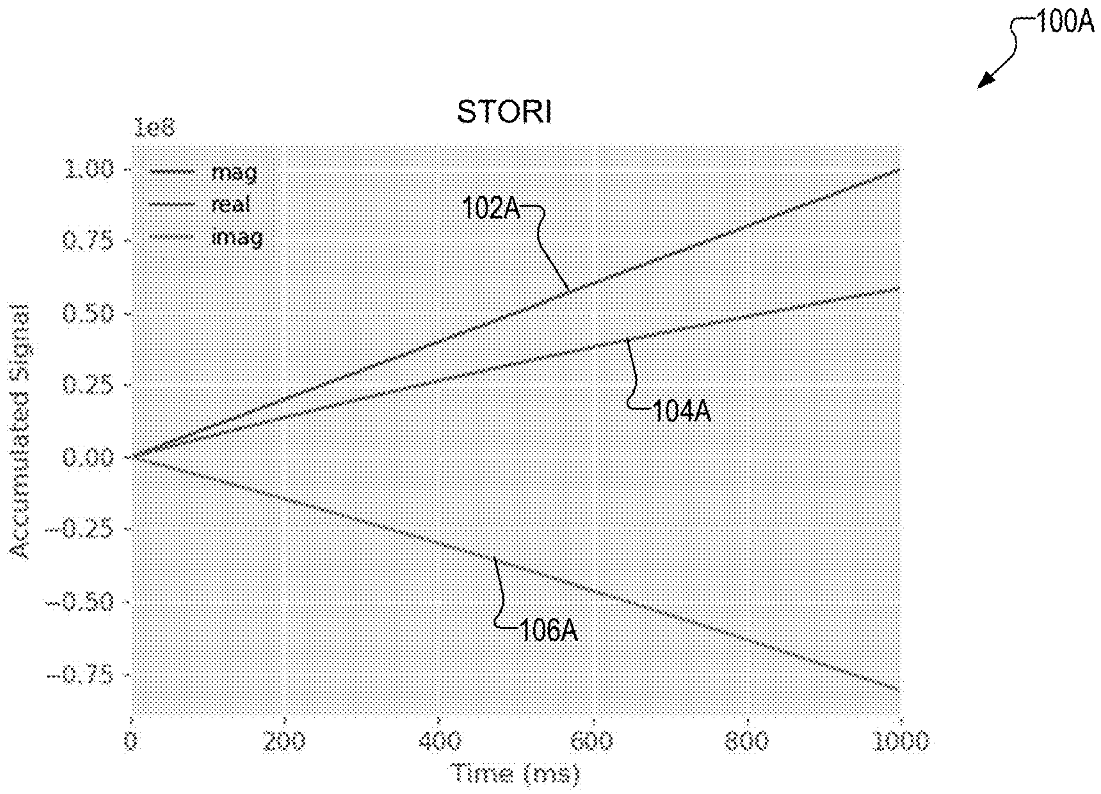
FIG. 1A shows an illustrative STORI plot for an ion that survives an entire acquisition period.

Methods and systems for performing CDMS with temporal resolution are described herein. The methods and systems described herein address these issues by finding momentary amplitudes and/or momentary frequencies of FT components with a temporal resolution. The amplitudes are interpreted as the numbers of trapped charges determined versus time over the period of signal acquisition. Abrupt changes of amplitudes are detected and interpreted as ion decay events (e.g., ion fragmentation or desolvation events). The momentary frequencies reflect m/z of ions and their evolution in time. The methods described herein thus account for incorrectly centroided frequencies and/or shifting frequencies by determining a time-dependent frequency profile over the ion lifetime. In some examples, a modified STORI method generates a STORI signal using the time-varying STORI frequencies. In further examples, multiple FT components in an FT spectrum that might otherwise interfere constructively or destructively with one another and thereby negatively influence the STORI methods can be multiplexed and accurately analyzed by CMDS by subtracting the influence of interfering components.

The methods described herein allow for non-constant m/z due, for instance, to the loss of solvent in vacuum environment. Advantages include more detailed analytical information gathered from mass spectra, improved amplitude and frequency precision, particularly in the case of the ion's fragmentation and mass loss during the acquisition period, and improved precision in charge state estimation. Moreover, the methods described herein can increase throughput of a CDMS experiment and increase the efficiency of CDMS by allowing multiple analytes to be analyzed simultaneously by CDMS.

The CDMS methods described herein may be performed with a system including an ion trap mass analyzer and a CDMS control system. The ion trap mass analyzer traps one or more ions within a trapping region and establishes a trapping field within the trapping region that causes the ions to undergo oscillatory motion. In some examples, the ion trap mass analyzer is an orbital electrostatic ion trap mass analyzer that establishes a quadro-logarithmic trapping field, such as an Orbitrap® mass analyzer (Thermo Fisher Scientific, Waltham, MA), as described in US Patent Application Publication No. 2022/0246414A1. However, it will be understood that the methods described herein may be implemented in any ion trap analyzer or equivalent structure in which the confined ions undergo oscillatory motion within a trapping region in the presence of an electrostatic trapping field (e.g., an electrostatic linear ion trap (ELIT) analyzer) or magnetic trapping field (e.g., a Fourier transform ion cyclotron resonance (FT-ICR) analyzer), including ion traps in which the ions do not undergo orbital motion. An example of a suitable non-orbital electrostatic trap is the Cassinian trap described in Köster, "The Concept of Electrostatic Non-Orbital Harmonic Ion Trapping", International Journal of Mass Spectrometry, V. 287, pp. 114-118 (2009), which is incorporated herein by reference. A CDMS control system is described below in more detail and includes software and/or hardware components configured to perform, or direct another system, device, or apparatus to perform, any of the operations described herein.

To aid in understanding the principles of modified STORI methods that will be described, a review of conventional CDMS techniques and the traditional STORI method will now be given. Conventional CDMS techniques are based on the fundamental principle of the Discrete Fourier Transform (DFT), that a signal represented in the time domain (the transient) as a set of discrete time and value (signal intensity) pairs can be represented in the frequency domain as a set of discrete frequency and complex number pairs. The traditional DFT returns a single magnitude for any given frequency, representing how much signal built up at that frequency over the entire acquisition period. The value of the DFT at any frequency is represented as a complex number and can be obtained by calculating the correlation of the signal to a cosine wave (the real component) and a sine wave (the imaginary component) of the frequency. The traditional DFT returns a single magnitude for any given frequency, representing how much signal built up at said frequency over the entire transient. A simple CDMS approach would assume that the magnitude of the value returned by the DFT for a given frequency would be proportional to the ion's charge. Thus, an ion with twice the charge state as compared with another ion should induce a signal that is twice as high on the detection electrodes as compared with the signal induced by the other ion.

However, if an ion "dies" partway through the transient, such as due to fragmentation of the ion, and stops providing further signal, the single value returned by the DFT will be lower than if the ion survived the full transient. As a result, the single DFT value is insufficient to determine charge state with certainty. The traditional STORI method was developed to estimate the ion's actual lifetime within the period of signal acquisition and the momentary amplitudes of the induced ion current with a temporal resolution.

In the traditional STORI method, the time-varying signal from the detector is processed to determine the ion's m/z and charge. The determination of m/z is accomplished by applying a FFT to the time-varying signal to produce an FT spectrum from which the frequency ω of the ion's harmonic motion (the "STORI frequency") can be determined. The STORI frequency may be determined by centroiding the FT spectrum peak, such as by fitting a parabola or other curve to the points of the FT spectrum peak or by performing a line search to optimize the maximum of the FT spectrum peak. The centroided STORI frequency ω may be correlated to m/z based on a known correlation. In some examples, the correlation between STORI frequency ω and m/z is represented by the following relation:

$$\omega = \sqrt{\frac{k}{m/z}}$$

where k is a correlation parameter, which may be predetermined and may be based on various factors, such experiment conditions.

The determination of ion charge z is based on the STORI signal over the lifetime of the ion during the acquisition. The STORI signal at any point in time is represented as a complex number and can be obtained by calculating the correlation of the time-varying signal (the transient) to a cosine wave (the real component) and a sine wave (the imaginary component) of the frequency. However, instead of calculating one value for the sum of cosine and sine correlations over the whole transient length, as in the DFT techniques, the traditional STORI method keeps separate running tallies for the cosine and sine correlations (real and imaginary components, respectively) as the transient progresses. The magnitude of the complex number (the STORI signal represented by $STORI_{mag}$) is plotted at each point, and the slope of the time-varying STORI signal is used to determine lifetime and charge state of the ion. Each point in a set of STORI data is the product of the discretized time-varying signal $S(t_n)$ (the transient) at time $t_n$ and either a cosine wave or sine wave at the STORI frequency ω, summed with the prior $STORI_{real}$ or $STORI_{imag}$ value obtained at prior time point $t_{n-1}$, as expressed in equations (1) and (2) below, and each value of the STORI signal is obtained based on equation (3) below:

$$STORI_{real}(t_n) = S(t_n) * \cos(\omega * t_n) + STORI_{real}(t_{n-1}) \quad (1)$$

$$STORI_{imag}(t_n) = -S(t_n) * \sin(\omega * t_n) + STORI_{imag}(t_{n-1}) \quad (2)$$

$$STORI_{mag}(t_n) = \sqrt{STORI_{real}(t_n)^2 + STORI_{imag}(t_n)^2}$$

where $S(t_n)$ is the amplitude of the time-varying signal at time point $t_n$ and w is the STORI frequency of the oscillatory motion derived from the FT spectrum. In equations (1), (2), and (3), ($t_0$, $t_1$, . . . $t_n$) represents a sequence of time points at a fixed interval of Δt, such that ω*Δt<<1.

The ion's charge z is determined in accordance with the measured slope of the STORI signal ($STORI_{mag}(t_n)$) and correlation data that correlates the slope of the STORI signal to ion charge. In addition to the determination of the charge of the trapped ion, the STORI signal may be employed to identify and characterize ion decay events (e.g., where an ion species disintegrates during the acquisition of the time-varying signal) and to identify and evaluate signals produced by two or more simultaneously trapped ions. Accordingly, when determining ion charge z, the slope of the STORI signal after an ion decay event can be disregarded or a transient during which an ion decays can be disregarded. Once an ion's m/z and charge z are determined using these processing methods, the ion's mass m may be easily calculated.

Figure 1B:
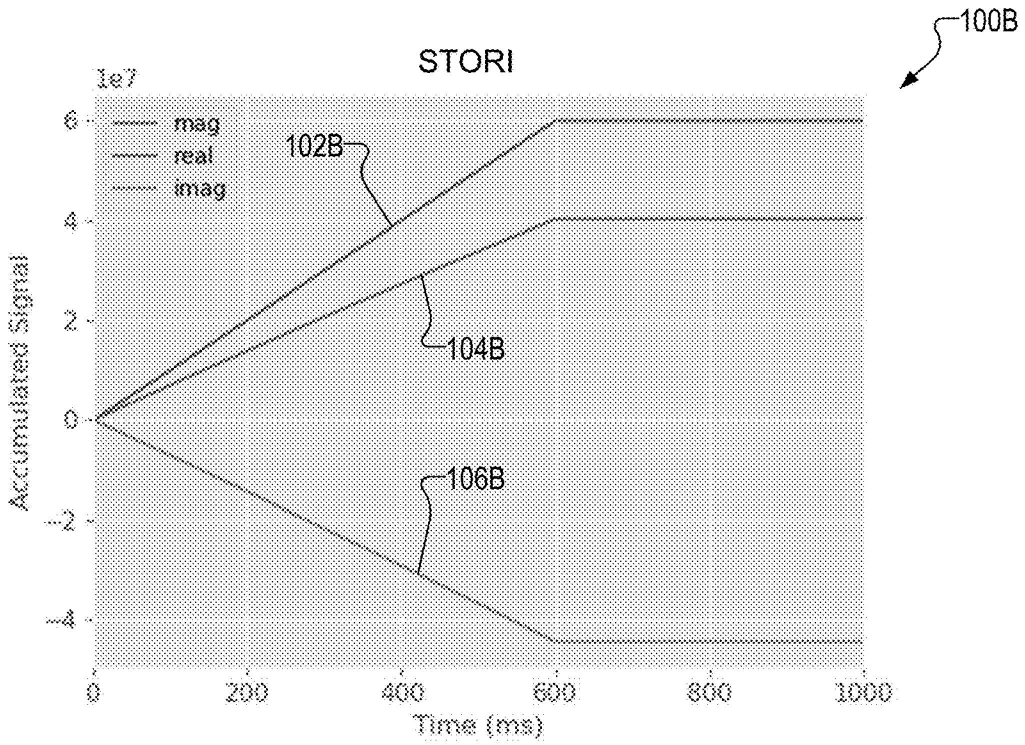
FIG. 1B shows an illustrative STORI plot for an ion that does not survive an entire acquisition period.

As mentioned, the traditional STORI method keeps a running tally of the sine and cosine correlations as the transient progresses instead of calculating one value for the sum of sine and cosine correlations over the whole transient duration as with the traditional DFT method. FIGS. 1A and 1B show STORI plots representing simulated STORI data for a frequency around 55 kHz, which is representative of a viral capsid. FIG. 1A shows a STORI plot 100A for an ion that survives the entire acquisition period. STORI plot 100A includes a curve 102A representing $STORI_{mag}$ (the magnitude of the STORI signal, or STORI value) as a function of time, a curve 104A representing $STORI_{real}$ as a function of time (the cosine correlation representing the real component), and a curve 106A representing $STORI_{imag}$ as a function of time (the sine correlation representing the imaginary component). As evidenced by curves 102A, 104A, and 106A, the ion survives the entire acquisition period.

FIG. 1B shows a STORI plot 100B for an ion that does not survive the entire acquisition period. STORI plot 100B includes a curve 102B representing $STORI_{mag}$ as a function of time, a curve 104B representing $STORI_{real}$ as a function of time, and a curve 106B representing $STORI_{imag}$ as a function of time. The change in slope of curves 102B, 104B, and 106B at 600 ms indicates an ion decay event. In FIGS. 1A and 1B, the slopes of curves 102A and 102B during the lifetime of the ion are proportional to the ion's charge state, regardless of whether the ion survives the entire acquisition period.

The traditional STORI method assumes that an ion's frequency of oscillation is constant throughout the acquisition period and that the centroided STORI frequency is correct (e.g., matches the signal's true frequency). This assumption is reasonable if the following conditions are met: (1) electric fields are unchanging over the course of the transient, (2) no other forces significantly alter the ion trajectory (e.g. space charge repulsions), and (3) the ion's m/z is not changing during the acquisition period (e.g. due to fragmentation, desolvation, etc.). For the typical CDMS experiments, both conditions (1) and (2) are met, and for smaller analytes condition (3) is also met. But for larger ions (e.g. viral capsids), condition (3) may not be met due to changes in the ion's mass (and, hence, m/z) during the transient collection, such as due to fragmentation and/or desolvation of the ion. Additionally, it is not always easy to correctly centroid a FT spectrum peak, especially in the presence of noise. Change in the ion's mass and/or an incorrectly centroided frequency peak can lead to errors in the reported STORI slopes (the slope of the STORI signal, e.g., the slope of curve 102A or 102B), which results in an incorrect charge estimation for the ion.

Figure 2A:
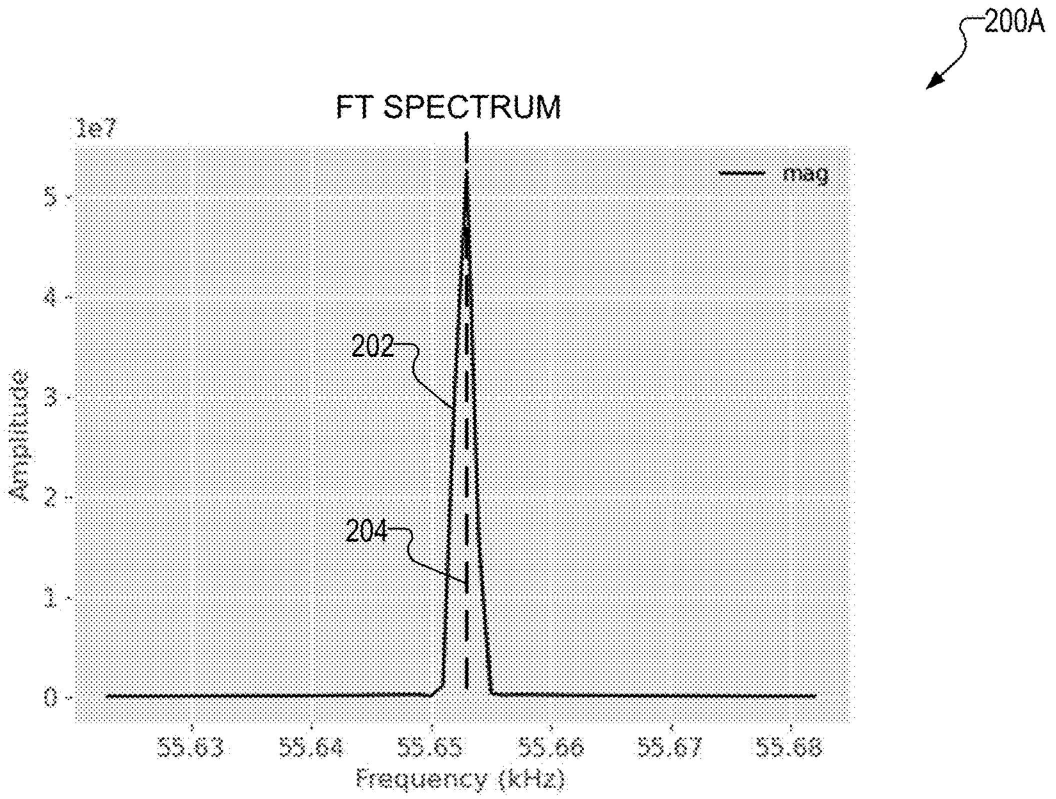
FIG. 2A shows an illustrative FT spectrum for a sinusoidal signal of fixed frequency having a peak.
Figure 2B:
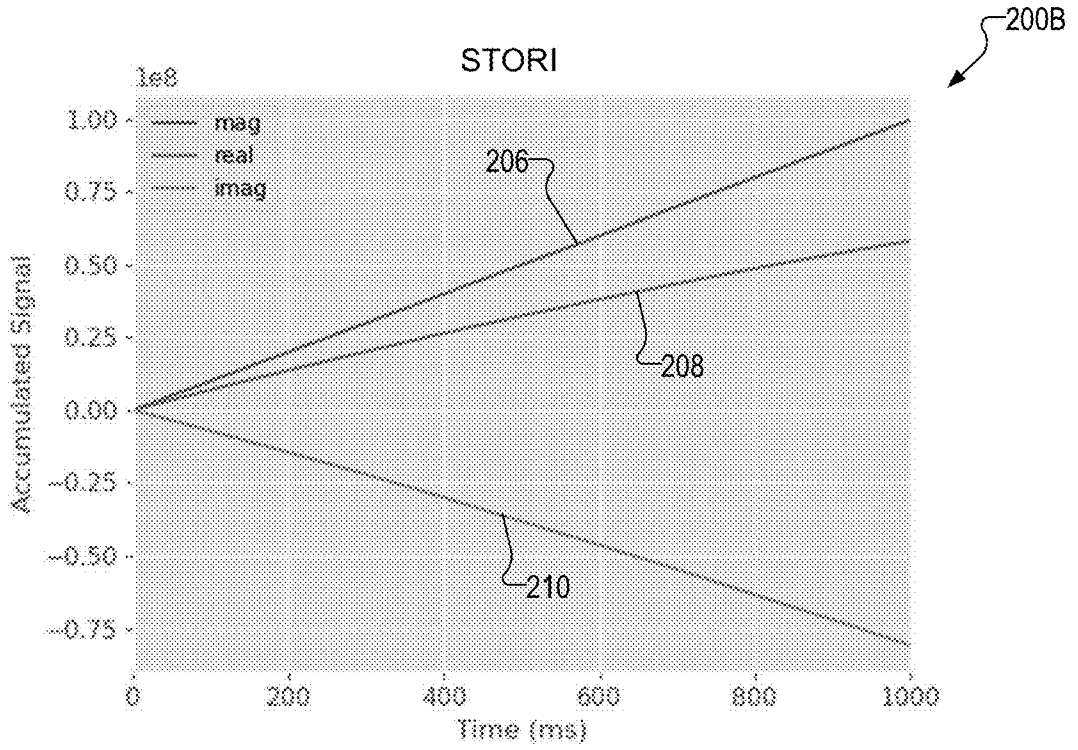
FIG. 2B shows an illustrative STORI plot generated using the correctly centroided STORI frequency of FIG. 2A.

FIG. 2A shows an illustrative FT spectrum 200A for a sinusoidal signal of fixed frequency having a peak 202. A correctly centroided STORI frequency is indicated by the dashed line 204. FIG. 2B shows an illustrative STORI plot 200B generated using the correctly centroided STORI frequency of FIG. 2A. STORI plot 200B includes a curve 206 representing $STORI_{mag}$ as a function of time, a curve 208 representing $STORI_{real}$ as a function of time, and a curve 210 representing $STORI_{imag}$ as a function of time. As shown in FIG. 2B, a traditional STORI calculation represented by curve 206 (correlation to sine and cosine waves at the centroided STORI frequency of FIG. 2A) will build up signal linearly with time. The real and imaginary parts (cosine and sine correlations represented by curves 208 and 210, respectively) may have different slopes, depending on the initial phase of the signal, but their slopes will be constant throughout the transient because the centroided STORI frequency and the signal's true frequency stay in lock step the entire time.

Figure 3A:
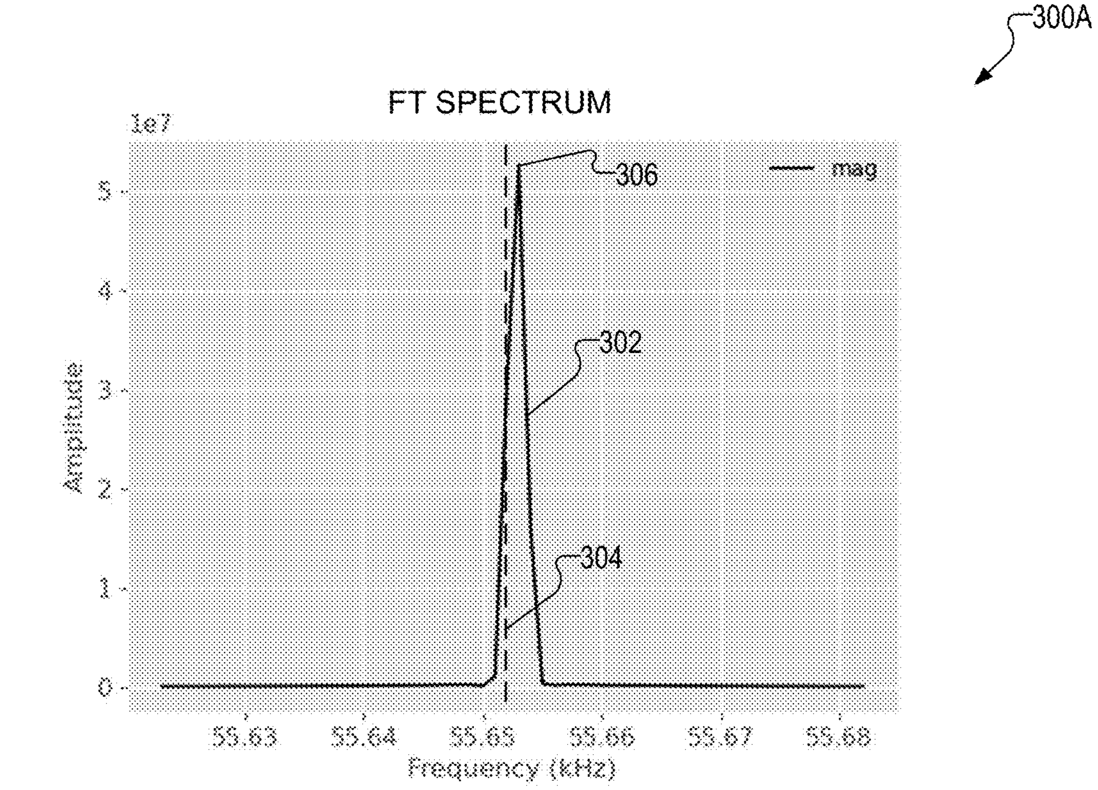
FIG. 3A shows an illustrative FT spectrum for a sinusoidal signal of fixed frequency having a peak.
Figure 3B:
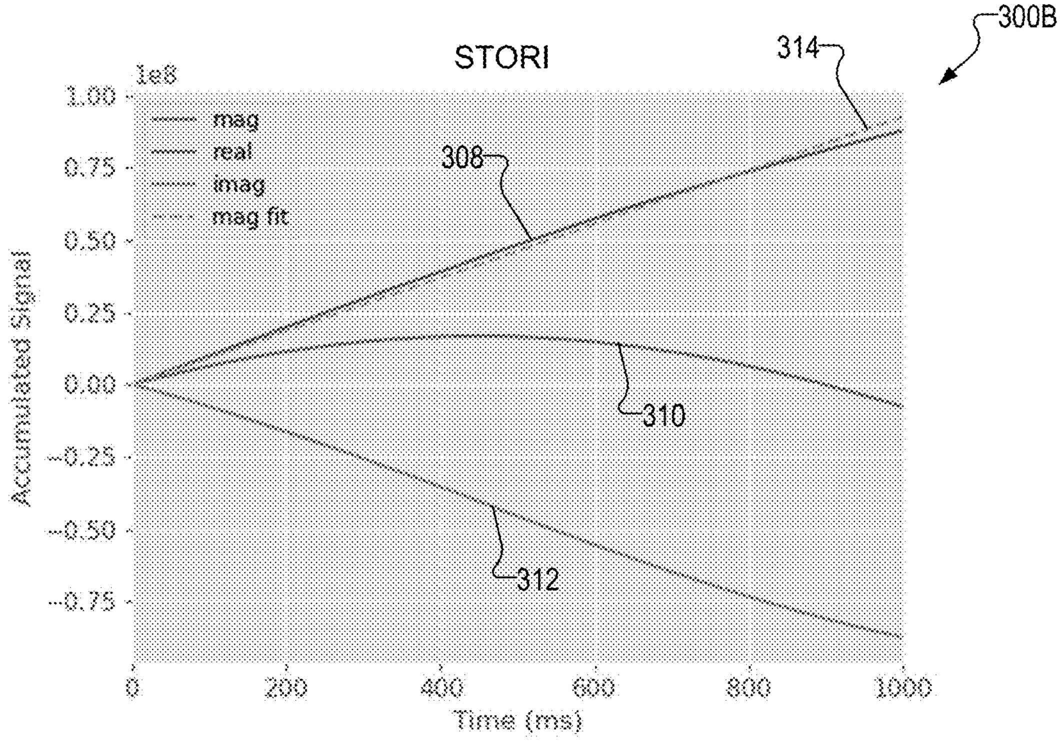
FIG. 3B shows an illustrative STORI plot generated using the incorrectly centroided STORI frequency of FIG. 3A.

FIG. 3A shows an illustrative FT spectrum 300A for a sinusoidal signal of fixed frequency having a peak 302. An incorrectly centroided STORI frequency is indicated by the dashed line 304. As shown in FIG. 3A, the STORI frequency and the signal's true frequency (indicated by apex 306 of peak 302) are not the same (e.g. from a poor centroid or from a shift in the signal frequency during the transient). FIG. 3B shows an illustrative STORI plot 300B generated using the incorrectly centroided STORI frequency of FIG. 3A. STORI plot 300B includes a curve 308 representing $STORI_{mag}$ as a function of time, a curve 310 representing $STORI_{real}$ as a function of time, a curve 312 representing $STORI_{imag}$ as a function of time, and a dashed-line ideal curve 314 representing $STORI_{mag}$ as a function of time for a correctly centroided STORI frequency. As shown in FIG. 3B, the sine and cosine correlations, represented by curves 310 and 312, respectively, do not build signal at the same rate throughout the transient. Rather, the STORI signal, represented by curve 308, starts to transfer between the two correlations as the two frequencies go in and out of phase with each other. The mismatched frequencies result in a decreased slope of curve 308 as compared with ideal curve 314 and, therefore, incorrect charge estimation.

As the magnitude of centroid error increases, the resultant STORI slope declines rapidly. In the example of FIGS. 3A and 3B, a centroid error of 4 ppm drops the STORI slope by about 5%. The signal-to-noise ratio would have to get very low (<10) at this frequency to get 1 ppm variation in centroid, so any centroid error for species with stable m/z in this frequency regime should be minor. But for species with unstable m/z, such as large molecules that are bound with solvent molecules, small centroid errors may result in non-trivial slope errors.

The modified STORI method addresses these issues of the traditional STORI method by using the STORI data (e.g., $STORI_{real}(t_n)$ and $STORI_{imag}(t_n)$) to determine a time-varying STORI frequency over the ion lifetime and regenerating the STORI signal (including $STORI_{mag}(t_n)$) based on the time-varying STORI frequency, as will now be explained.

The rate at which the value of the STORI signal ($STORI_{mag}$) transfers between cosine and sine waves (real and imaginary components) depends on how large the discrepancy is between the STORI frequency and the signal's true frequency. Accordingly, the modified STORI method estimates a frequency correction as a function of time for the STORI frequency based on the rate at which the value of the STORI signal transfers between cosine and sine waves. The discrepancy between the STORI frequency and the signal's true frequency is related to the time derivative of the STORI value, referred to as δSTORI. Since the value of the STORI signal is a complex number (sine and cosine correlations), its derivative (δSTORI) is also a complex number, with the real part being how quickly STORI signal builds in the cosine wave and the imaginary part being how quickly STORI signal builds in the sine wave.

Figure 4:
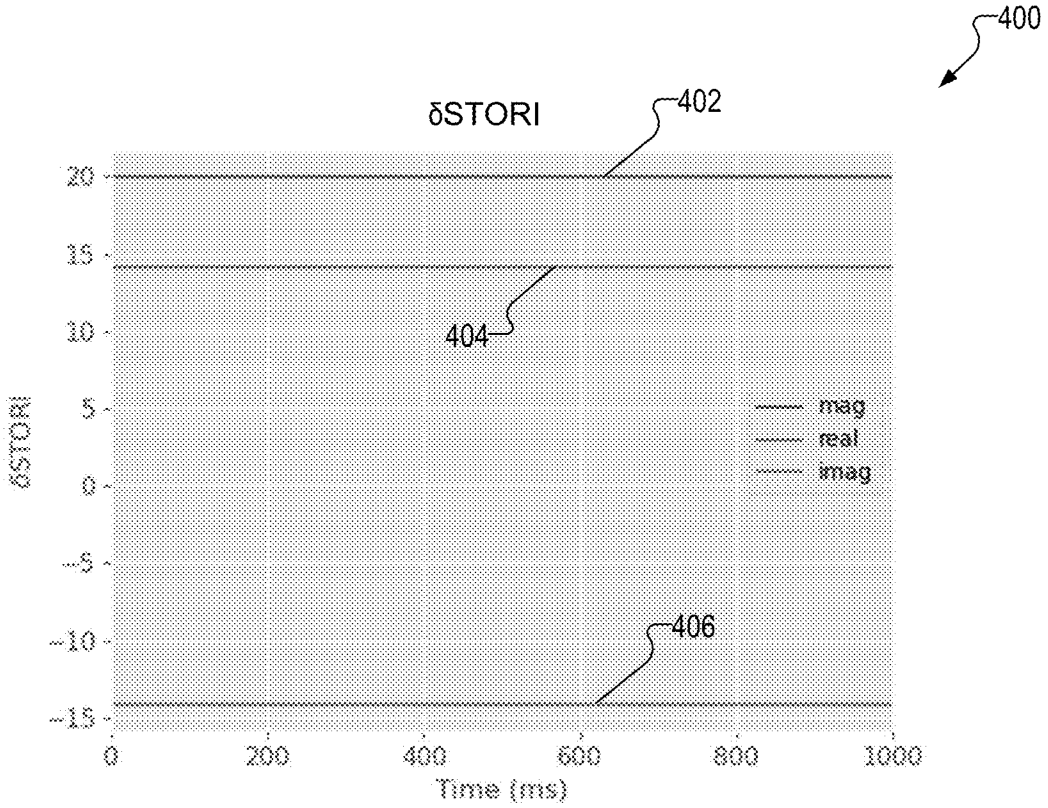
FIG. 4 shows an illustrative δSTORI plot representing δSTORI data obtained from the STORI data of FIG. 2B for an idealized case of a fixed frequency and correct centroid.
Figure 5:
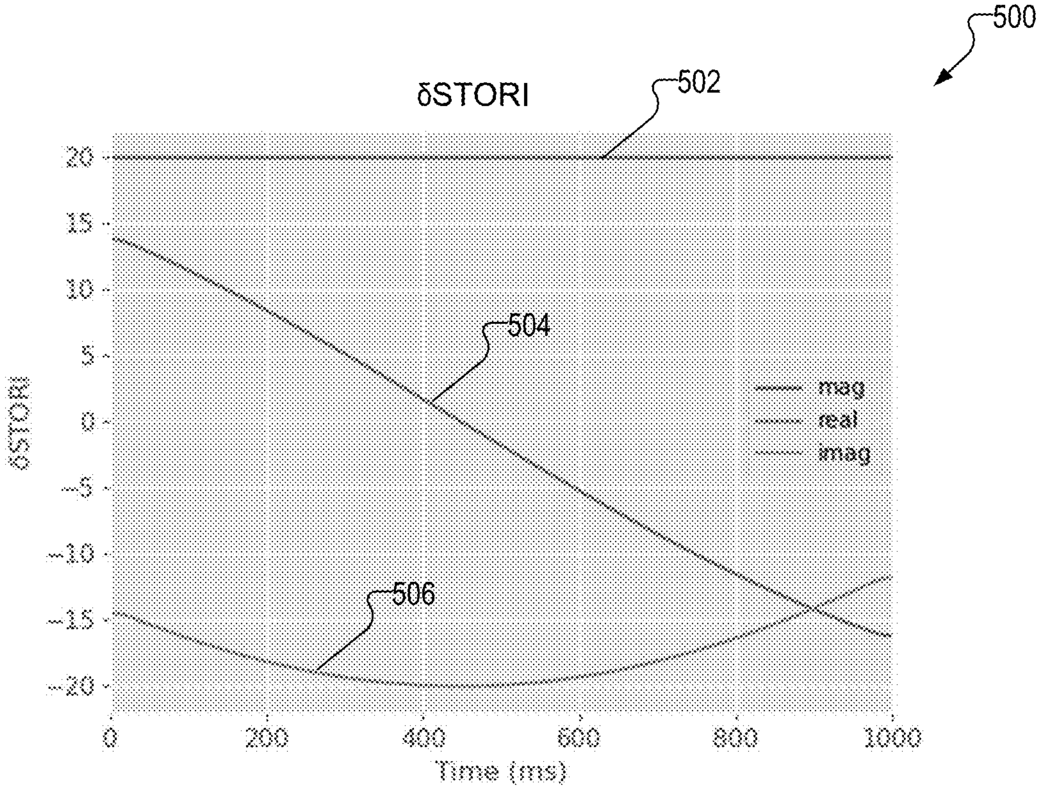
FIG. 5 shows an illustrative δSTORI plot representing δSTORI data obtained from the STORI data of FIG. 3B for the case of an incorrectly centroided STORI frequency.

FIG. 4 shows a δSTORI plot 400 representing δSTORI data obtained from the STORI data of FIG. 2B for an idealized case of a fixed frequency and correct centroid. δSTORI plot 400 includes a curve 402 representing $\delta STORI_{mag}$ as a function of time, a curve 404 representing $\delta STORI_{real}$ as a function of time, and a curve 406 representing $\delta STORI_{imag}$ as a function of time. As shown in FIG. 4, the δSTORI values (e.g., curves 402, 404, and 406) are all linear and constant. In contrast, FIG. 5 shows a δSTORI plot 500 representing δSTORI data obtained from the STORI data of FIG. 3B for the case of an incorrectly centroided STORI frequency. δSTORI plot 500 includes a curve 502 representing $\delta STORI_{mag}$ as a function of time, a curve 504 representing $\delta STORI_{real}$ as a function of time, and a curve 406 representing $\delta STORI_{imag}$ as a function of time. As shown in FIG. 5, the real and imaginary components of δSTORI data (curves 504 and 506, respectively) are not linear and constant but change as the transient progresses because the source of the STORI amplitude is transferring between cosine and sine waves over time due to a mismatch in STORI frequency and the signal's true frequency (see FIG. 3B).

Figure 6:
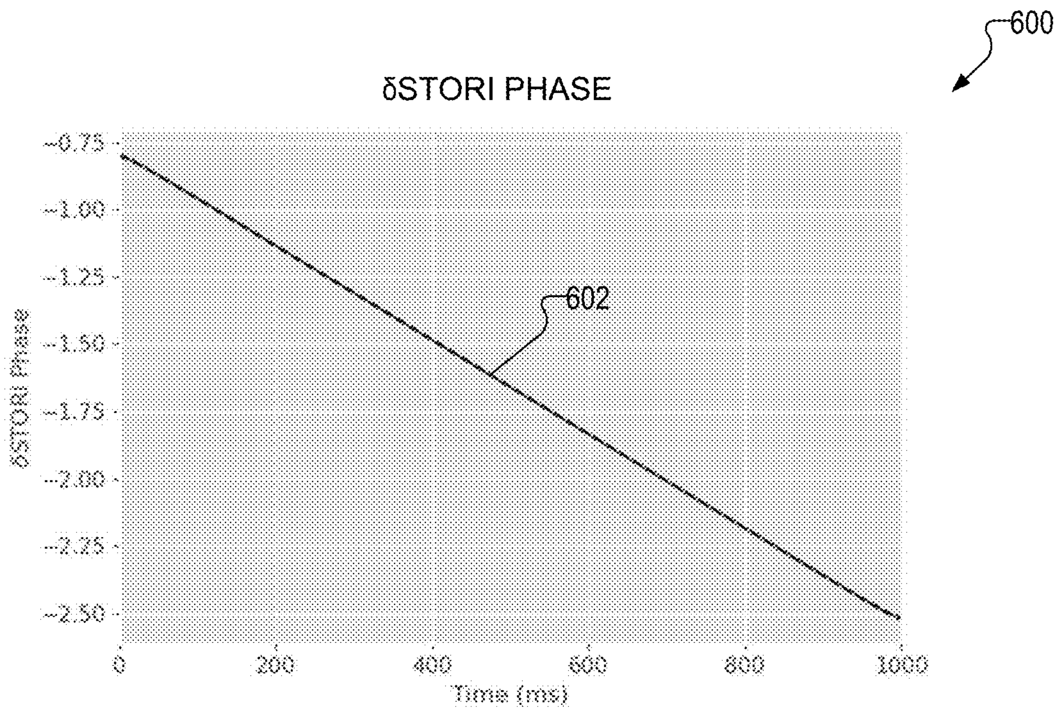
FIG. 6 shows an illustrative δSTORI phase plot having a δSTORI phase curve representing the δSTORI phase angle over time during the transient.

The δSTORI phase angle ($\theta_{\delta STORI}$) is a measure of how quickly signal transfers between sine and cosine waves and is determined by the ratio of imaginary and real values of the δSTORI data (see FIG. 5) according to the following equation (4):

$$\theta_{\delta STORI}(t_n) = \tan^{-1}\left(\frac{\delta STORI_{imag}(t_n)}{\delta STORI_{real}(t_n)}\right) \tag{4}$$

where $\theta_{\delta STORI}(t_n)$ is the δSTORI phase angle, $\delta STORI_{imag}(t_n)$ is the derivative of the imaginary component of the STORI data ($STORI_{imag}(t_n)$), and $\delta STORI_{real}(t_n)$ is the derivative of the real component of the STORI data ($STORI_{real}(t_n)$). FIG. 6 shows a δSTORI phase plot 600 having a δSTORI phase curve 602 representing the δSTORI phase angle over time during the transient. As can be seen, the δSTORI phase angle changes linearly over time as a result of an incorrect centroid if both the STORI frequency and the signal's true frequency are unchanging. The slope of the time-varying δSTORI phase angle curve 602 gives a direct measurement of any difference between the STORI frequency and the signal's true frequency. In the example of FIG. 6, the STORI frequency is incorrectly centroided at 0.27826 Hz above the signal's true frequency. As a result, the STORI frequency's phase gradually runs ahead of the signal's true frequency at a rate of 1.75 rad/sec, determined as follows:

$$\left(0.278\frac{\text{cycles}}{\text{sec}}\right)\times\left(2\pi\frac{\text{rad}}{\text{cycle}}\right)=1.75\frac{\text{rad}}{\text{sec}}$$

In the example of FIG. 6, the slope of the δSTORI phase curve 602 is −1.75 rad/s, which matches the calculation. If the direction of frequency centroid error is reversed, the slope of the δSTORI phase curve 602 reverses sign. As shown in FIG. 6, the slope of the δSTORI phase curve 602 at any point in the transient is indicative of any offset between the STORI frequency and the signal's true frequency.

If the signal's true frequency is shifting during the transient (e.g., due to desolvation or other decay events), rather than fixed as in the example of FIG. 6, the δSTORI phase curve is not linear. However, the slope of the δSTORI phase curve at any point in time indicates the offset between the STORI frequency and the signal's true frequency at that point in time. The modified STORI method provides this time-dependent frequency offset information to regenerate the STORI signal at each point in time to correct for any discrepancies between the STORI frequency and the signal's true frequency, as will be explained below in more detail. The time-dependent frequency offset information may also be used (e.g., based on the relation of w to m/z described above) to determine m/z of the ion at a particular time during the transient.

Figure 7:
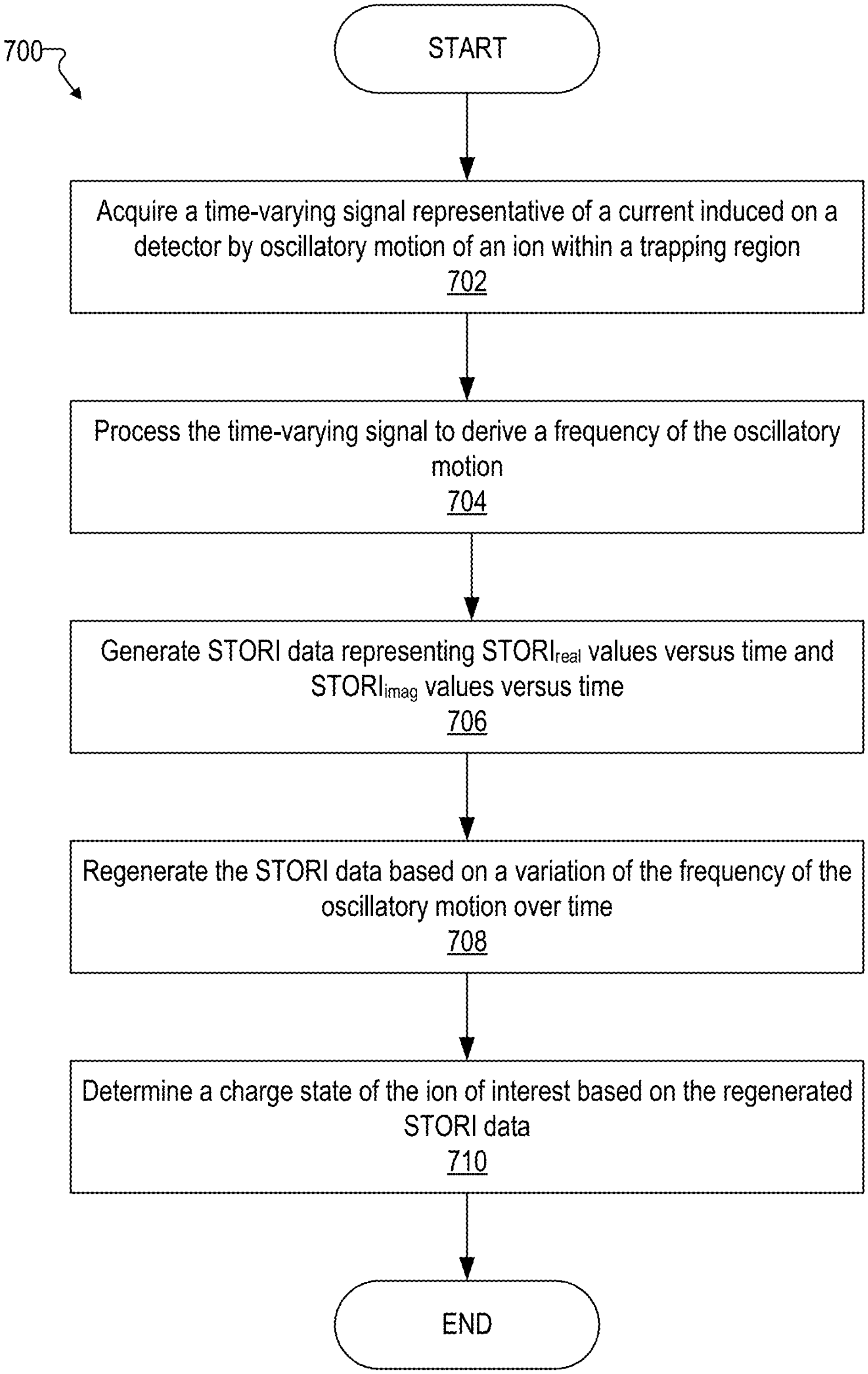
FIG. 7 shows an illustrative method of performing a modified STORI method.

FIG. 7 shows an illustrative method 700 of performing a modified STORI method. While FIG. 7 shows illustrative operations according to one embodiment, other embodiments may omit, add to, reorder, and/or modify any of the operations shown in FIG. 7.

At operation 702, a time-varying signal representative of a current induced on a detector by oscillatory motion of an ion within a trapping region is acquired. In some examples, the trapping region is a trapping region of an orbital electrostatic ion trap mass analyzer (e.g., an Orbitrap™ mass analyzer).

At operation 704, the time-varying signal is processed to derive a frequency of the oscillatory motion of the ion. For example, a fast Fourier transform may be performed on the time-varying signal to generate an FT spectrum having a peak representative of the oscillatory motion of the ion. A centroided frequency of the oscillatory motion of the ion (the derived frequency) is determined based on the FT spectrum. The centroided frequency may be derived in any suitable way, such as by fitting a parabola or other curve to the points of the FT spectrum peak or by performing a line search to optimize the maximum of the peak.

At operation 706, STORI data representing $STORI_{real}$ values versus time and $STORI_{imag}$ values versus time is generated in accordance with equations (1) and (2) above using the centroided frequency of the oscillatory motion of the ion as the STORI frequency ω. In some examples, the STORI data also represents $STORI_{mag}$ values versus time, generated in accordance with equation (3). As explained above, the STORI data is determined based on the time-varying signal and the centroided frequency for the FT spectrum peak.

At operation 708, STORI data representing $STORI_{real}$ values versus time, $STORI_{imag}$ values versus time, and $STORI_{mag}$ values versus time is regenerated based on a variation of the frequency of the oscillatory motion over time. Operation 708 will be described below in more detail.

At operation 710, a charge z of the ion is determined based on the regenerated STORI data (e.g., based on the STORI signal). Charge z may be determined as described above based on a slope of the STORI signal.

Figure 8:
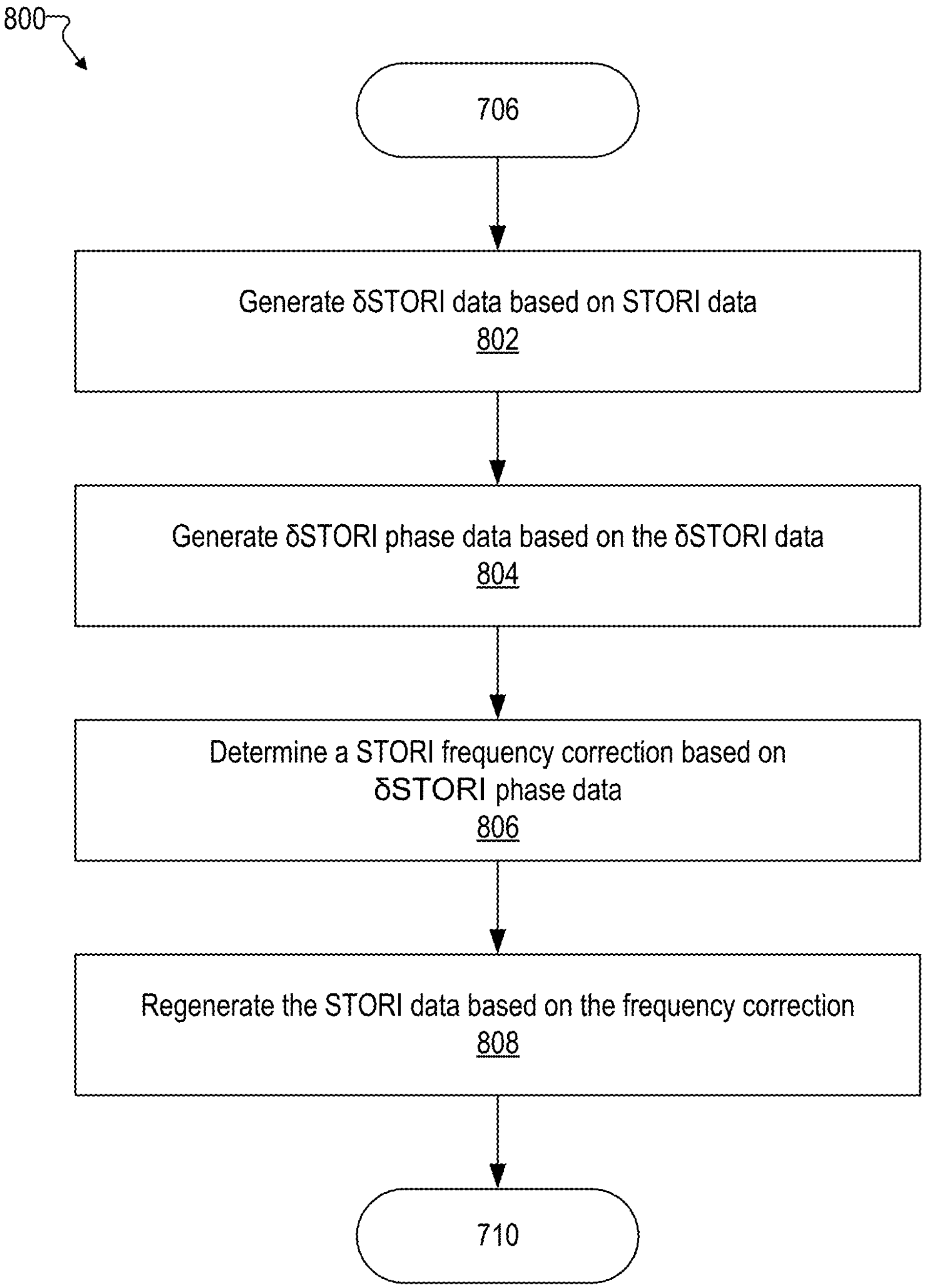
FIG. 8 shows an illustrative method of performing operation 708 of method 700.

Operation 708 will now be described. FIG. 8 shows an illustrative method 800 of performing operation 708 of method 700 (e.g., regeneration of STORI data based on a variation of the frequency of the oscillatory motion over time). While FIG. 8 shows illustrative operations according to one embodiment, other embodiments may omit, add to, reorder, and/or modify any of the operations shown in FIG. 8.

At operation 802, δSTORI data is generated based on STORI data. The δSTORI data is generated by taking the time derivative of the STORI data generated at operation 706 (FIG. 7). Since the STORI data includes both a real component ($STORI_{real}(t_n)$) and an imaginary component ($STORI_{imag}(t_n)$), the δSTORI data includes both a real component ($\delta STORI_{real}(t_n)$) and an imaginary component ($\delta STORI_{imag}(t_n)$). In some examples, a smooth curve is fit to the STORI data using a suitable regression, such as a linear regression or a second- or higher-order polynomial regression, and the derivative is taken from the smoothed curve at each point in time.

At operation 804, δSTORI phase data is generated based on the δSTORI data. As explained above, the δSTORI phase data is determined based on the ratio of the imaginary and real values of the δSTORI data at each point in time during the transient in accordance with equation (4).

At operation 806, a frequency correction relative to the centroided STORI frequency is determined based on the δSTORI phase data. The frequency correction is an adjustment to the centroided STORI frequency (derived at operation 704) at each point in time during the transient. The frequency correction may be determined in any suitable way. In some examples, a smooth δSTORI phase curve is fit to the δSTORI phase data using a suitable regression, such as a second- or higher-order polynomial regression. A slope of the δSTORI phase curve is determined for each point in time, such as by taking the derivative of the δSTORI phase curve at each point in time. The slope of the δSTORI phase curve at any given point in time represents the frequency correction to be applied to the centroided STORI frequency at that point in time when the STORI data is regenerated at operation 708.

At operation 808, the STORI data (e.g., $STORI_{real}(t_n)$, $STORI_{imag}(t_n)$, and $STORI_{mag}(t_n)$) is regenerated using the STORI frequency correction determined at operation 806. The STORI data is regenerated in accordance with modified equations (1') and (2'), shown below, and equation (3) above:

$$STORI_{real}(t_n) = S(t_n) * \cos(\omega(t_n) * t_n) + STORI_{real}(t_{n-1}) \quad (1')$$

$$STORI_{imag}(t_n) = -S(t_n) * \sin(\omega(t_n) * t_n) + STORI_{imag}(t_{n-1}) \quad (2')$$

wherein the STORI frequency $\omega(t_n)$ for each time point $t_n$ during the transient is the centroided STORI frequency previously derived at operation 704 as adjusted with the STORI frequency correction determined at operation 806 for each time point during the transient. For example, the time-dependent STORI frequency $\omega(t_n)$ may be given by the following equation (5):

$$\omega(t_n) = \omega_{centroid} + \omega_{correction}(t_n) \quad (5)$$

where $\omega_{centroid}$ is the centroided STORI frequency derived at operation 704 based on the FT spectrum and $\omega_{correction}(t_n)$ is the estimated frequency correction at time $t_n$, as determined at operation 806. In equations (1'), (2'), and (5), $(t_0, t_1, \ldots t_n)$ represents a sequence of time points at a fixed interval of $\Delta t$, such that $\omega^*\Delta t<<1$.

In some examples, methods 700 and 800 are performed in real-time as a transient progresses. In other examples, methods 700 and 800 are performed post-acquisition (e.g., after acquisition of the transient). Various illustrative examples of performing the modified STORI method will now be described.

Figure 9:
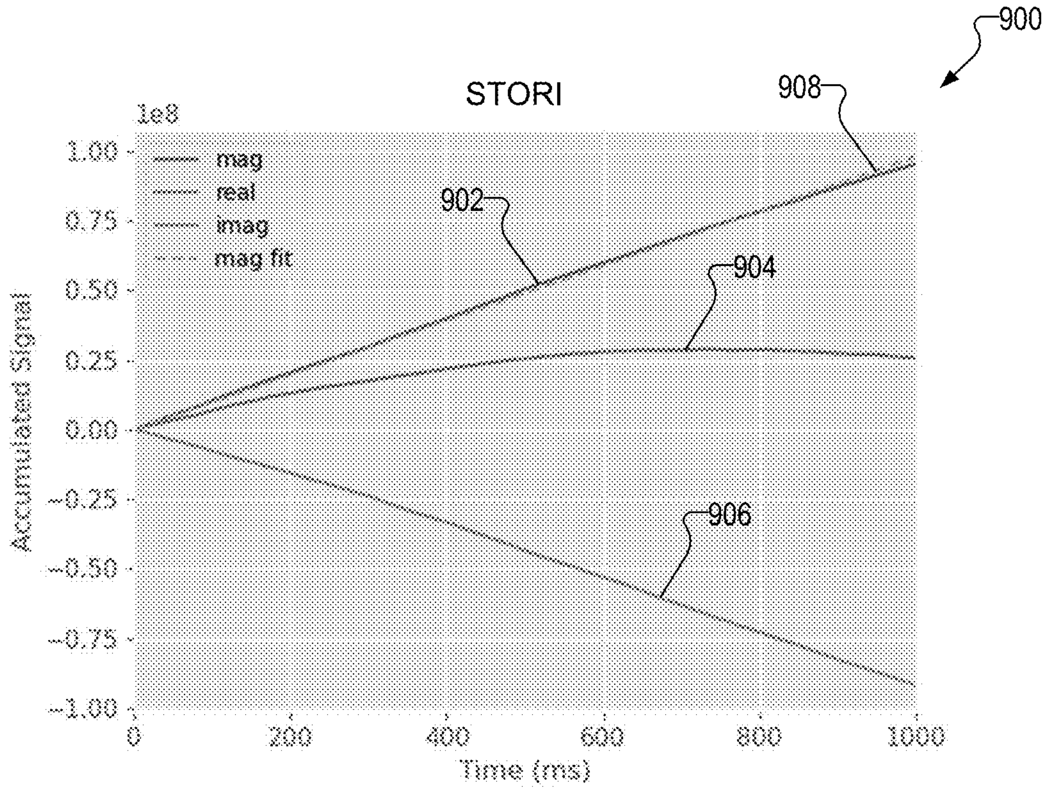
FIG. 9 shows an illustrative STORI plot representing STORI data generated with an incorrectly centroided STORI frequency.

In a first example, the modified STORI method is used to correct a centroid error with a fixed (unchanging) frequency. In this example, a transient has a signal-to-noise ratio of about 60 and the centroided STORI frequency has an error of +3 ppm. FIG. 9 shows an illustrative STORI plot 900 representing STORI data generated (e.g., at operation 706) with the incorrectly centroided STORI frequency. STORI plot 900 includes a curve 902 representing $STORI_{mag}$ as a function of time, a curve 904 representing $STORI_{real}$ as a function of time, a curve 906 representing $STORI_{imag}$ as a function of time, and a dashed-line ideal curve 908 representing $STORI_{mag}$ as a function of time for a correctly centroided STORI frequency. As shown in FIG. 9, the sine and cosine correlations, represented by curves 904 and 906, respectively, do not build signal at the same rate throughout the transient, indicating a frequency mismatch. Thus, curve 902 has a fitted slope error of −2.1% relative to ideal curve 908 for a theoretical transient with no centroid frequency error.

Figure 10A:
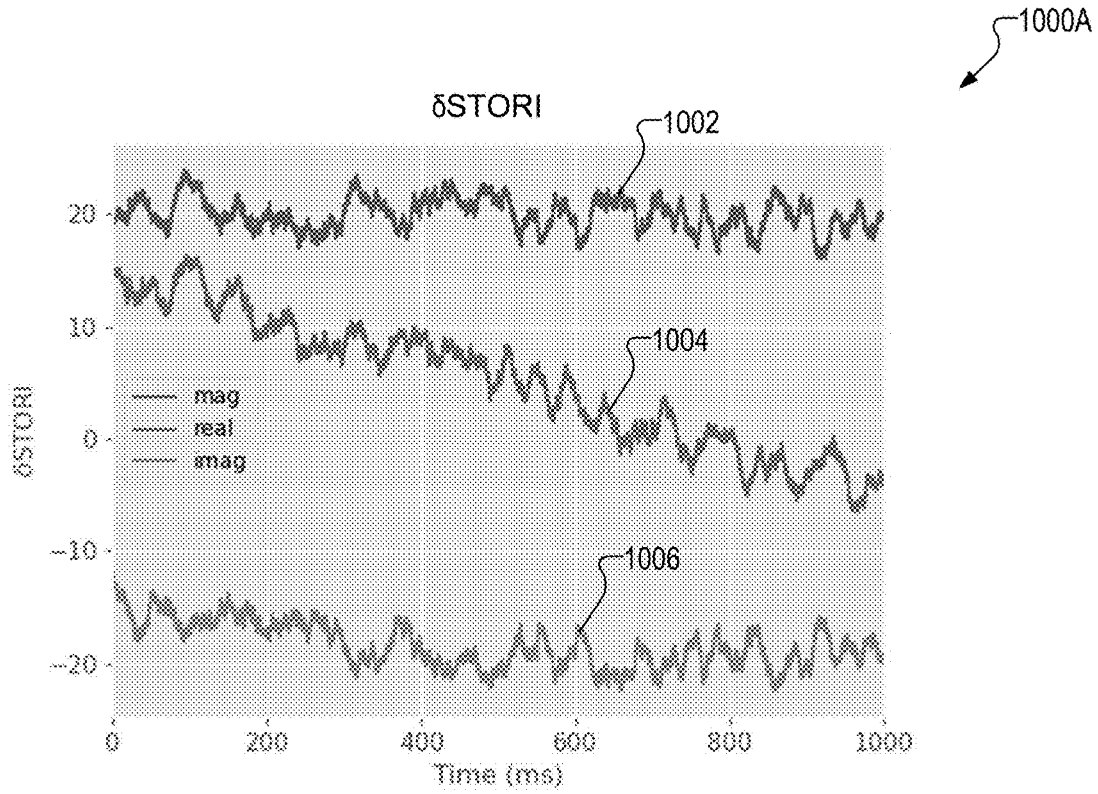
FIG. 10A shows an illustrative δSTORI plot representing δSTORI data.

The derivative of the STORI data of FIG. 9 is taken to generate δSTORI data. FIG. 10A shows an illustrative δSTORI plot 1000A representing δSTORI data that may be generated (e.g., at operation 802). δSTORI plot 1000A includes a curve 1002 representing $\delta STORI_{mag}$ data versus time, a curve 1004 representing $\delta STORI_{real}$ data versus time, and a curve 1006 representing $\delta STORI_{imag}$ data versus time. Although not shown, the δSTORI data may include a smooth curve fit to the data represented by curves 1002, 1004, and 1006. As shown in FIG. 10A, the real and imaginary components of the δSTORI data (curves 1004 and 1006, respectively) are not constant but change as the transient progresses because the source of the STORI amplitude is transferring between cosine and sine waves over time due to a mismatch in STORI frequency and the signal's true frequency (see FIG. 9).

Figure 10B:
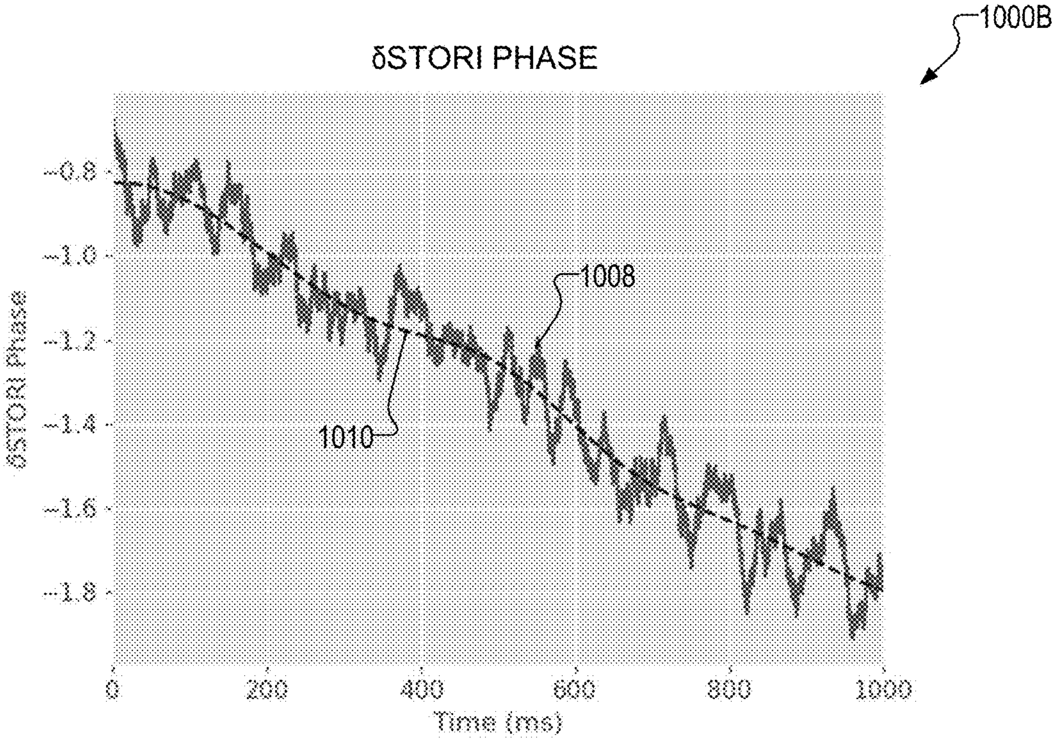
FIG. 10B shows an illustrative δSTORI phase plot representing δSTORI phase data that may be generated using the δSTORI data represented in FIG. 10A.

FIG. 10B shows an illustrative δSTORI phase plot 1000B representing δSTORI phase data that may be generated (e.g., at operation 804) using the δSTORI data represented in FIG. 10A. δSTORI phase plot 1000B includes curve 1008 representing δSTORI phase data versus time and a smooth δSTORI phase curve 1010 fitted to the δSTORI phase data. As shown, the δSTORI phase data has a consistent downward slope.

Figure 11:
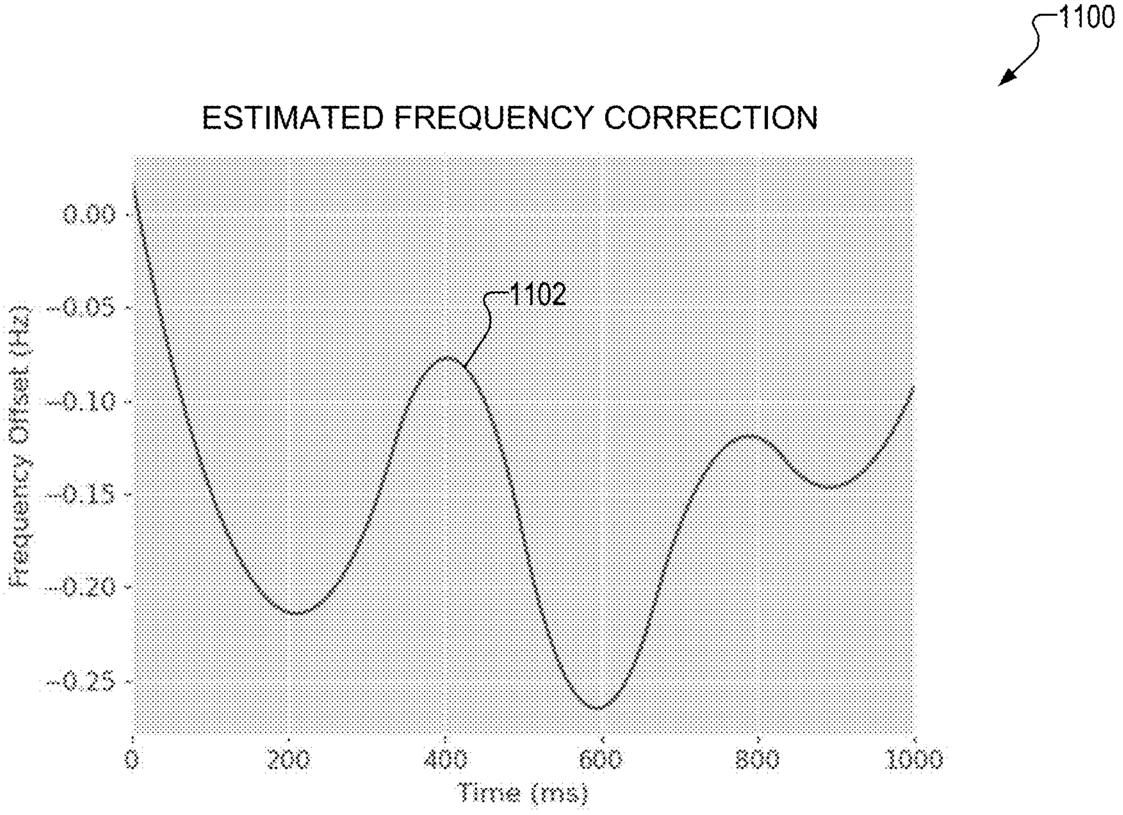
FIG. 11 shows an illustrative plot having a frequency correction curve representing the time-varying estimated frequency correction.

An estimated frequency correction as a function of time relative to the incorrectly centroided STORI frequency is generated (e.g., at operation 806) based on the δSTORI phase data (e.g., based on the fitted δSTORI phase curve 1008). As mentioned, the estimated frequency correction at any point in time is the time derivative of the δSTORI phase data (e.g., δSTORI phase curve 1010) shown in FIG. 10B and can be plotted as a function of time. FIG. 11 shows an illustrative plot 1100 having a frequency correction curve 1102 representing the time-varying estimated frequency correction.

Figure 12:
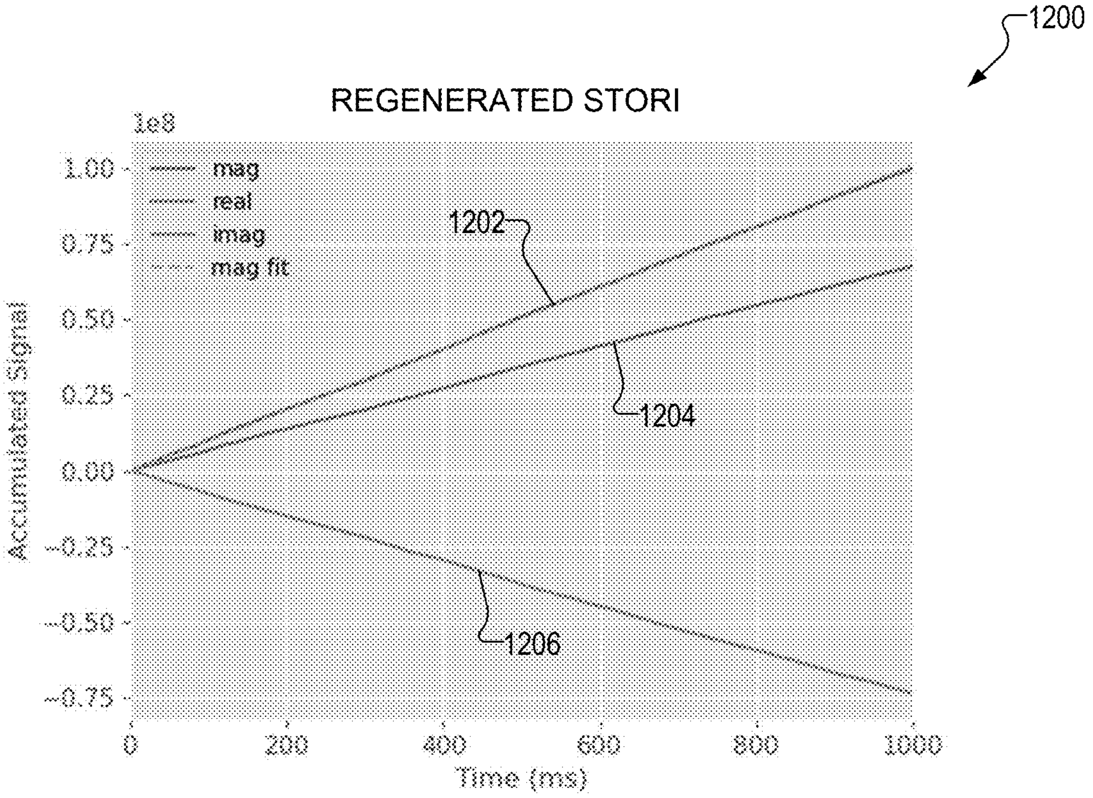
FIG. 12 shows an illustrative STORI plot representing the regenerated STORI data.

The STORI data is regenerated (e.g., at operation 708) in accordance with equations (1'), (2'), and (3) above using the time-varying frequency correction of FIG. 11. FIG. 12 shows an illustrative STORI plot 1200 representing the regenerated STORI data. STORI plot 1200 includes a curve 1202 representing $STORI_{mag}$ versus time, a curve 1204 representing $STORI_{real}$ versus time, and a curve 1206 representing $STORI_{imag}$ versus time. The slope of the regenerated STORI data of FIG. 12 (e.g., curve 1202) has an error of only 0.6%, as compared to the −2.1% error of the slope of curve 902 of the original STORI data. Thus, the slope accuracy and, hence, the ion charge estimation are improved by compensating for the frequency centroid error.

Figure 13A:
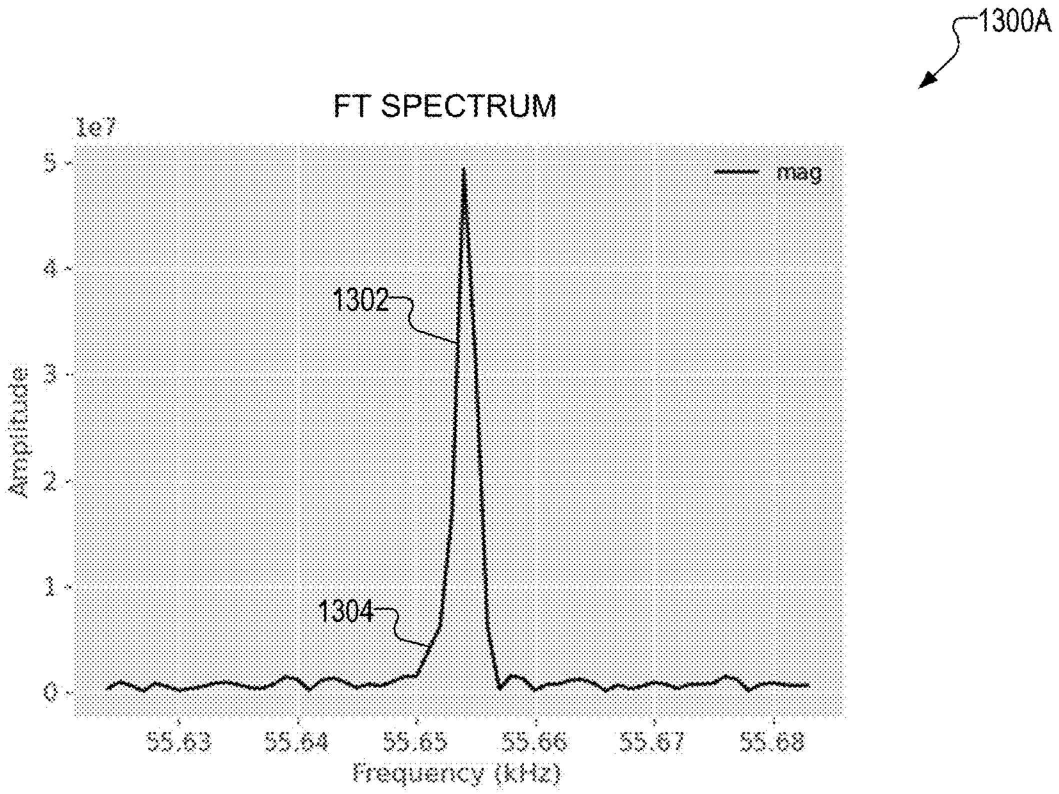
FIG. 13A shows an illustrative FT spectrum for a signal having a peak near 55 kHz.
Figure 13B:
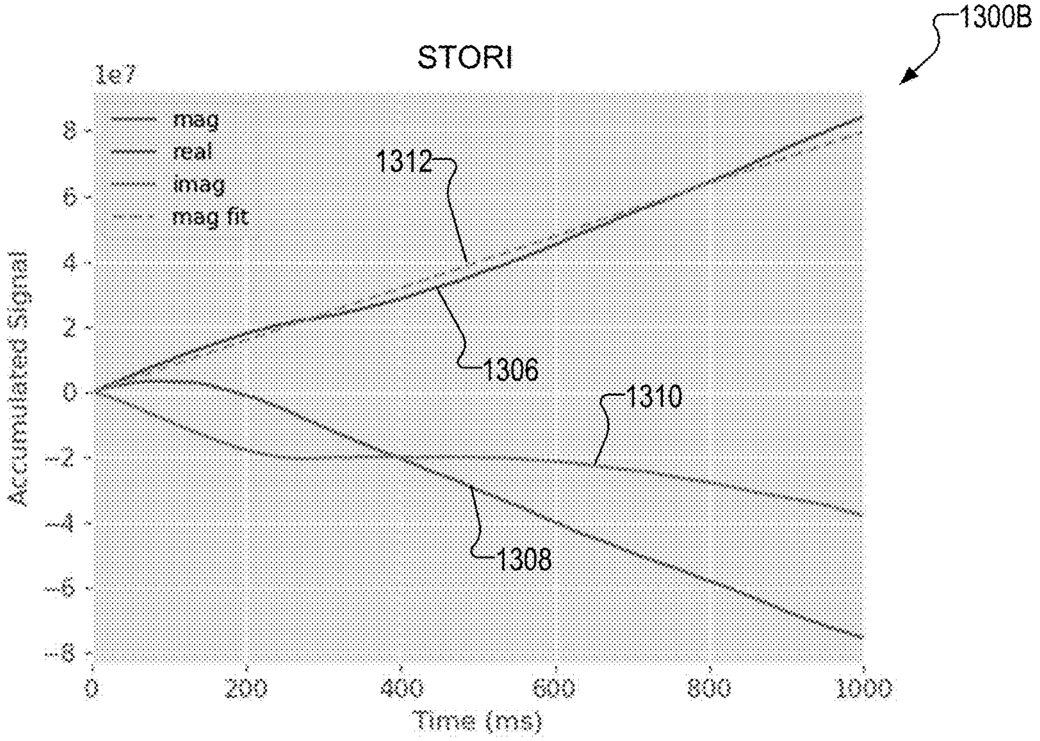
FIG. 13B shows an illustrative STORI plot representing STORI data generated for the signal represented in the FT spectrum of FIG. 13A.

In a second example, the modified STORI method is used to correct for frequency shift during the transient. As mentioned, an ion's frequency may shift during the transient due, for example, to desolvation or loss of neutral fragments. In this example, an acquired transient has a signal-to-noise ratio of about 60 and a +27 ppm frequency jump at 300 ms into the transient (to mimic a sudden m/z change). Note that, in this simulated example, the signal maintains continuity at the transition since the ion's z-position in the mass analyzer would not instantaneously shift when frequency changed. FIG. 13A shows an illustrative FT spectrum 1300A for a signal having a peak 1302 near 55 kHz. The FT spectrum peak 1302 has a front 1304 due to the signal being at a lower frequency in the first 300 ms of the transient before the frequency shift. FIG. 13B shows an illustrative STORI plot 1300B representing STORI data generated for the signal represented in FT spectrum 1300A. STORI plot 1300B includes a curve 1306 representing $STORI_{mag}$ versus time, a curve 1308 representing $STORI_{real}$ versus time, a curve 1310 representing $STORI_{imag}$ versus time, and a dashed-line ideal curve 1312 representing $STORI_{mag}$ as a function of time for a signal of fixed (non-shifting) frequency. As shown, the real and imaginary components (curves 1308 and 1310, respectively) are bent, indicating a frequency mismatch. The STORI signal, represented by curve 1306, has a clear curvature and has a fitted slope error of −20.3% relative to ideal curve 1312 for a theoretical transient with no frequency shift.

Figure 14A:
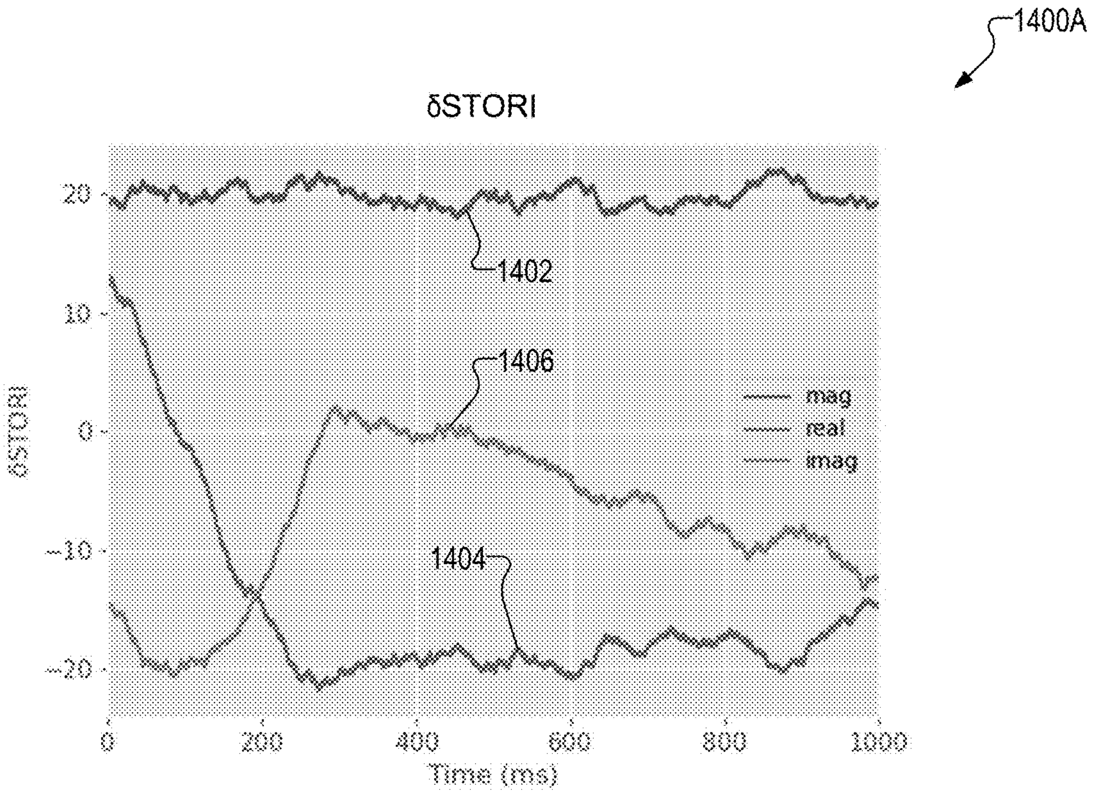
FIG. 14A shows an illustrative δSTORI plot representing δSTORI data.

The derivative of the STORI data of FIG. 13B is taken to generate δSTORI data. FIG. 14A shows an illustrative δSTORI plot 1400A representing δSTORI data that may be generated (e.g., at operation 802). δSTORI plot 1400A includes a curve 1402 representing $\delta STORI_{mag}$ data versus time, a curve 1404 representing $\delta STORI_{real}$ data versus time, and a curve 1406 representing $\delta STORI_{imag}$ data versus time. Although not shown, the δSTORI data may include a smooth curve fit to the data represented by curves 1402, 1404, and 1406 for further processing of δSTORI data. As shown in FIG. 14A, the real and imaginary components of the δSTORI data (curves 1404 and 1406, respectively) have a clear change in slope at approximately 300 ms due to a shift in the signal's frequency.

Figure 14B:
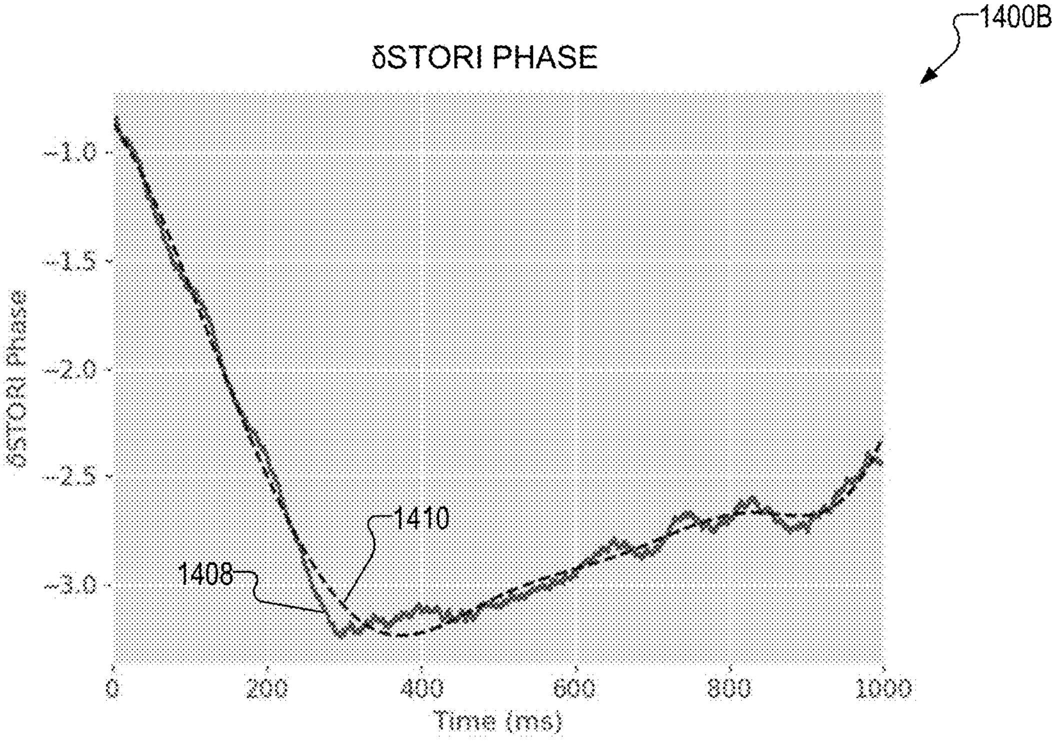
FIG. 14B shows an illustrative δSTORI phase plot representing δSTORI phase data that may be generated using the δSTORI data represented in FIG. 14A.

FIG. 14B shows an illustrative δSTORI phase plot 1400B representing δSTORI phase data that may be generated (e.g., at operation 804) using the δSTORI data represented in FIG. 14A. δSTORI phase plot 1400B includes a curve 1408 representing δSTORI phase data and a smooth δSTORI phase curve 1410 fitted to the δSTORI phase data. As shown in FIG. 14B, the δSTORI phase data has two apparent linear sections that transition at approximately 300 ms. The signs and magnitudes of their slopes indicate that the centroided STORI frequency is higher than the signal frequency in the 0-300 ms range (negative slope) and lower than the signal frequency in the 300-1000 ms range (positive slope), and that the magnitude of the frequency error is larger in the 0-300 ms range (steeper slope) than it is in the 300-1000 ms range (shallower slope).

Figure 15A:
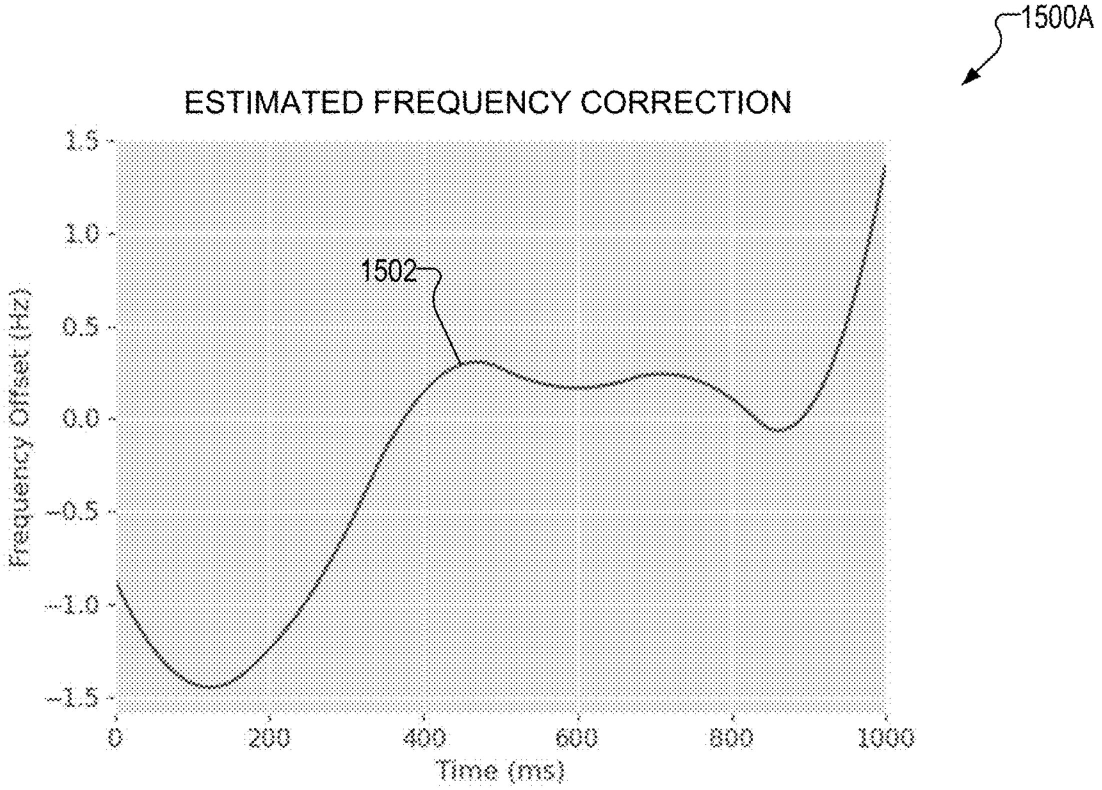
FIG. 15A shows an illustrative plot having a frequency correction curve representing the time-varying estimated frequency correction.

An estimated frequency correction as a function of time relative to the centroided STORI frequency is generated (e.g., at operation 806) based on the δSTORI phase data (e.g., based on the fitted δSTORI phase curve 1410). As mentioned, the estimated frequency correction at any given point in time is the time derivative of the δSTORI phase data (e.g., δSTORI phase curve 1410) and can be plotted as a function of time. FIG. 15A shows an illustrative plot 1500A having a frequency correction curve 1502 representing a time-varying estimated frequency correction.

Figure 15B:
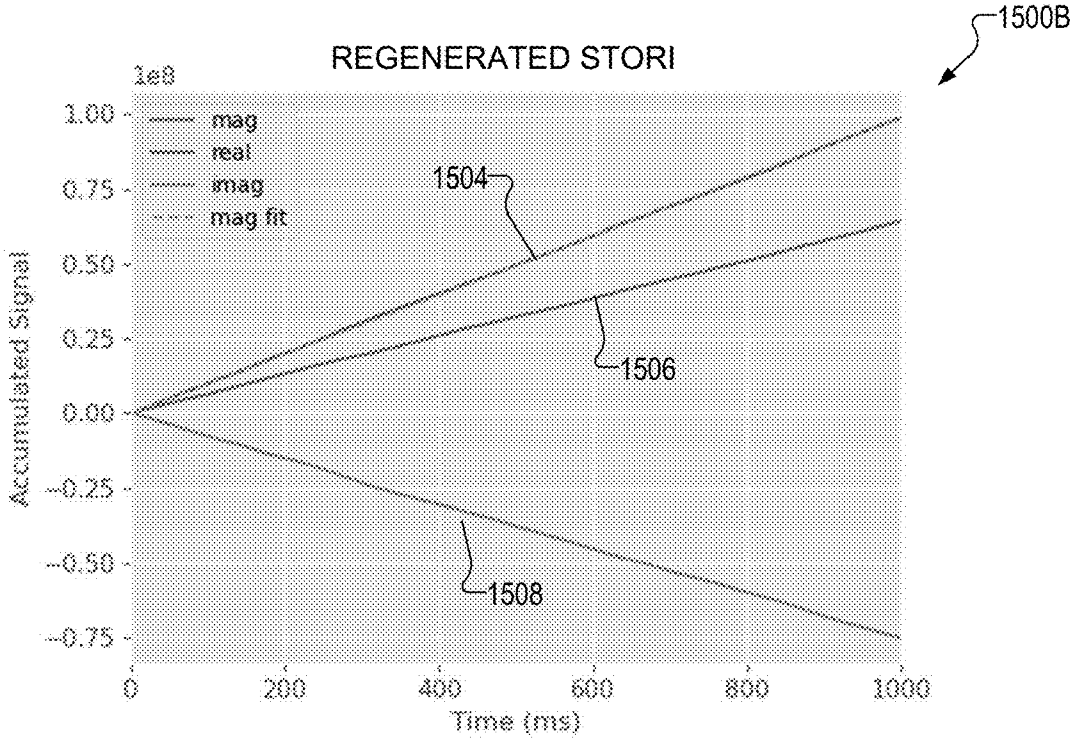
FIG. 15B shows an illustrative STORI plot representing the regenerated STORI data.

The STORI data is regenerated (e.g., at operation 708) in accordance with equations (1'), (2'), and (3) above using the time-varying frequency correction of FIG. 15A. FIG. 15B shows an illustrative STORI plot 1500B representing the regenerated STORI data. STORI plot 1500B includes a curve 1504 representing $STORI_{mag}$ versus time, a curve 1506 representing $STORI_{real}$ versus time, and a curve 1508 representing $STORI_{imag}$ versus time. The slope of the regenerated STORI data of FIG. 15B (e.g., curve 1504) has an error of only −1.0%, as opposed to the −20.3% error of the slope of curve 1306 of the original STORI data. Thus, the slope accuracy and, hence, ion charge estimation are dramatically improved by compensating for the shifting frequency.

In the modified STORI method, the phase buildup of the shifted signal may be tracked as the transient progresses, constantly comparing it to the phase that the current time point's frequency would accumulate in the same amount of time. If there is a disconnect between these two phase buildups, the phase of the reference sine and cosine waves could be adjusted accordingly before calculating the sine and cosine correlations to prevent phase discontinuities that eliminate any improvements that the frequency correction could achieve.

It will be recognized that the modified STORI method may be performed to correct frequency mismatches even when there are multiple frequency shifts during the transient. Furthermore, the modified STORI method may be performed when there are both a centroided frequency error and one or more frequency shifts during the transient.

Figure 16:
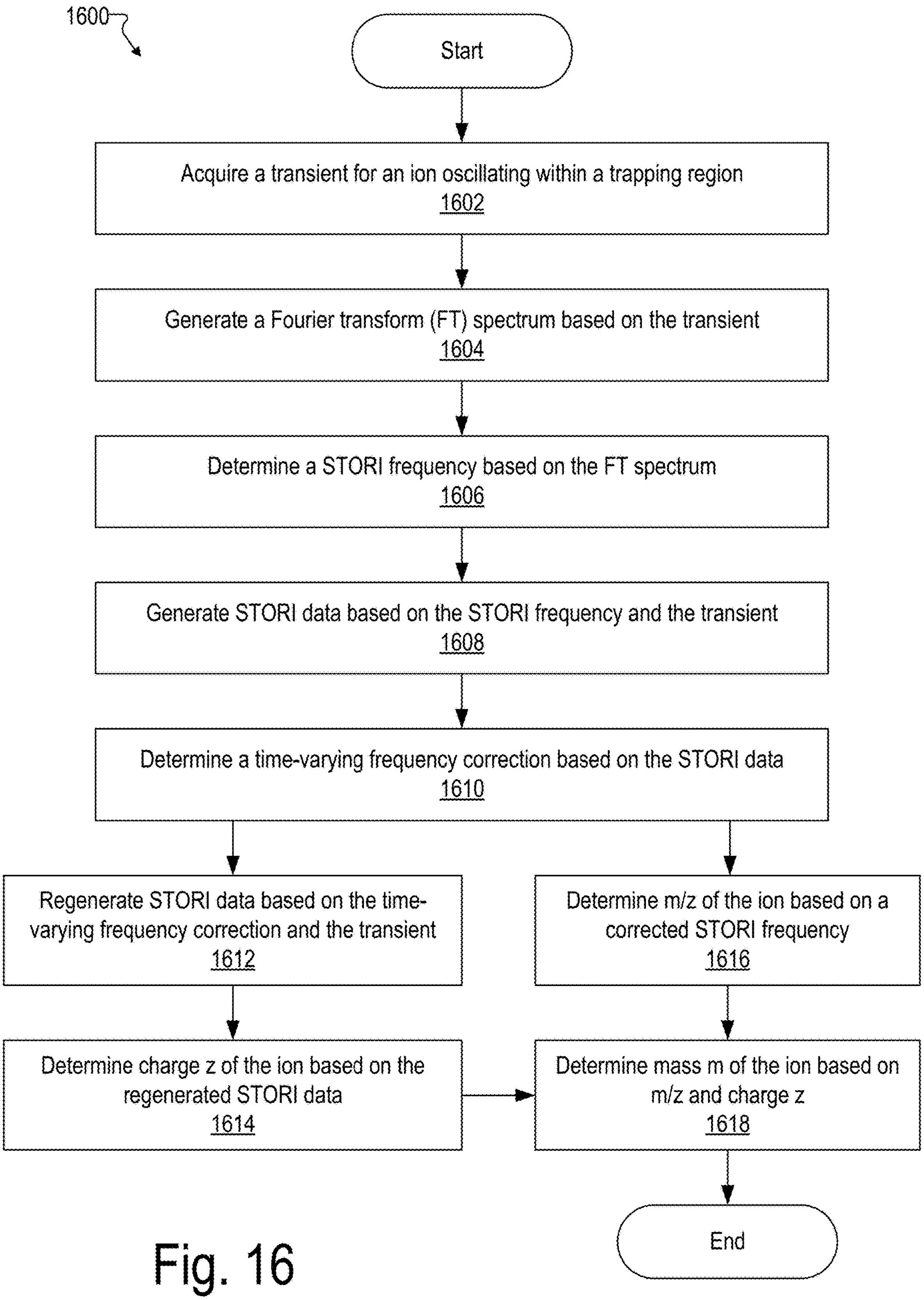
FIG. 16 shows an illustrative method of determining a mass of an ion using the modified STORI method.

FIG. 16 shows an illustrative method 1600 of determining a mass of an ion using the modified STORI method. While FIG. 16 shows illustrative operations according to one embodiment, other embodiments may omit, add to, reorder, and/or modify any of the operations shown in FIG. 16.

At operation 1602, a transient is acquired for an ion oscillating within a trapping region. The transient is time domain data representative of a time-varying signal produced by a current induced on a detector by the oscillatory motion of the ion within the trapping region.

At operation 1604, a Fourier transform (FT) spectrum is generated based on the transient. The FT spectrum may be generated in any suitable way, such as by performing a fast Fourier transform of the transient to transform the time domain data to frequency domain data. The FT spectrum is frequency domain data and has a peak indicative of a frequency of the oscillatory motion of the ion within the trapping region.

At operation 1606, a STORI frequency is determined based on the FT spectrum. The STORI frequency is the estimated frequency of the oscillatory motion of the ion within the trapping the region. The STORI frequency may be determined in any suitable way. In some examples, the STORI frequency is determined by centroiding the peak in the FT spectrum, such as by fitting a parabola or other curve to the points of the FT spectrum peak or by performing a line search to optimize the maximum of the FT spectrum peak.

At operation 1608, STORI data for an FT spectrum peak is generated based on the transient and the STORI frequency determined at operation 1606. The STORI data is generated in accordance with equations (1), (2) and (3) above. The STORI data represents the cosine correlations ($STORI_{real}(t_n)$), sine correlations ($STORI_{imag}(t_n)$), and optionally the magnitude of the complex number ($STORI_{mag}(t_n)$).

At operation 1610, a frequency correction as a function of time is determined based on the STORI data. The frequency correction as a function of time is determined as described herein (e.g., as described in method 800).

At operation 1612, the STORI data is regenerated based on the frequency correction to correct for any deviations between the STORI frequency determined at operation 1606 and the signal's true frequency during the transient. The STORI data is regenerated as described above (e.g., as in operation 708) in accordance with equations (1'), (2'), and (3) using a time-varying STORI frequency $\omega(t_n)$ determined at operation 1606 based on the previously determined STORI frequency and the frequency correction.

At operation 1614, the charge z of the ion is determined based on the regenerated STORI data. For example, as described above, the charge z of the ion is determined based on a correlation of the slope of the regenerated STORI signal ($STORI_{mag}(t_n)$) during the lifetime of the ion to charge state.

At operation 1616, m/z of the ion is determined based on a corrected STORI frequency based on a correlation between frequency and m/z. If the signal's true frequency is not shifting but the centroided STORI frequency is incorrect, the frequency correction should be constant (see, e.g., FIG. 6), and hence m/z should be constant throughout the transient. If, however, the signal's true frequency shifts during the transient (e.g., due to a decay event), m/z for the ion will also vary with time. Accordingly, m/z of the ion may be determined at any point in time based on the time-varying STORI frequency $\omega(t_n)$.

At operation 1618, the mass m of the ion is determined based on the m/z and charge z of the ion. If m/z for the ion is time-varying, the mass m of the ion is also time-varying and mass m may be determined for any point in time during the transient.

In the modified STORI method, separate running tallies are kept for the cosine and sine correlations as the transient progresses (real and imaginary components, respectively). The separate running tallies are represented as $STORI_{real}$ and $STORI_{imag}$. The magnitude of the complex number (the value of the STORI signal ($STORI_{mag}$)) is then plotted at each point, and the slope of the time-varying magnitude is used to determine lifetime and charge state of the ion. As has been explained, with this approach, the running tally of magnitude can get distorted when the actual signal transfers between cosine and sine waves (e.g. due to frequency mismatches, as shown and described with reference to FIG. 3B).

In an alternative STORI method for determining charge state z of an ion, also referred to herein as the "frequency insensitive" STORI method, a running tally of the STORI magnitude is kept (as opposed to separate running tallies of the sine and cosine correlations in the modified STORI method) while the real and imaginary STORI values at each point in time are discarded. The STORI magnitude ($STORI_{mag}$) for each point in time is obtained based on the sine and cosine correlations for that time, and the obtained STORI magnitude is added to the running tally of the STORI magnitude. The STORI magnitude is determined in accordance with the following equations (6), (7), and (8):

$$STORI_{real}(t_n) = S(t_n) * \cos(\omega * t_n) \tag{6}$$

$$STORI_{imag} = -S(t_n) * \sin(\omega * t_n) \tag{7}$$

$$STORI_{mag}(t_n) = \sqrt{STORI_{real}(t_n)^2 + STORI_{imag}(t_n)^2} + STORI_{mag}(t_{n-1}) \tag{8}$$

In equations (6), (7), and (8), ($t_0$, $t_1$, . . . $t_n$) represents a sequence of time points at a fixed interval of $\Delta t$, such that $\omega * \Delta t << 1$.

Figure 17:
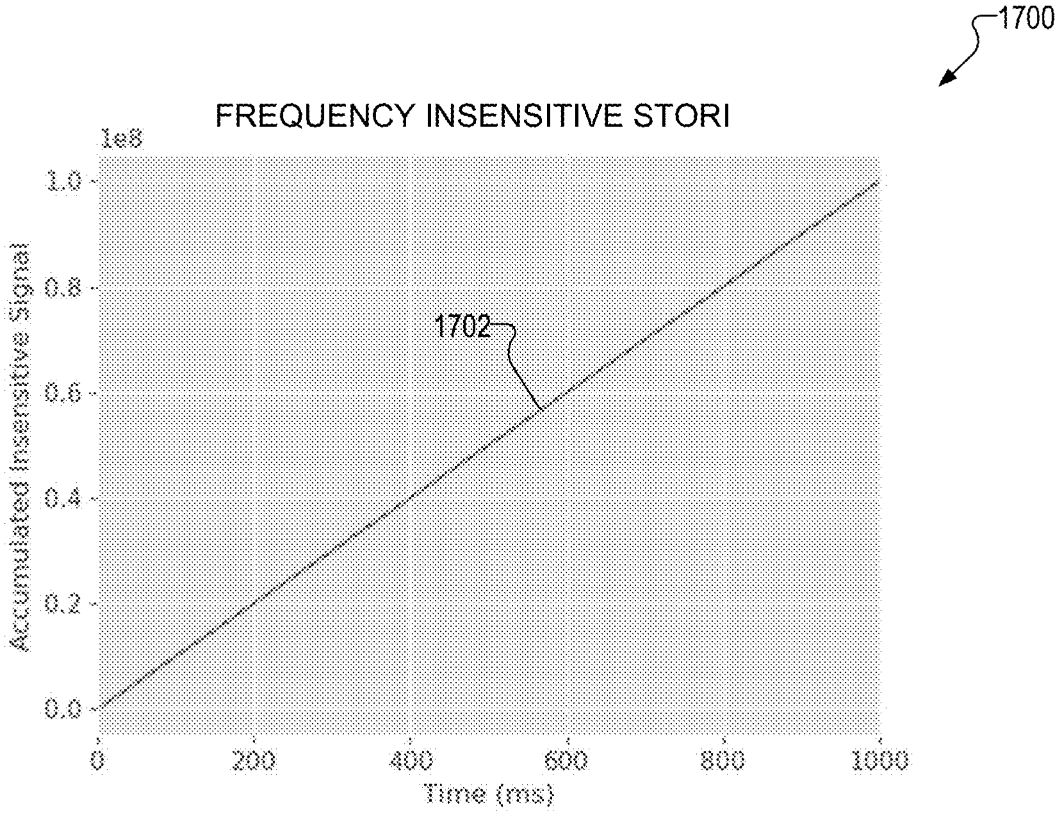
FIG. 17 shows an illustrative STORI plot generated according to a frequency insensitive STORI method.

FIG. 17 shows an illustrative STORI plot 1700 generated according to the frequency insensitive STORI method. STORI plot 1700 represents simulated STORI data for a frequency around 55 kHz. STORI plot 1700 includes a curve 1702 representing $STORI_{mag}$ as a function of time. The slope of curve 1702 is proportional to the ion's charge state. Similar to the frequency correction shown by the modified STORI method, the frequency insensitive STORI method is more tolerant of discrepancies between the STORI frequency and the signal's true frequency than the traditional STORI method. However, the frequency insensitive STORI method may also accumulate noise at a faster rate than the modified STORI method.

In the examples described above, the modified STORI method and the frequency insensitive STORI method are used to determine m/z, charge z, and mass m of a single ion oscillating within a trapping region of a mass analyzer. However, the modified STORI method and the frequency insensitive STORI method may be used to determine m/z, charge z, and mass m of each ion in a population of ions simultaneously trapped and oscillating within a trapping region of a mass analyzer. In such examples, the modified STORI method or the frequency insensitive STORI method is performed for each peak in the FT spectrum peak generated from the transient.

In some situations in which multiple ions are mass analyzed simultaneously, the interference between close neighboring signals in the FT spectrum results in STORI plots that have a stairstep pattern that are difficult to interpret with a linear trend. Hence, it can be difficult to accurately determine charge for the ions based on the STORI plots. These interfering signals may be addressed in various ways. In some examples, any signals that have neighboring signals within the FT spectrum closer than a threshold amount (e.g., 100 Hz, 50 Hz, 25 Hz, etc.) are filtered out and are not used in the modified STORI method.

In other examples, the signal of each individual FT peak within an FT spectrum interval is obtained by calculating each individual FT peak signal and subtracting the influence of all other FT peaks from the signal of the FT spectrum interval. This method finds time-resolved amplitudes and time-resolved oscillation frequencies from complex FT spectra produced by multiple different ion species simultaneously trapped within a trapping region. The time-resolved amplitude of the signal corresponding to each ion is proportional to the charge state of the ion at each point in time and the time-resolved frequency correlates to the m/z of the ion at each point in time. An illustrative implementation of this method will now be described with reference to FIG. 18.

Figure 18:
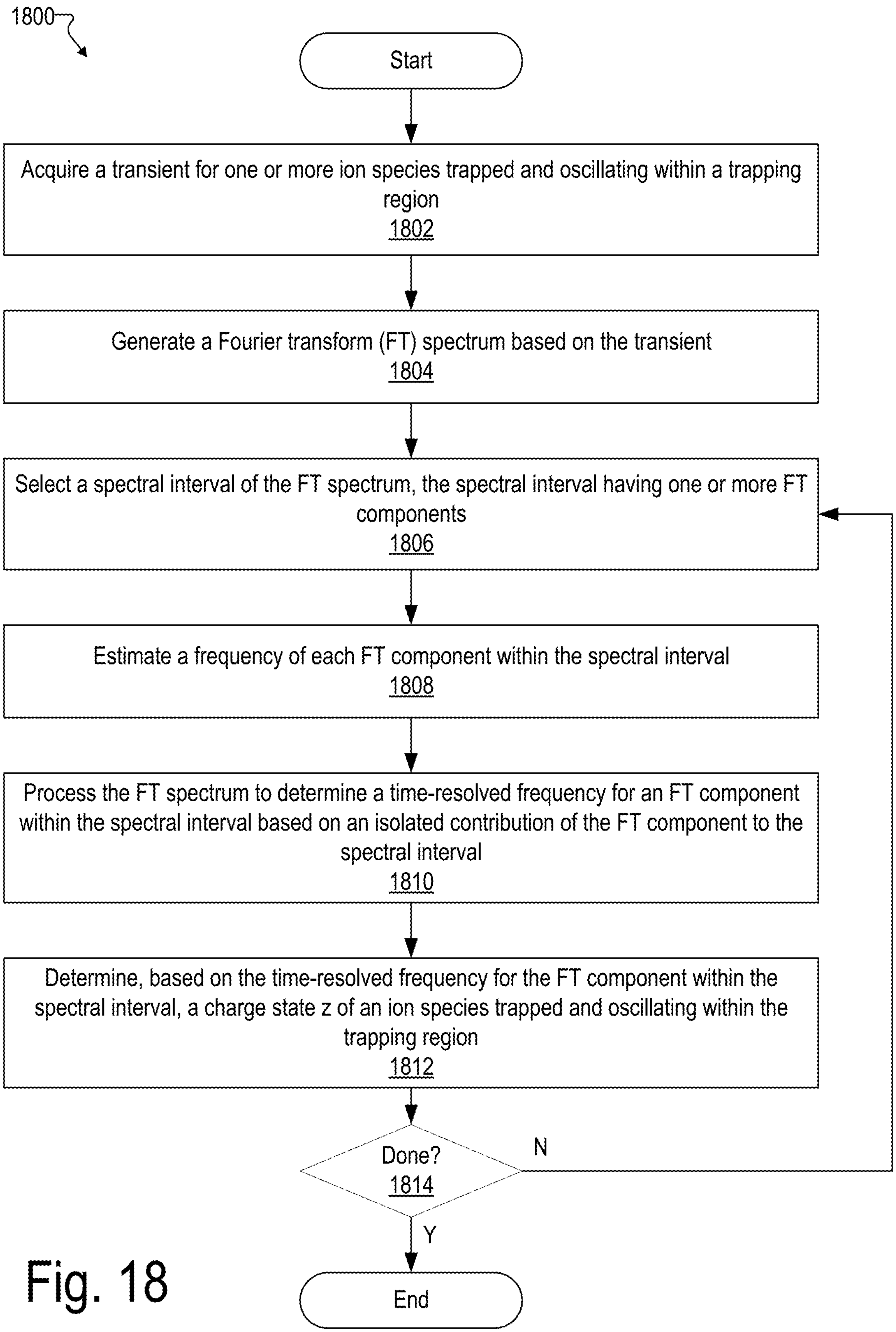
FIG. 18 shows an illustrative method of determining a time-resolved frequency for FT components within an FT spectrum and determining a charge state of ions represented by the FT components.

FIG. 18 shows an illustrative method 1800 of determining a time-resolved frequency for FT components within an FT spectrum and determining a charge state of ions represented by the FT components. While FIG. 18 shows illustrative operations according to one embodiment, other embodiments may omit, add to, reorder, and/or modify any of the operations shown in FIG. 18.

At operation 1802, a transient is acquired for one or more ion species simultaneously trapped and oscillating within a trapping region. The transient is time domain data (signal Sn) representative of a time-varying signal produced by currents induced on a detector by the oscillatory motion of the population of ions within the trapping region. In some examples, the trapping region is a trapping region of an orbital electrostatic ion trap mass analyzer (e.g., an Orbitrap™ mass analyzer).

At operation 1804, a Fourier transform (FT) spectrum is generated based on the transient. For example, a complex-valued FT spectrum $C_n$ is generated by performing a Fast Fourier Transform (FFT) of the measured transient without apodization or zero-padding.

At operation 1806, a spectral interval of the FT spectrum is selected for processing, wherein the selected spectral interval includes one or more FT components (e.g., peaks). The spectral interval of the FT spectrum is divided into a plurality of bins (FT bins) of fixed width. In some examples, the width of each FT bin is the reciprocal of the acquisition time for the transient. The selected spectral interval includes K FT bins and may be represented by the expression $c_k = \{C_{n0}, \ldots, C_{n0+K}\}$. In some examples, the selected spectral interval includes from K=32 to K=1024 FT bins, although any other suitable number may be used. Preferably, K is a power of two to facilitate FFT operations performed later in method 1800. The spectral interval is small relative to the full width of the FT spectrum to facilitate processing. However, the spectral interval may be large or may span the full width of the FT spectrum. The FT components included in the spectral interval are local maxima of $|C_n|$ above noise.

At operation 1808, a frequency of each of the FT components within the spectral interval is estimated. The frequency may be estimated in any suitable way. In some examples, the frequency of each FT component is estimated as the maximum of the FT spectrum amplitude. Exact centroiding is not necessary, as it is sufficient to find an FT bin with the maximum amplitude $|c_k|$ for each FT component, which corresponds to the frequency precision up to one FT bin. Suppose that P peaks are found with estimated centroids $f^{(p)}$ (p=1 . . . P), where the frequencies are defined here in FT bins. Integer values of $f^{(p)}$ would correspond to frequencies on which the discrete Fourier Transform is defined.

At operation 1810, the FT spectrum is processed to determine a time-resolved frequency for one or more FT components within the spectral interval based on an isolated contribution of the one or more FT components to the spectral interval. An isolated contribution of the one or more FT components excludes the contribution of all other FT components (or all other FT components having a signal level greater than a threshold value) within the spectral interval. An illustrative method of performing operation 1810 will be described in more detail below with reference to FIG. 19.

At operation 1812, a charge state z of one or more ion species corresponding to the one or more FT components is determined based on the time-resolved frequency of the one or more FT components within the spectral interval. The charge state may be determined in any suitable way. In some examples, the charge state is determined based on the traditional STORI methods or the modified STORI concepts described above. For example, STORI data may be generated in accordance with equations (1'), (2'), and equation (3) using the time-resolved frequency determined at operation 1810 as the time-resolved STORI frequency $\omega(t_n)$. Other methods of determining the charge state z based on the time-resolved frequency will be described in more detail below.

At operation 1814, it is determined whether processing of method 1800 is completed. In some examples, processing of method 1800 is complete when the full FT spectrum, or a range of interest of the FT spectrum, has been processed at operations 1806 to 1812. If processing is determined to be completed, method 1800 terminates. If processing is determined to not be complete, processing returns to operation 1806 to select a next spectral interval of the FT spectrum for processing. The next spectral interval may have the same or a different spectral width. In some examples, spectral intervals that do not include any FT components above a threshold level (e.g., above a noise level or other minimum level) are not analyzed.

Figure 19:
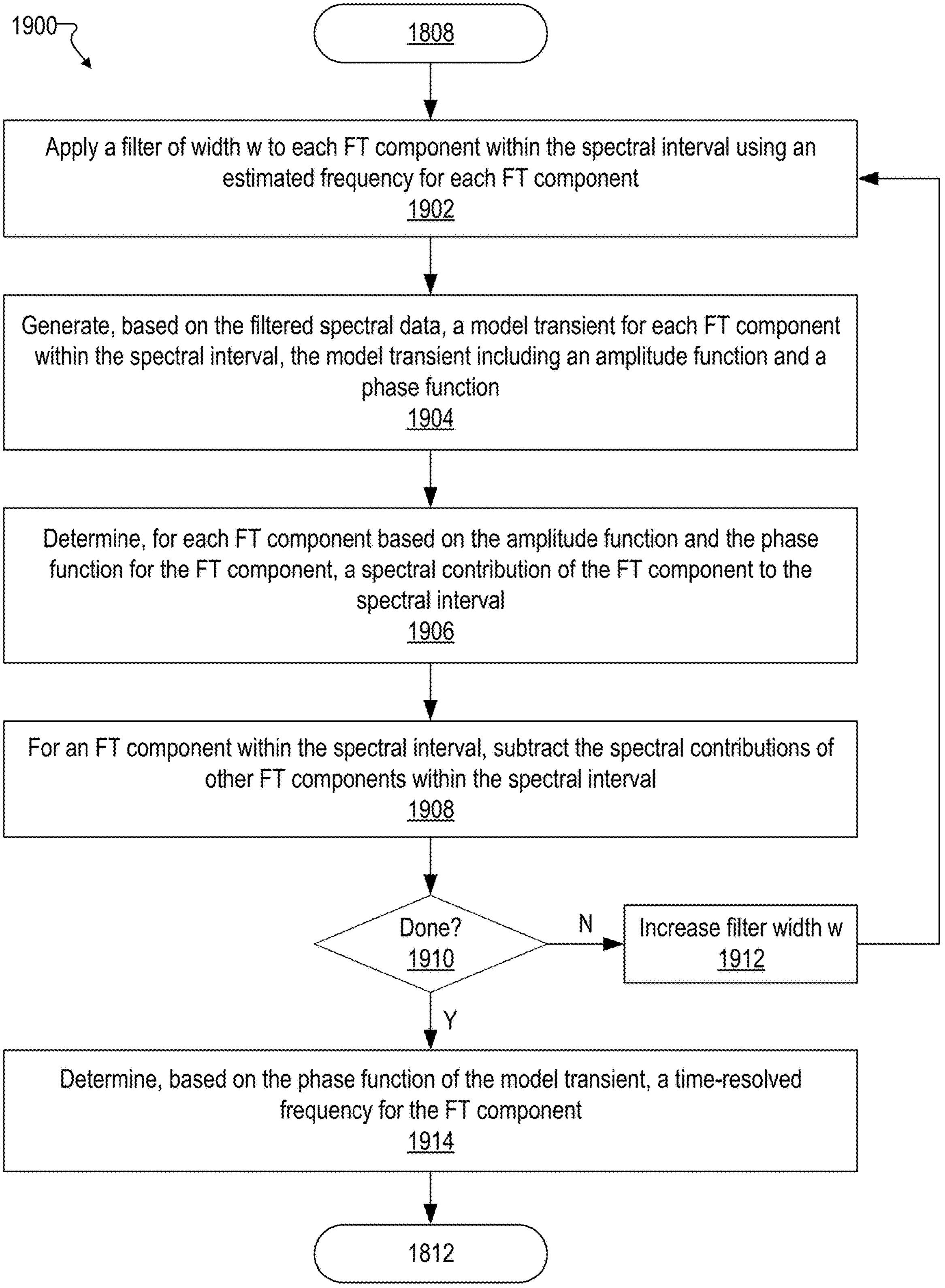
FIG. 19 shows an illustrative method of performing operation 1810 of the method of FIG. 18.

FIG. 19 shows an illustrative method 1900 of performing operation 1810. While FIG. 19 shows illustrative operations according to one embodiment, other embodiments may omit, add to, reorder, and/or modify any of the operations shown in FIG. 19.

At operation 1902, for each FT component p included in the spectral interval, a filter (e.g., a bell-function filter) centroided at the estimated frequency $f^{(p)}$ is applied as follows:

$$c_k^{(p)} := c_k \times \rho\left(k - f^{(p)}, w\right)$$

where the parameter w is the filter's width. For example, a bell function may be a Gaussian function given by the following expression:

$$\rho_k^{(w)} = \exp\left\{-\frac{\left(k - f^{(p)}\right)^2}{2w^2}\right\}$$

The filter width w is selected narrow enough to suppress FT components other than the selected FT components. In some optional examples, each FT component is assigned an individual filter width $w^{(p)}$, and the initial value of filter width $w^{(p)}$ is chosen based on a minimum spectral distance to the nearest adjacent FT components.

At operation 1904, a model transient for each filtered FT component is generated. The model transient for each FT component includes an amplitude function and a phase function for the FT component. The model transients are generated by performing an inverse Fourier Transform (iFT), such as an inverse Fast Fourier Transform (iFFT) on the filtered spectral data $$c_k^{(p)}$$

for each FT component, with the central frequency shifted to the corresponding estimated centroid:

$$s_t^{(p)} = iFFT\left\{c_k^{(p)}\right\} \times e^{2\pi i\left(n_0 - f^{(p)}\right)\frac{t}{K}}$$

where the discrete time index t runs from zero to K−1. Optionally, the filtered spectra $$c_k^{(p)}$$

are zero-padded Q times, which results in interpolating on a denser time grid t=0 . . . QK−1.

Sequences of absolute values of $$\left|s_t^{(p)}\right|$$

are constructed from the iFT. Piecewise constant amplitude functions $$a^{(p)}(t) \approx \left|s_t^{(p)}\right|$$

are fitted to the sequences of absolute values for each FT component. The piecewise constant amplitudes $a^{(p)}$ are preliminarily defined through the absolute values of the iFT $$a^{(p)} \approx \left|s_t^{(p)}\right|$$

as the phases are yet unknown. The piecewise constant amplitude functions $a^{(p)}(t)$ model the evolution of signal intensities for every FT component during the acquisition period. An illustrative fitting method for the amplitude functions is described below in more detail.

A phase function $\varphi_p(t)$ is fitted for each FT component. Preferably, the phase function is fitted in the form of a piecewise polynomial whose breakpoints are the same as the breakpoints determined for the piecewise constant amplitude function $a^{(p)}(t)$ at operation 1904. An illustrative fitting method for the phase functions is described below in more detail. Optionally, the piecewise constant amplitude functions are re-calculated as $$a^{(p)}(t) \approx \mathrm{Re}\left\{s_t^{(p)}\exp(-i\varphi_p(t))\right\}$$

using a projection of $$s_t^{(p)}$$

on the estimated phases. Contrary to the initial definition of $a^{(p)}$ through the absolute values of $$s_t^{(p)},$$

this correction eliminates any positive bias related to noise.

At operation 1906, a spectral contribution $$d_k^{(p)}$$

of each FT component to the spectral interval $C_k$ is determined. In some examples, the spectral contributions are determined by applying the direct FFT to the model transients (obtained at operation 1904) using the amplitudes and phases determined at operation 1904.

At operation 1908, for each FT component, the spectral contributions of the other FT components within the spectral interval are subtracted from $C_k$ as follows:

$$c_k^{(p)} = c_k - \sum_{q \neq p} d_k^{(p)}$$

The spectra obtained by this subtraction operation are referred to herein as corrected spectra.

At operation 1910, it is determined whether processing of method 1900 is completed. If processing of method 1900 is not completed, method 1900 proceeds to operation 1912 and then returns to operation 1902 to perform another iterative loop of operations 1902 to 1910. At operation 1912, the width w of the bell function is increased. If processing of method is completed, method 1900 proceeds to operation 1914. An iterative loop comprises consecutive execution of operations 1902 to 1912 until it is determined at operation 1910 that processing is complete (e.g., that an iterative loop condition is satisfied). However, operations 1910 and 1912 are optional and can be omitted in some examples, such as when the spectral interval includes only one FT component.

Method 1900 may be determined to be complete based on satisfaction of a condition (e.g., an iterative loop condition). In some examples, the condition includes performing a threshold number of iterative loops. In some examples, the number of iterative loops ranges from 1 to 20 with gradually increasing filter widths w. In other examples, processing of method 1900 continues until width w of the bell function reaches a threshold value. In other examples, processing of method 1900 continues until the temporal resolution satisfies a condition (e.g., reaches a threshold value). The temporal resolution on each iteration is restricted by the value $\delta t \sim 1/w$ in accordance with the spectral uncertainty principle. On the first iteration, the filter width is chosen small enough to avoid interference between neighboring FT components. Preferably, w is smaller than the minimal distance between $f^{(p)}$ and $f^{(p+1)}$. Therefore, the temporal resolution of the filtered iFFT transients $$s_t^{(p)}$$

is limited. On the following iterations, the filter width w is gradually increased so that the filter bands may overlap and incorporate other FT components. Nevertheless, the peak interference stays suppressed due to subtraction of spectra of other FT components assessed on previous iterations.

In the case that the spectral interval has only one FT component, which is P=1, only a single execution of operations 1902 to 1908 may be used with a wide enough filter function or without filtering, and thus operations 1910 and 1912 may be omitted.

At operation 1914, a time-resolved frequency for one or more FT components within the spectral interval is determined based on the phase function of the model transient for the one or more FT components. As mentioned, the model amplitudes for FT components are assessed as piecewise constant amplitude functions of time $a_p(t)$ and the model phases $\varphi_p(t)$ are determined on each interval of the piecewise constant amplitude functions. Breakpoints between the constant values of $a_p(t)$ are interpreted as the moments of time when an ion enters or leaves the ensemble of trapped ions. The signal amplitudes between adjacent breakpoints are interpreted as a number of elementary charges present in a particular FT component at a particular portion of the signal acquisition time. For example, the signal amplitude may be proportional or indicative of the ion charge state based on a known or predefined relation between amplitude and charge state. An intensity at the noise level is interpreted as absence of an ion on a certain time interval, e.g. when the ion has been fragmented.

In the case that the signal-to-noise ratio is small, the signal amplitudes estimated from the absolute values of the iFT transients $$s_t^{(p)}$$

are somewhat exaggerated in the presence of noise and a correction procedure as described below in more detail may be applied to remove the bias. The signal amplitudes calculated based on the projection of $$s_t^{(p)}$$

on an estimated phase are free of the noise-related bias and the correction procedure may be omitted.

The model phases $\varphi_p(t)$ are the source of information about time-resolved oscillation frequencies, which may differ from the original estimated frequencies $f^{(p)}$. The time-resolved frequency $F^{(p)}$ at time t for an FT component is determined based on a time-resolved frequency correction (which is based on a time-derivative of the phase function) that is applied to the estimated frequency of each FT component as follows:

$$F^{(p)}(t) = f^{(p)} + \frac{1}{2\pi}\frac{d\varphi_p}{dt}$$

In order to account for the frequency drift, the phases $\varphi_p(t)$ are fitted with smooth non-linear functions, e.g., piecewise polynomials of the second or higher order.

As mentioned above, in some examples of operation 1812 the charge state z of an ion species is determined based on the traditional STORI method or the modified STORI method described above using the time-resolved frequency obtained at operation 1912. In other examples, the charge state of an ion species is determined based on the corresponding piecewise constant amplitude function $a_p(t)$. As explained above, the signal amplitudes of a piecewise constant amplitude function $a_p(t)$ between adjacent breakpoints for an FT component are proportional or otherwise related (e.g., based on a known or empirically-established relation)

to the charge state of the ion species represented by the particular FT component at a particular portion of the signal acquisition time.

An illustrative method of fitting a piecewise constant amplitude function to a sequence of real data points $$a[t] = |s_t^{(p)}|,$$

as referenced in operation 1904, will now be described. The fitting method is based on estimation of breakpoints $h_i$ that deliver a minimum to the sum of dispersions on the intervals between them. The penalty function is calculated as $$R(h_1, \ldots h_I) = \sum_{i=1}^{I+1} (h_i - h_{i-1})\ DISP\,(a[h_{i-1}] \ldots a[h_i - 1])$$

where the first interval always starts from $h_0=0$, the last interval ends at $h_{I+1}=K$. With the cumulative sum $$A[h] = \sum_{k=0}^{h-1} a[k]$$

calculated, the penalty function becomes $$R = \sum_{k=0}^{K-1} a[k]^2 - \sum_{i=1}^{I+1} \frac{(A[h_i] - A[h_{i-1}])^2}{h_i - h_{i-1}}$$

As the first sum is constant, the breakpoints $h_1<h_2< \ldots <h_I$ are sought to maximize the second sum.

For a fixed set of breakpoints, the amplitudes on the intervals are assessed as $$\bar{a}_i = a(h_{i-1} \le t < h_i) = \frac{A[h_i] - A[h_{i-1}]}{h_i - h_{i-1}}$$

The iterative search for $h_i$ starts from one breakpoint (i=1). Then the number of breakpoints is increased by one until one of the two conditions are met:

a) at least two breakpoints are closer than an expected time resolution with a current value of the filter width (for Gaussian filter functions with the parameter w, the condition may look like $h_{i+1}-h_i<K/2w$), or b) the average amplitudes on two adjacent intervals differ less than the noise level $|\bar{a}_{i-1}-\bar{a}_i|<\text{noise}$.

Figure 20A:
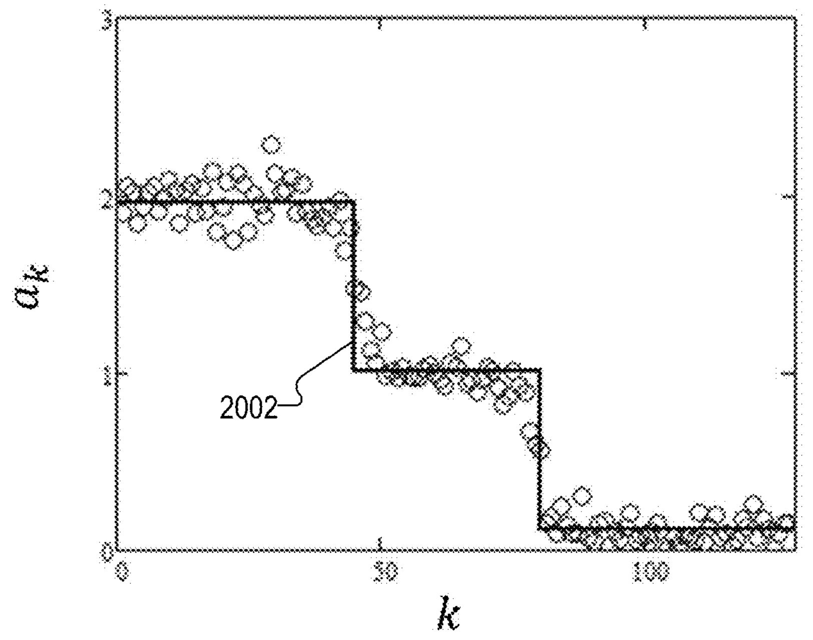
FIG. 20A shows an example of a sequence of absolute values of amplitude of a model transient and a fitted piecewise constant amplitude function.
Figure 20B:
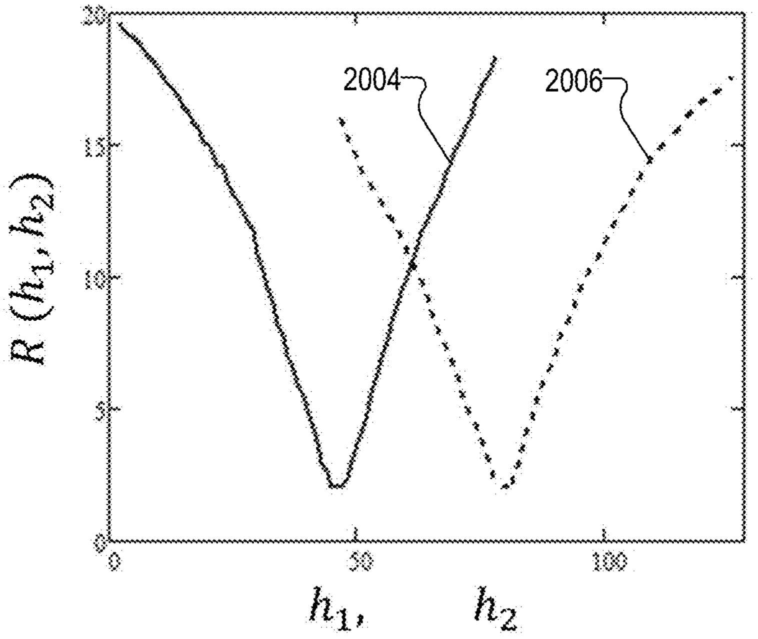
FIG. 20B shows the penalty function vs. try values of a set of breakpoints for the piecewise constant amplitude function of FIG. 20A.

FIGS. 20A and 20B illustrate this method of fitting a piecewise constant amplitude function. FIG. 20A shows an example of a sequence of absolute values of amplitude of a model transient and a fitted piecewise constant amplitude function, represented as line 2002. FIG. 20B shows the penalty function vs. try values of $h_1$ and $h_2$, represented as curves 2004 and 2006, respectively. The penalty function reveals a prominent minimum at the correct breakpoints.

An illustrative method of piecewise polynomial approximation of the phase function, as referenced in operation 1904, will now be described. The problem to fit the complex phase of a sequence $s_t$ on an interval $t=h_i \ldots h_{i+1}$ between two breakpoints with a polynomic function $$\varphi(t) = c_0 + c_1\frac{t}{K} + c_2\frac{t^2}{K^2} + \ldots$$

is formulated as minimization of the penalty function $$R(c_1, c_2 \ldots) = \sum_t |s_t| - \left|\sum_t s_t e^{-i\left(c_1\frac{t}{K}+c_2\frac{t^2}{K^2}+\ldots\right)}\right|$$

with respect to the coefficients $c_1$, $c_2$ . . . . Any suitable known global optimization method may be applied. The zero coefficient is then found as $$c_0 = \arg\sum_t s_t e^{-i\left(c_1\frac{t}{K}+c_2\frac{t^2}{K^2}+\ldots\right)}$$

An illustrative method for correction of signal amplitudes in noisy signals will now be described. Consider a true signal amplitude a* which holds for a time interval $t=h_i \ldots h_{i+1}$. The signal points found by the fitting procedure $a_t=|a^*+\zeta_k+i\eta_k|$ are the absolute values of the a* plus a random noise component whose dispersion is $\sigma^2=2\langle\zeta^2\rangle=2\langle\eta^2\rangle$. Under the assumption of a white normally distributed noise, the determined average of $a_t$ is $$a = \frac{1}{\pi\sigma^2}\int\int\sqrt{(a^*+\zeta)^2+\eta^2}\,\exp\left(-\frac{\zeta^2+\eta^2}{\sigma^2}\right)d\zeta d\eta = a = g\left(\frac{a^*}{\sigma}\right)a^*$$

The true amplitude is connected to the measured amplitude as $$a^* = g(snr)a,\ snr = a^*/\sigma$$

where g is a correction factor:

$$g = \pi snr \times \left\{\int\int\sqrt{(snr+x)^2+y^2}\,e^{-x^2-y^2}dxdy\right\}^{-1}$$

Figure 21:
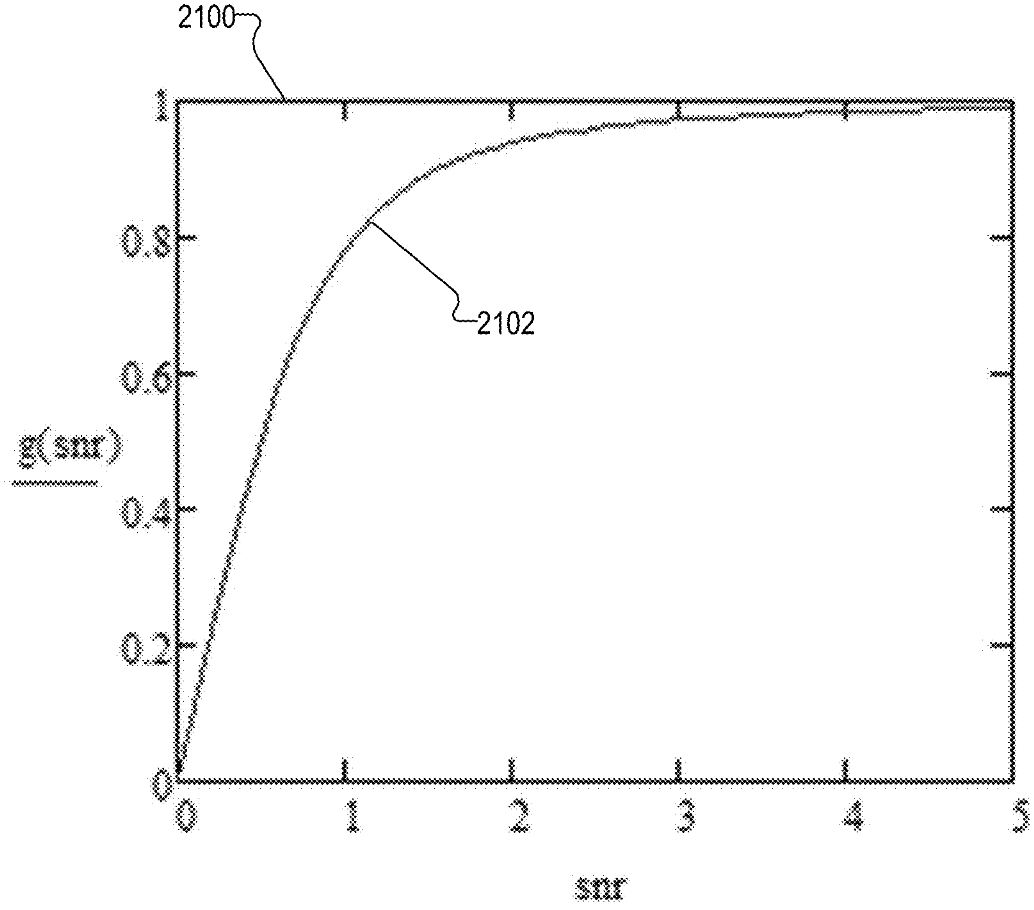
FIG. 21 shows an illustrative plot including a curve representing an amplitude correction factor.

FIG. 21 shows an illustrative plot 2100 including a curve 2102 representing the correction factor g as a function of snr.

Methods 1800 and 1900 may be used to determine a time-resolved frequency for any one or more FT components within a selected spectral interval and/or within the FT spectrum, or all FT components within the selected spectral interval and/or within the FT spectrum. Likewise, m/z, charge state z, and mass m may be determined, based on methods 1800 and 1900, for any one or more ion species simultaneously trapped and oscillating within the ion trap mass analyzer. Accordingly, the methods described herein may improve throughput compared to traditional CDMS techniques by enabling accurate analysis of multiple ion species simultaneously.

An illustrative application of methods 1800 and 1900 will now be described with reference to FIGS. 22 to 28 for a simulated analysis of flock house viral (FHV) particles using an Orbitrap™ mass analyzer. A transient is acquired by the mass analyzer and processed to generate an FT spectrum.

Figure 22:
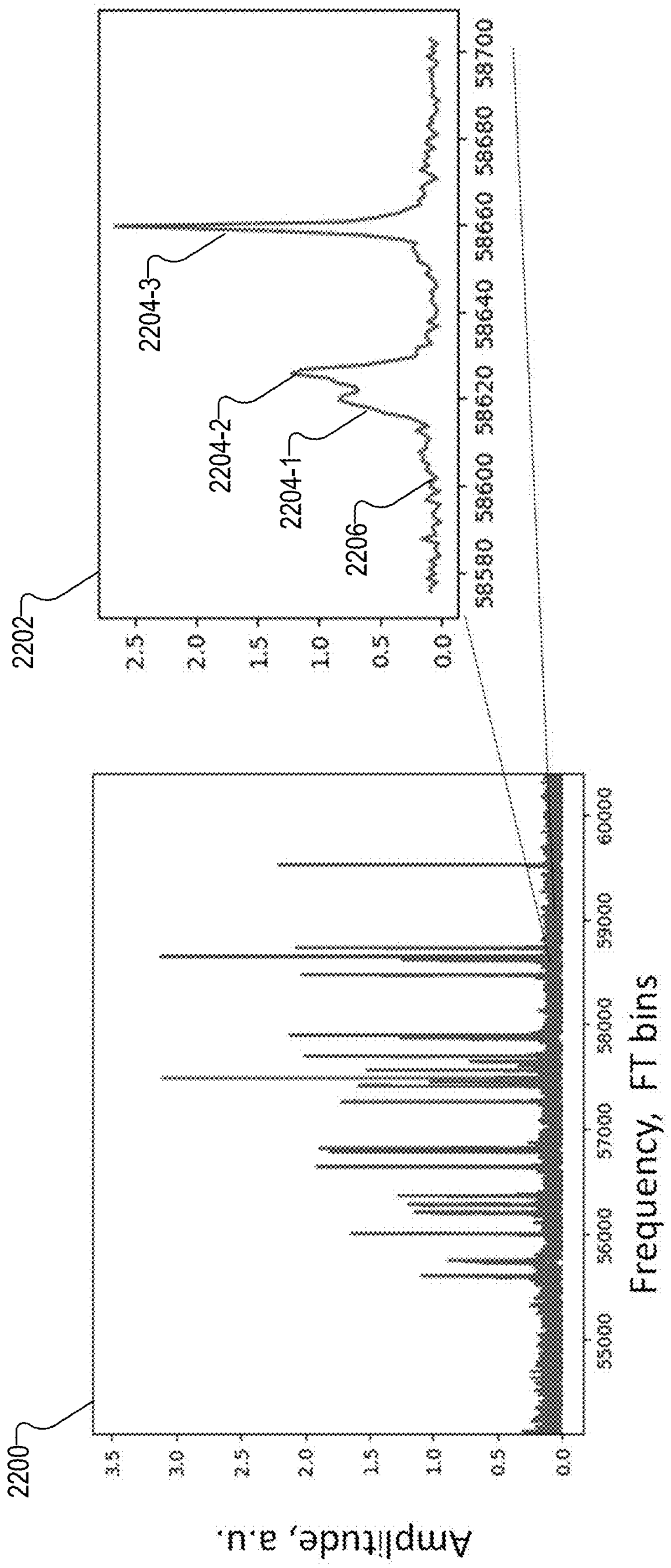
FIG. 22 shows an illustrative FT spectrum divided into a plurality of FT bins along the frequency domain and a selected spectral interval having three FT components.

FIG. 22 shows an FT spectrum 2200 divided into a plurality of FT bins along the frequency domain. A selected spectral interval 2202 of FT spectrum 2200 having a width of 128 FT bins is enlarged and contains three FT components 2204-1, 2204-2, and 2204-3 (collectively, FT components 2204). The amplitudes of FT components 2204 are considerably above the noise level 2206. FT spectrum 2200 is shown in magnitude mode as the absolute values $|c_k|$. Nevertheless, the complex values Re $(c_k)$+i lm $(c_k)$ are used for all calculations.

Figure 23:
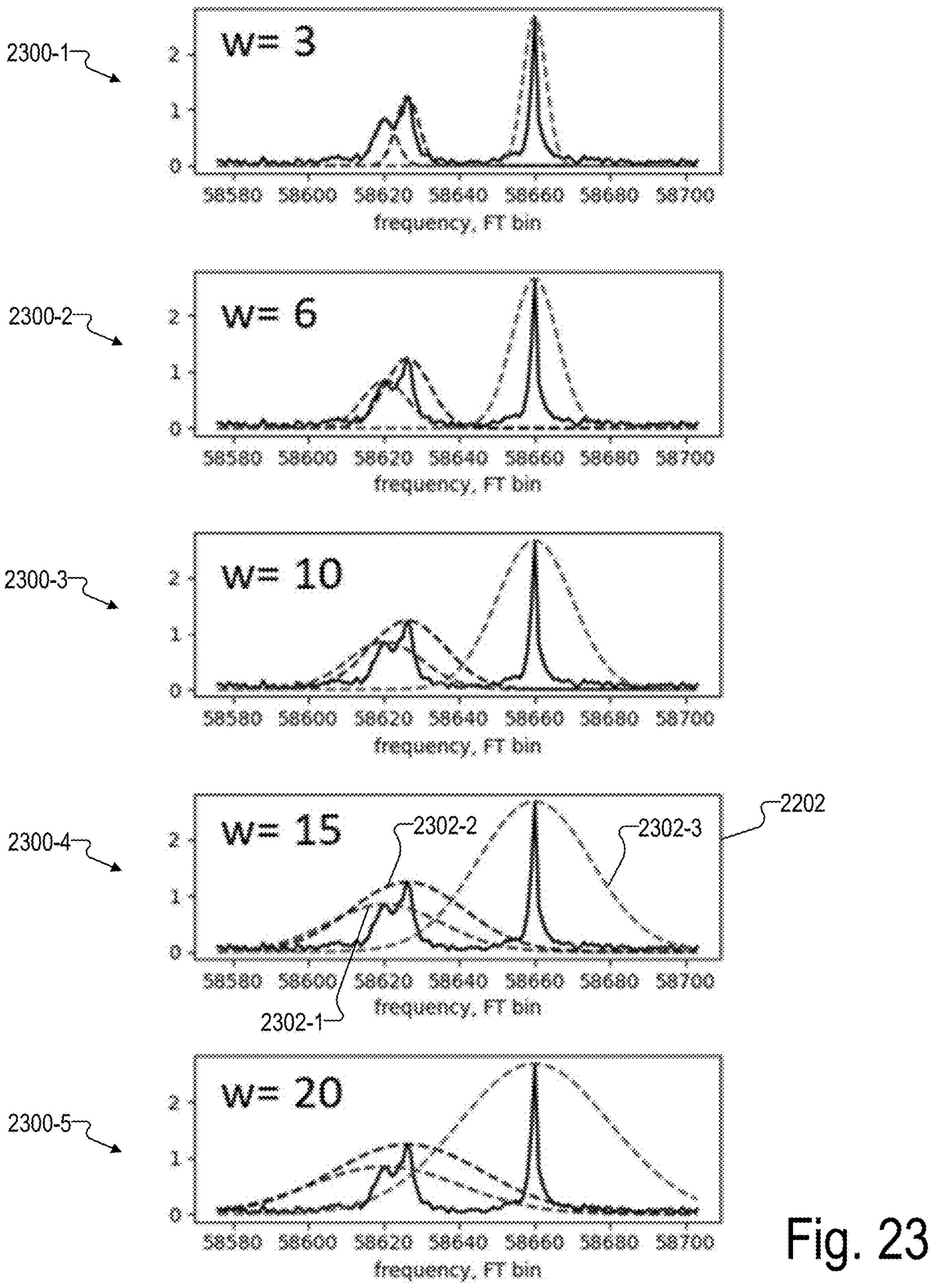
FIG. 23 shows the spectral interval and superimposed filter functions for the FT components of the spectral interval for each of five different iterations of the method of FIG. 19.

FIG. 23 shows spectral interval 2202 and superimposed filter functions 2302-1, 2302-2, and 2302-3 (represented as dashed lines) for FT components 2204 for each of five different iterations 2300 of method 1900 (e.g., iterations 2300-1 to 2300-5). (Reference numerals are shown only on fourth iteration 2300-4 for clarity.) The width w of the filter function for each successive iteration 2300 is 3, 6, 10, 15, and 20 FT bins. As shown, filter functions 2302 are Gaussian bell functions that are narrow enough and do not overlap significantly.

Figure 24:
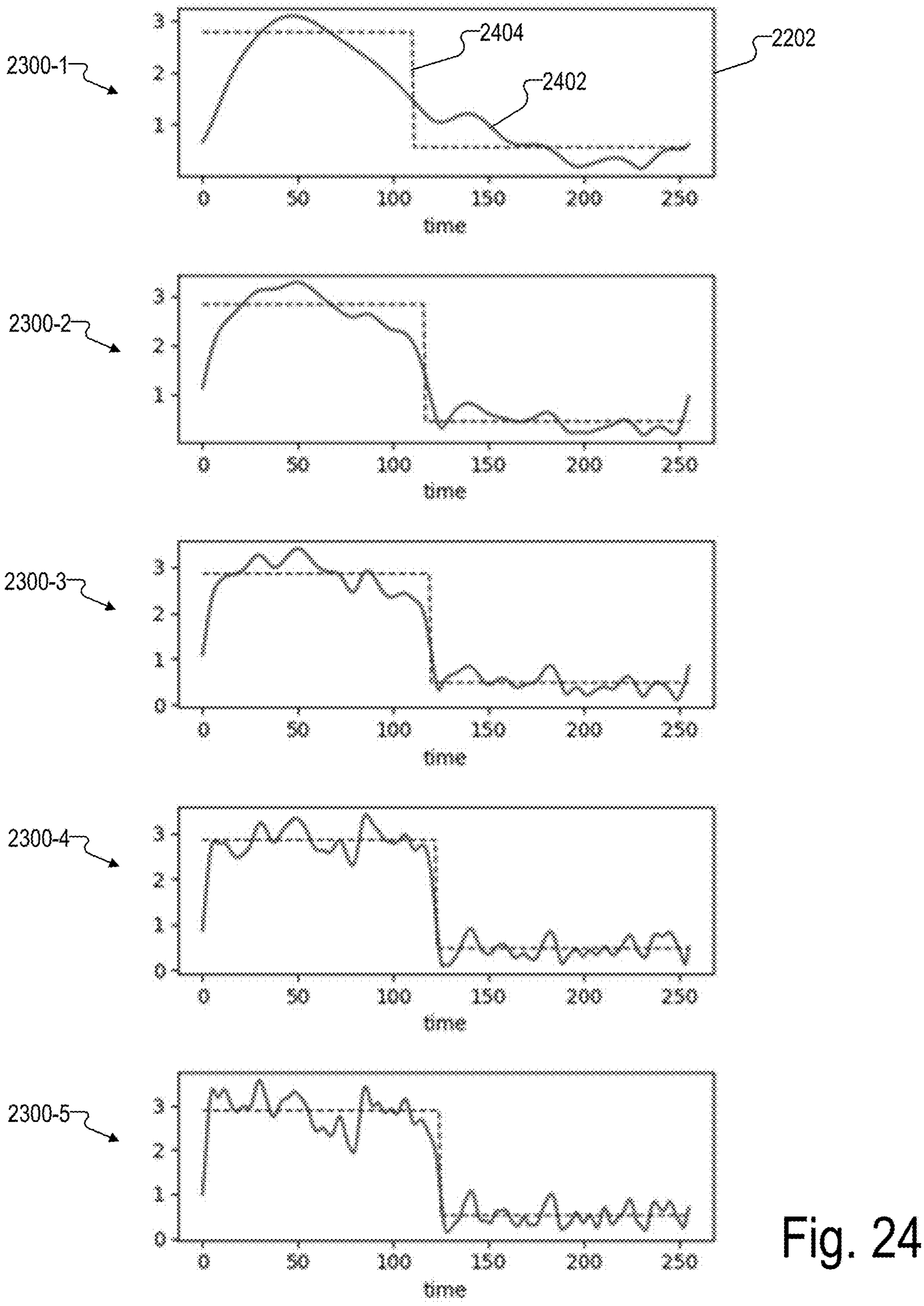
FIG. 24 shows a spectral interval and a curve representing the amplitude values over the transient acquisition period for the first FT component for each of the five different iterations.

FIG. 24 shows spectral interval 2202 and a curve 2402 representing the amplitude values $$|s_t^{(p)}|$$

over the transient acquisition for FT component 2204-1 calculated at operation 1904 for each iteration 2300. A two-fold zero-padding is applied, so that the time parameter t runs from zero to 256. The fitted piecewise constant amplitude function $a^{(p)}(t)$ is represented as dashed line 2404 superimposed on spectral interval 2202.

Figure 25:
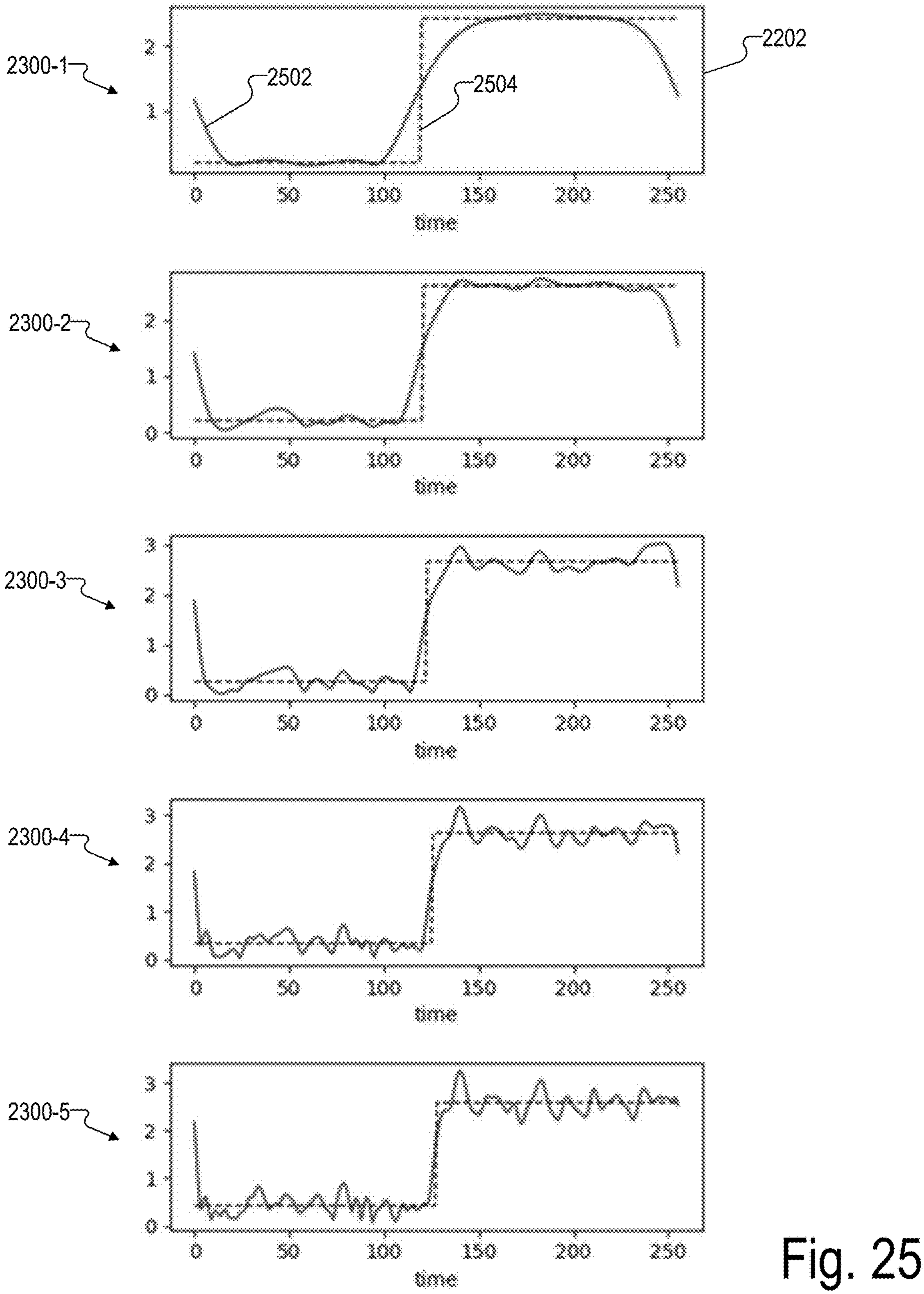
FIG. 25 shows a spectral interval and a curve representing the amplitude values over the transient acquisition period for the second FT component for each of the five different iterations.

FIG. 25 shows spectral interval 2202 and a curve 2502 representing the amplitude values $$|s_t^{(p)}|$$

over the transient acquisition for FT component 2204-2 calculated at operation 1904 for each iteration 2300. A two-fold zero-padding is applied, so that the time parameter t runs from zero to 256. The fitted piecewise constant function $a^{(p)}(t)$ is represented as dashed line 2504 superimposed on spectral interval 2202.

Figure 26:
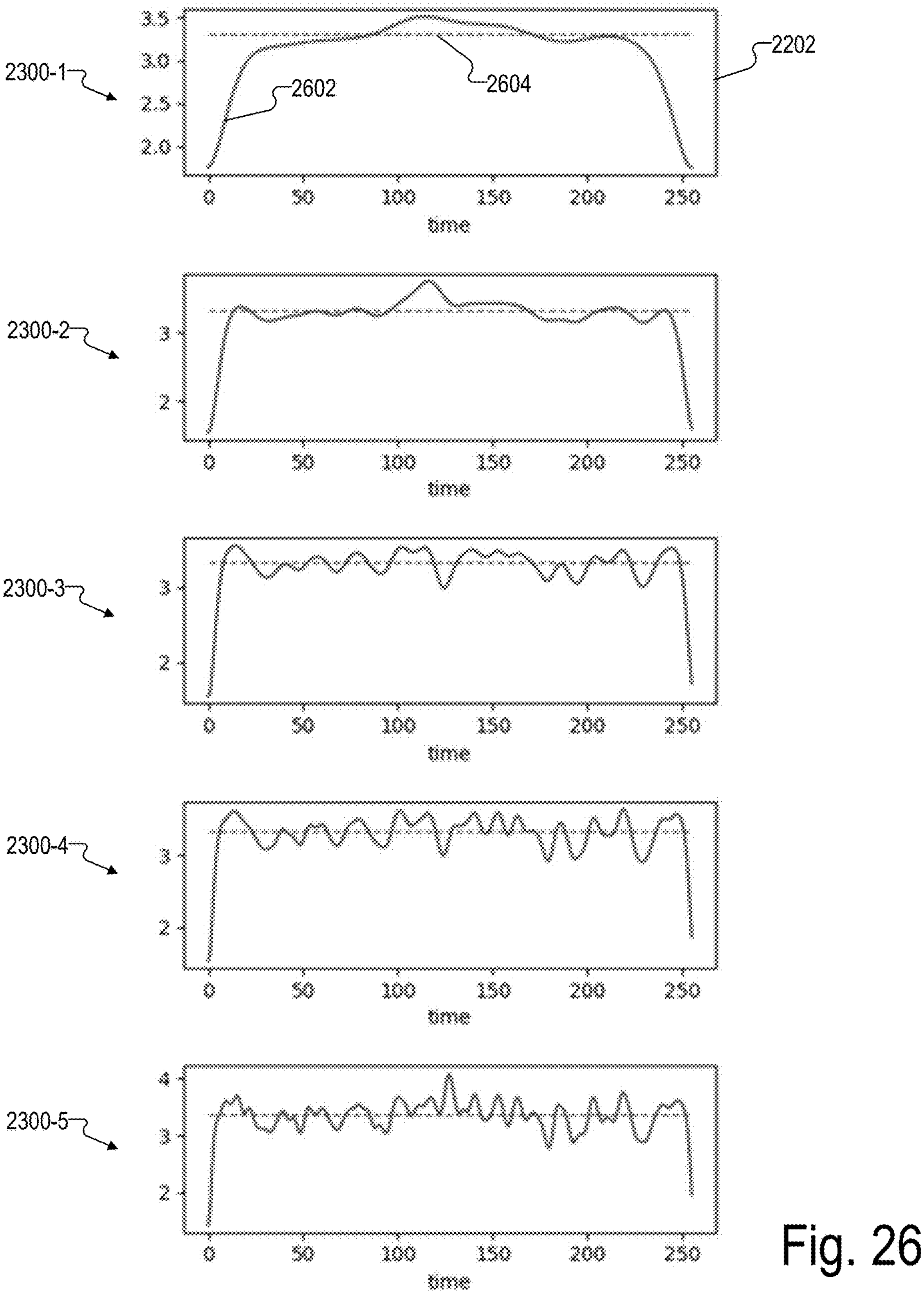
FIG. 26 shows spectral interval 2202 and a curve 2602 representing the amplitude values over the transient acquisition period for the third FT component for each of the five different iterations.

FIG. 26 shows spectral interval 2202 and a curve 2602 representing the amplitude values $$|s_t^{(p)}|$$

over the transient acquisition for FT component 2204-3 calculated at operation 1904 for each iteration 2300. A two-fold zero-padding is applied, so that the time parameter t runs from zero to 256. The fitted piecewise constant function $a^{(p)}(t)$ is represented as dashed line 2604 superimposed on spectral interval 2202.

Figure 27A:
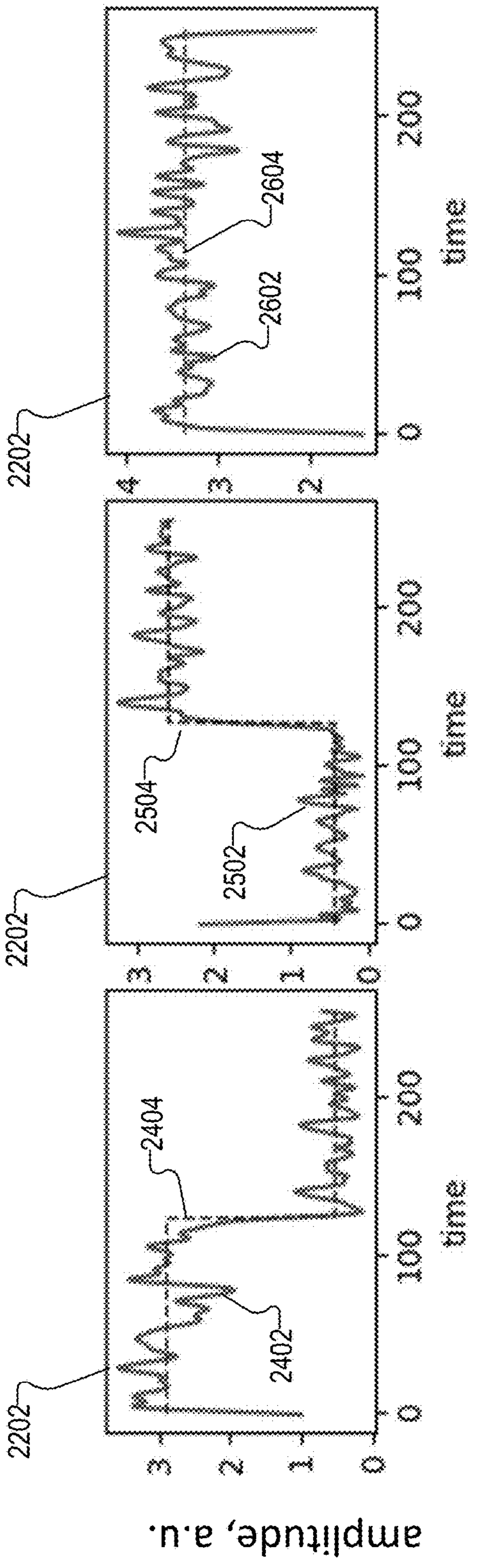
FIG. 27A shows a spectral interval, the amplitude values, and the fitted piecewise constant amplitude functions obtained on the last iteration for the FT components of the spectral interval FIG. 22.

FIG. 27A shows spectral interval 2202, the constant amplitude functions 2404, 2504, and 2604, and the fitted piecewise constant amplitude functions 2404, 2504, and 2604 for FT components 2204-1, 2204-2, and 2204-3 obtained on the last iteration (e.g., iteration 2300-5). The amplitude of FT component 2204-1 falls from approximately 2.7 units down to the noise level at about the middle of the acquisition time interval, while the amplitude of FT component 2204-2 rises at the same moment of time. This behavior leads to the conclusion that the FT components 2204-1 and 2204-2 come from the same ion, which collides with a molecule of residual gas and loses a neutral fragment. As a result of the mass loss, the oscillation frequency increases. The amplitude of FT component 2204-3 remains constant throughout the entire acquisition period, leading to the conclusion that the mass of the ion remains constant throughout the entire acquisition period. The signal amplitudes are supposedly proportional to charges of the involved ions. Approximate equality of amplitudes of the FT components 2202-1 and 2202-2 (about 2.7 units) confirm the hypothesis that the FT component 2204-1 is generated by the same ion as FT component 2204-2 after a loss of a neutral fragment.

Figure 27B:
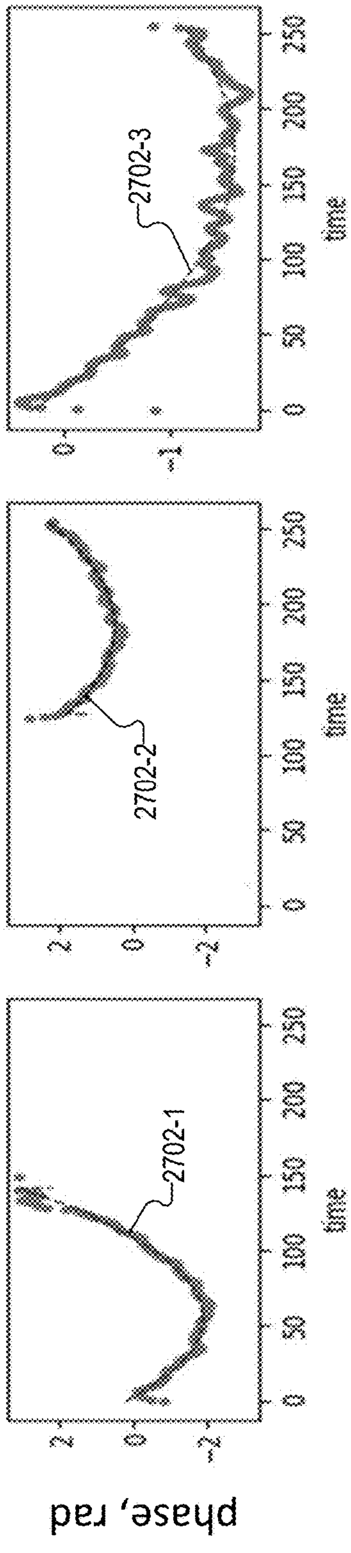
FIG. 27B shows the phase as a function of time and the fitted phase functions obtained on the last iteration for the FT components of the spectral interval of FIG. 22.

FIG. 27B shows the phase as a function of time and the fitted phase functions for FT components 2204-1, 2204-2, and 2204-3 obtained on the last iteration (e.g., iteration 2300-5). The oscillation phases arg $$s_t^{(p)}$$

are well fitted by parabolic functions, shown as dashed lines 2702-1, 2702-2, and 2702-3. FT components 2204-1 and 2204-2 are fitted only in the intervals of high amplitude.

Figure 28:
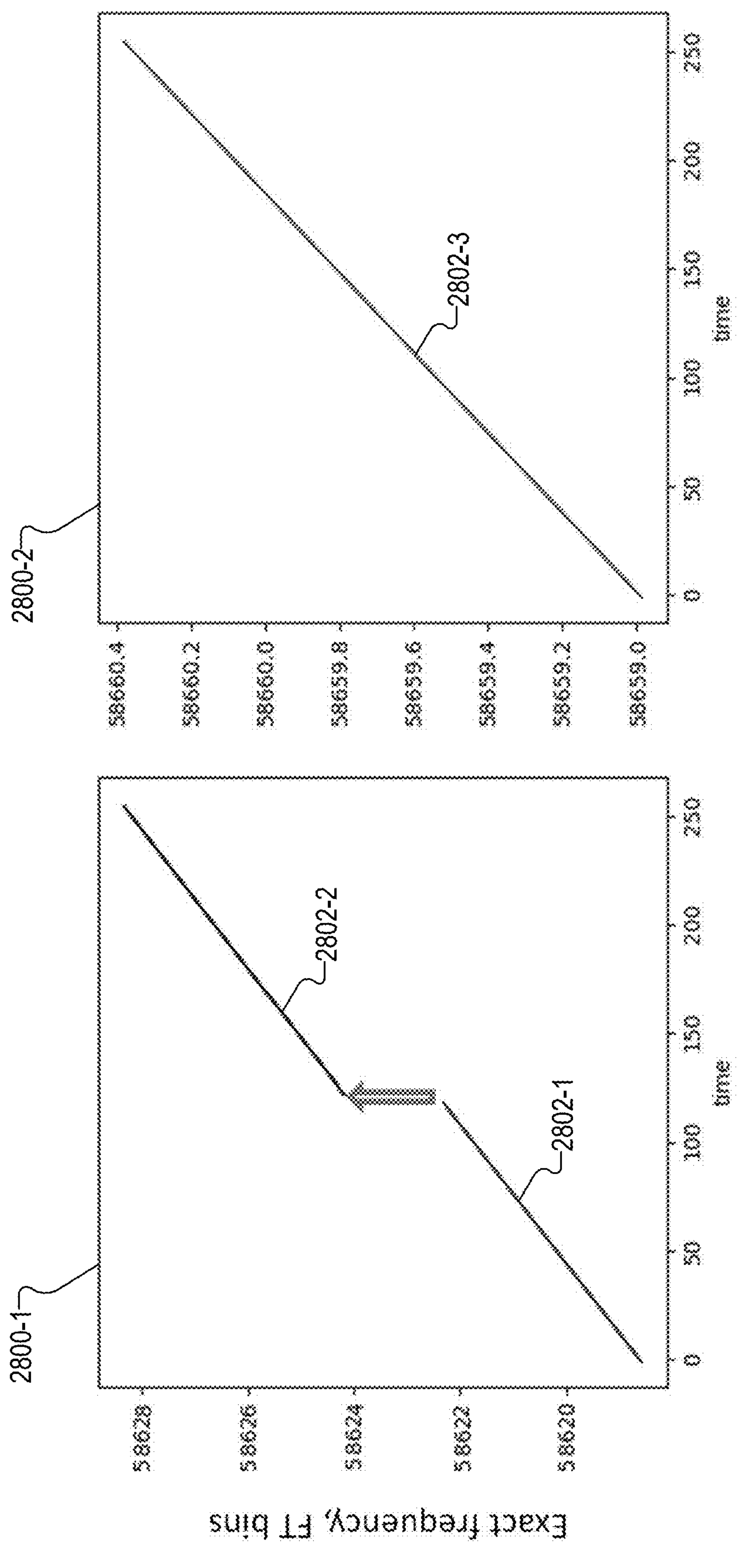
FIG. 28 shows plots that plot frequency, corrected based on the time derivative of the respective phase functions, as a function of time, for the FT components of the spectral interval of FIG. 22.

The time derivatives of the fitted phase functions are used to correct the estimated oscillation frequencies, as described above. FIG. 28 shows a plot 2800-1 and a plot 2800-2 that plot frequency, as corrected based on the time derivative of the respective phase functions, as a function of time. Plot 2800-1 includes a curve 2802-1 depicting the time-resolved frequency for FT component 2204-1 and a curve 2802-2 depicting the time-resolved frequency for FT component and 2202-2. Plot 2800-2 includes a curve 2802-3 depicting the time-resolved frequency for FT component 2204-3. For all three FT components 2204, the frequency rises with time, supposedly due to a continuous mass loss caused by desolvation. As shown by curves 2802-1 and 2802-2, there is a rapid frequency jump between FT components 2202-1 and 2202-2, supposedly caused by a loss of a larger neutral fragment.

As can be seen by the example just described with reference to the FHV particles, the relative peak amplitudes in the original FT spectrum 2200 (see FIG. 22) are not representative of the relative signals generated by oscillation of the ions due to the spectral interference caused by adjacent FT components. Thus, the peak amplitudes of the original FT spectrum 2200 are not suitable for assignment of ion charge state. However, the actual momentary amplitudes of the FT components, and hence determination of ion charge state, can be accurately determined by use of the methods described herein. For example, ion charge state can be determined based on the modified STORI method using the time-resolved frequency, as represented by curves 2802-1, 2802-2, and 2802-3 of FIG. 28. Alternatively, ion charge state can be determined based on the actual momentary amplitudes represented by constant amplitude functions 2404, 2504, and 2604, as shown in FIG. 27A.

The methods described herein are also applicable to dense spectra that may not be effectively split into non-interfering spectral intervals. In these scenarios, several spectral intervals may be selected at operation 1806 in such manner that each FT component of interest belongs to at least one interval and its estimated centroid is located close to the middle of the interval (e.g., within a predefined percentage of or distance from the interval's central frequency). In some examples, the spectral intervals overlap along the frequency axis.

At operation 1906, the spectral contribution $$d_k^{(p)}$$

of each of the FT components is calculated in the corresponding spectral interval. In the case that spectral intervals overlap, the numbers $$d_k^{(p)}$$

are transferred to the overlapping intervals via corresponding index shifts. At operation 1908, the spectral contributions from FT components in the neighboring overlapping intervals are also subtracted.

Figure 29:
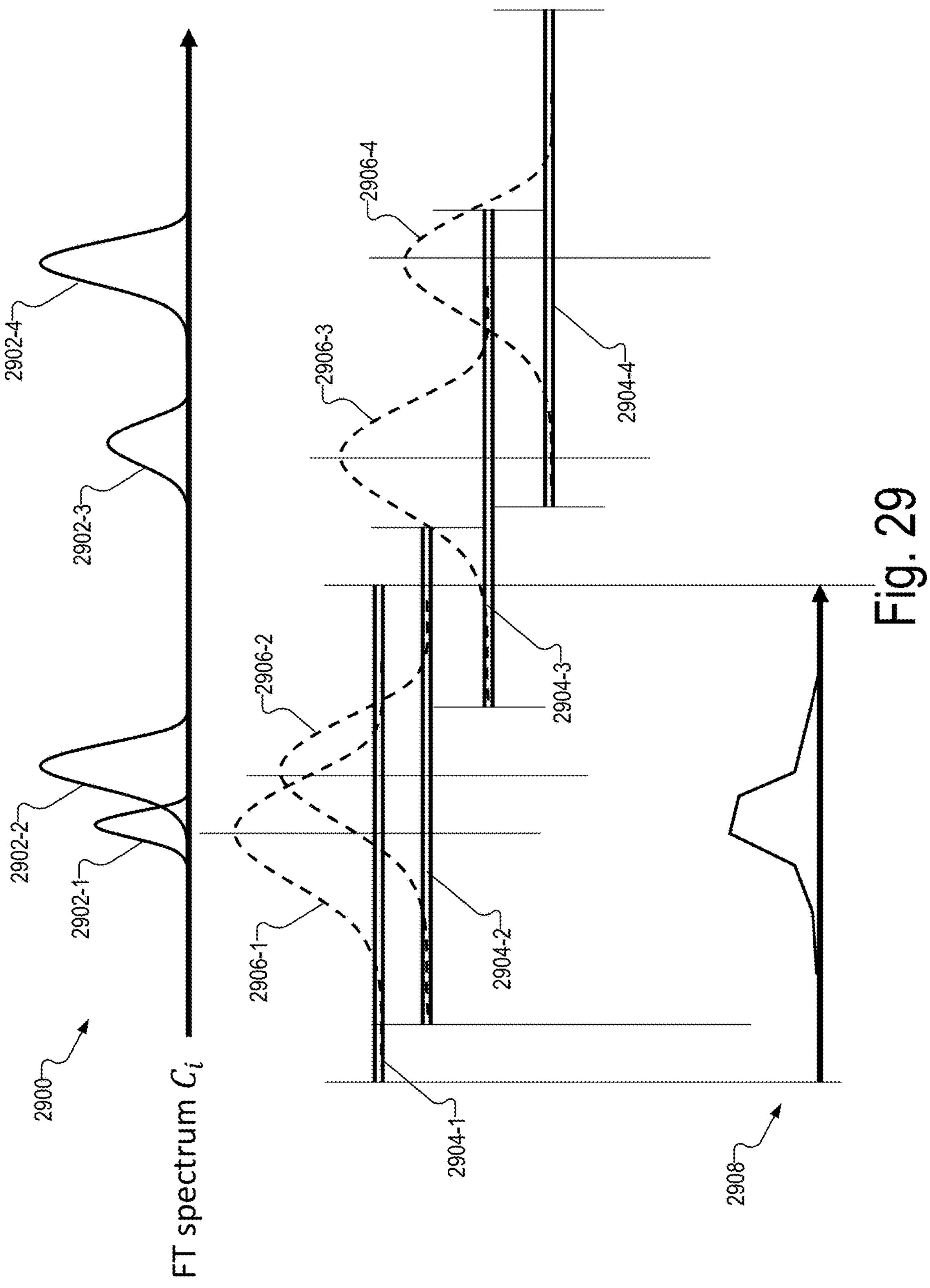
FIG. 29 shows an illustrative implementation of the methods of FIG. 18 and FIG. 19 using overlapping spectral intervals.

FIG. 29 shows an illustrative implementation of methods 1800 and 1900 using overlapping spectral intervals. FIG. 29. show a continuous FT spectrum 2900 having four detected FT components 2902-1, 2902-2, 2902-3, and 2902-4. An individual spectral interval 2904 (e.g., spectral interval 2904-1, 2904-2, 2904-3, or 2904-4) is associated with each FT component 2902, which is positioned in or near the middle of the spectral interval 2904. Gaussian filter functions applied to FT components 2902 are represented by dashed curves 2906-1 to 2906-4. The width of the Gaussian filter functions will vary depending on the iteration. In the example of FIG. 29, only a filtered model transient of the FT component 2902 of the corresponding spectral interval 2904 is calculated and its spectral contribution $d_k$ to the corresponding spectral interval 2904 is estimated. The spectral contribution of an FT component 2902 is calculated on the associated spectral interval 2904 and is subtracted, with corresponding index shifts, from the shared parts of spectral data on overlapping spectral intervals 2904. FIG. 29 shows a correction spectrum 2908 for spectral interval 2904-1, calculated by subtracting the contributions of FT components 2902-2 and 2902-3 (of overlapping spectral intervals 2904-2 and 2904-3) from the contribution of FT component 2902-1.

The spectral intervals that do not overlap, such as spectral intervals 2904-1 and 2904-4, have no direct interference. Therefore, the number of subtractions, which is twice the number of overlapping pairs, is proportional to P, rather than $P^2$. This is beneficial for performance and allows efficient parallel computation.

Various additional benefits may be derived from the examples and principles described herein, as will now be described.

In some examples, ion fragmentation pathways may be determined. For example, if a pair of FT spectrum components is identified, of which the first one terminates at a certain time moment on the signal acquisition period and the second one starts at substantially the same moment, and both components have the same or similar amplitudes, there are chances that the components are produced by the same trapped ion that underwent fragmentation. In this case, the m/z difference between the FT components (determined from their centroids) provides information about the lost fragment, neutral or charged, and, therefore, the fragmentation pathway may be determined (e.g., solvent loss or collision-induced fragmentation).

In another example, the rate of frequency drift may provide information about the molecular conformation of trapped ions. As the oscillation frequency is directly related to m/z of a trapped ion, the frequency change in time detected by the methods described herein provides an estimate of the ion's mass change over time. The reduction of mass happens either due to the solvent evaporation or collision-induced loss of small fragments (usually neutral). Ions with a larger external surface are hypothetically more susceptible to both mechanisms of mass loss. So, the ion conformations with a smaller or a larger surface may be differentiated based on the rate of frequency drift. Furthermore, measuring of the frequency drift under two or more different pressures of the residual gas may allow differentiation of the mechanism of mass losses, such as evaporation or collision-induced fragmentation.

As another example, the frequency drift may also be determined in a straightforward method by Short Term (or Time) Fourier Transform, in which the transient is split into a number of shorter transients (parts), e.g. via a recursive bi-section. For smaller parts, an FT peak's centroid and amplitude are determined, e.g., via fitting a sinc model to the corresponding FT spectra. Splitting of a transient into smaller parts continues until the sinc model shows a certain fitting quality, which is signaled, for example, by the smallness of a residual. The frequency/amplitude evolution is then obtained via piecewise interpolation of the values determined on the transient parts. An example of Short Term Fourier Transform that may be used to determine frequency/amplitude with a time resolution is described in Miller, Zachary M., et al. "Apodization specific fitting for improved resolution, charge measurement, and data analysis speed in charge detection mass spectrometry." Journal of the American Society for Mass Spectrometry 33.11 (2022): 2129-2137, which is incorporated herein by reference in its entirety.

Figure 30:
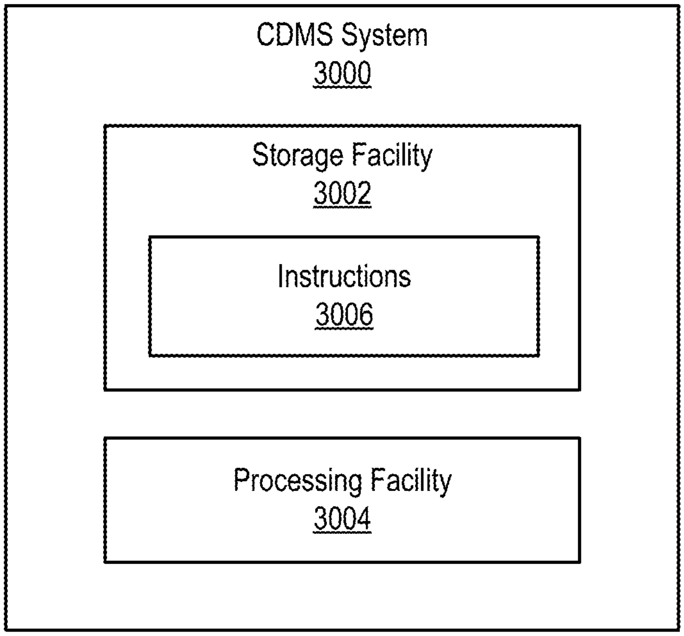
FIG. 30 shows an illustrative CDMS system.

One or more operations described herein, including any operations of methods 700, 800, 1600, 1800, and 1900, may be performed by a CDMS system. FIG. 30 shows an illustrative CDMS system 3000 ("system 3000"). System 3000 may be implemented entirely or in part by a mass spectrometer (e.g., by a controller of a mass spectrometer), including any mass spectrometer described herein. Alternatively, system 3000 may be implemented separately from a mass spectrometer (e.g., a standalone computing system, a remote computing system, or a remote server communicatively coupled to a mass spectrometer by a network connection).

System 3000 may include, without limitation, a storage facility 3002 and a processing facility 3004 selectively and communicatively coupled to one another. Facilities 3002 and 3004 may each include or be implemented by hardware and/or software components (e.g., processors, memories, communication interfaces, instructions stored in memory for execution by the processors, etc.). In some examples, facilities 3002 and 3004 may be distributed between multiple devices and/or multiple locations as may serve a particular implementation.

Storage facility 3002 may maintain (e.g., store) executable data used by processing facility 3004 to perform any of the operations described herein. For example, storage facility 3002 may store instructions 3006 that may be executed by processing facility 3004 to perform any of the operations described herein. Instructions 3006 may be implemented by any suitable application, software, code, and/or other executable data instance. Storage facility 3002 may also maintain any data acquired, received, generated, managed, used, and/or transmitted by processing facility 3004.

Processing facility 3004 may be configured to perform (e.g., execute instructions 3006 stored in storage facility 3002 to perform) various processing operations described herein. It will be recognized that the operations and examples described herein are merely illustrative of the many different types of operations that may be performed by processing facility 3004. In the description herein, any references to operations performed by system 3000 may be understood to be performed by processing facility 3004 of system 3000. Furthermore, in the description herein, any operations performed by system 3000 may be understood to include system 3000 directing or instructing another system or device to perform the operations.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 31:
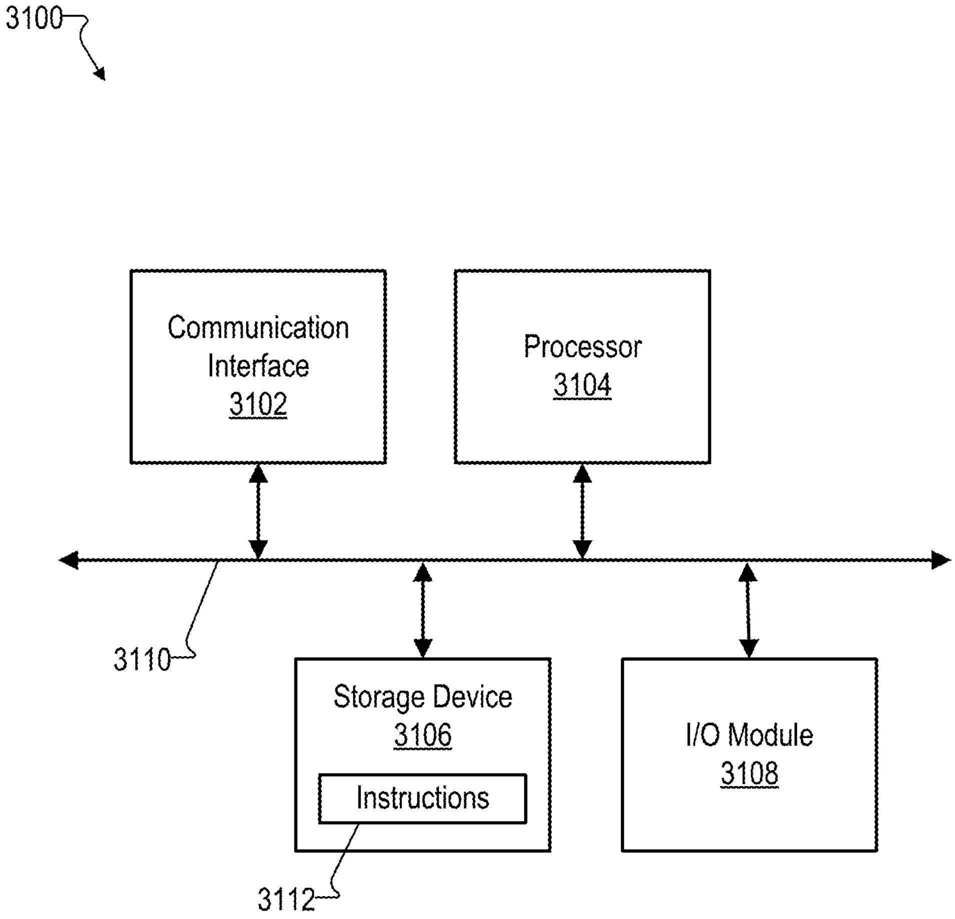
FIG. 31 shows an illustrative computing device that may be specifically configured to perform one or more of the processes described herein.

FIG. 31 shows an illustrative computing device 3100 that may be specifically configured to perform one or more of the processes described herein. As shown in FIG. 31, computing device 3100 may include a communication interface 3102, a processor 3104, a storage device 3106, and an input/output ("I/O") module 3108 communicatively connected one to another via a communication infrastructure 3110. While an illustrative computing device 3100 is shown in FIG. 31, the components illustrated in FIG. 31 are not intended to be limiting. Additional or alternative components may be used in other embodiments. Components of computing device 3100 shown in FIG. 31 will now be described in additional detail.

Communication interface 3102 may be configured to communicate with one or more computing devices. Examples of communication interface 3102 include, without limitation, a wired network interface (such as a network interface card), a wireless network interface (such as a wireless network interface card), a modem, an audio/video connection, and any other suitable interface.

Processor 3104 generally represents any type or form of processing unit capable of processing data and/or interpreting, executing, and/or directing execution of one or more of the instructions, processes, and/or operations described herein. Processor 3104 may perform operations by executing computer-executable instructions 3112 (e.g., an application, software, code, and/or other executable data instance) stored in storage device 3106.

Storage device 3106 may include one or more data storage media, devices, or configurations and may employ any type, form, and combination of data storage media and/or device. For example, storage device 3106 may include, but is not limited to, any combination of the non-volatile media and/or volatile media described herein. Electronic data, including data described herein, may be temporarily and/or permanently stored in storage device 3106. For example, data representative of computer-executable instructions 3112 configured to direct processor 3104 to perform any of the operations described herein may be stored within storage device 3106. In some examples, data may be arranged in one or more databases residing within storage device 3106.

I/O module 3108 may include one or more I/O modules configured to receive user input and provide user output. One or more I/O modules may be used to receive input for a single virtual experience. I/O module 3108 may include any hardware, firmware, software, or combination thereof supportive of input and output capabilities. For example, I/O module 3108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 3108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 3108 is configured to provide graphical data to a display for presentation to a user. The graphical data may be representative of one or more graphical user interfaces and/or any other graphical content as may serve a particular implementation.

In some examples, any of the systems, computing devices, and/or other components described herein may be implemented by computing device 3100. For example, storage facility 3002 may be implemented by storage device 3106 and processing facility 3004 may be implemented by processor 3104.

In the preceding description, various illustrative embodiments have been described with reference to the accompanying drawings. However, various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

Advantages and features of the present disclosure can be further described by the following examples:

Example 1. A non-transitory computer-readable medium storing instructions that, when executed, direct at least one processor of a computing device for mass spectrometry to perform a process comprising: acquiring a time-varying signal representative of a current induced on a detector by oscillatory motion of an ion within a trapping region; processing the time-varying signal to derive a frequency of the oscillatory motion; generating, in accordance with equations (1) and (2), Selective Temporal Overview of Resonant Ion (STORI) data representing $STORI_{real}$ values versus time and $STORI_{imag}$ values versus time:

$$STORI_{real}(t_n) = S(t_n) * \cos(\omega * t_n) + STORI_{real}(t_{n-1}) \quad (1)$$

$$STORI_{imag}(t_n) = -S(t_n) * \sin(\omega * t_n) + STORI_{imag}(t_{n-1}) \quad (2)$$

where $S(t_n)$ is amplitude of the time-varying signal and w is the derived frequency of the oscillatory motion; regenerating the STORI data based on a variation of the frequency of the oscillatory motion over time; and determining a charge state of the ion based on the regenerated STORI data.

Example 2. The non-transitory computer-readable medium of example 1, wherein regenerating the STORI data comprises: determining a frequency correction as a function of time relative to the derived frequency; and regenerating the STORI data based on the derived frequency and the frequency correction.

Example 3. The non-transitory computer-readable medium of example 2, wherein the STORI data is regenerated in accordance with equations (1') and (2'):

$$STORI_{real}(t_n) = S(t_n) * \cos(\omega(t_n) * t_n) + STORI_{real}(t_{n-1}) \quad (1')$$

$$STORI_{imag}(t_n) = -S(t_n) * \sin(\omega(t_n) * t_n) + STORI_{imag}(t_{n-1}) \quad (2')$$

where $\omega(t_n)$ is a frequency of the oscillatory motion as a function of time determined based on the derived frequency and the frequency correction as a function of time.

Example 4. The non-transitory computer-readable medium of example 2 or 3, wherein the process further comprises determining, based on the derived frequency and the frequency correction, m/z of the ion at a particular time during acquisition of the time-varying signal.

Example 5. The non-transitory computer-readable medium of example 4, wherein the process further comprises determining a mass of the ion at the particular time based on the charge state of the ion and the m/z of the ion at the particular time.

Example 6. The non-transitory computer-readable medium of any of examples 2-5, wherein the determining the frequency correction as a function of time comprises: generating δSTORI data based on the STORI data, the δSTORI data representing a time derivative of the STORI data; generating, based on the δSTORI data and in accordance with equation (4), δSTORI phase data representing variation of a δSTORI phase angle θδSTORI over time:

$$\theta_{\delta STORI}(t_n) = \tan^{-1}\left(\frac{\delta STORI_{imag}(t_n)}{\delta STORI_{real}(t_n)}\right) \quad (4)$$

where δ $STORI_{real}(t_n)$ is the time derivative of $STORI_{real}(t_n)$ and $\delta STORI_{imag}(t_n)$ is the time derivative of $STORI_{imag}(t_n)$; and determining the frequency correction as a function of time based on a slope of $\theta\delta STORI(t_n)$ as a function of time.

Example 7. The non-transitory computer-readable medium of any of examples 1-6, wherein the determining the charge state of the ion based on the regenerated STORI data comprises: determining $STORI_{mag}$ values versus time based on the regenerated STORI data in accordance with equation (3):

$$STORI_{mag}(t_n) = \sqrt{STORI_{real}(t_n)^2 + STORI_{imag}(t_n)^2}; \quad (3)$$

and determining the charge state of the ion based on a slope of $STORI_{mag}(t_n)$ and a relation between ion charge and the slope of $STORI_{mag}(t_n)$.

Example 8. The non-transitory computer-readable medium of example 7, wherein: the process further comprises determining, based on the regenerated STORI data, a lifetime of the ion; and the determining the charge state of the ion is based on the slope of $STORI_{mag}(t_n)$ during the lifetime of the ion.

Example 9. A system for determining a charge state of an ion, comprising: one or more processors; and memory storing executable instructions that, when executed by the one or more processors, cause a computing device to perform a process comprising: acquiring a time-varying signal representative of a current induced on a detector by oscillatory motion of an ion within a trapping region; processing the time-varying signal to derive a frequency of the oscillatory motion; generating, in accordance with equations (1) and (2), Selective Temporal Overview of Resonant Ion (STORI) data representing $STORI_{real}$ values versus time and $STORI_{imag}$ values versus time:

$$STORI_{real}(t_n) = S(t_n) * \cos(\omega * t_n) + STORI_{real}(t_{n-1}) \quad (1)$$

$$STORI_{imag}(t_n) = -S(t_n) * \sin(\omega * t_n) + STORI_{imag}(t_{n-1}) \quad (2)$$

where $S(t_n)$ is amplitude of the time-varying signal and w is the derived frequency of the oscillatory motion; regenerating the STORI data based on a variation of the frequency of the oscillatory motion over time; and determining a charge state of the ion based on the regenerated STORI data.

Example 10. The system of example 9, wherein regenerating the STORI data comprises: determining a frequency correction as a function of time relative to the derived frequency; and regenerating the STORI data based on the derived frequency and the frequency correction.

Example 11. The system of example 10, wherein the STORI data is regenerated in accordance with equations (1') and (2'):

$$STORI_{real}(t_n) = S(t_n) * \cos(\omega(t_n) * t_n) + STORI_{real}(t_{n-1}) \quad (1')$$

$$STORI_{imag}(t_n) = -S(t_n) * \sin(\omega(t_n) * t_n) + STORI_{imag}(t_{n-1}) \quad (2')$$

where $\omega(t_n)$ is a frequency of the oscillatory motion as a function of time determined based on the derived frequency and the frequency correction as a function of time.

Example 12. The system of example 10 or 11, wherein the process further comprises determining, based on the derived frequency and the frequency correction, m/z of the ion at a particular time during acquisition of the time-varying signal.

Example 13. The system of example 12, wherein the process further comprises determining a mass of the ion at the particular time based on the charge state of the ion and the m/z of the ion at the particular time.

Example 14. The system of any of examples 10-13, wherein the determining the frequency correction as a function of time comprises: generating δSTORI data based on the STORI data, the δSTORI data representing a time derivative of the STORI data; generating, based on the δSTORI data and in accordance with equation (4), δSTORI phase data representing variation of a δSTORI phase angle $\theta_{\delta STORI}$ over time:

$$\theta_{\delta STORI}(t_n) = \tan^{-1}\left(\frac{\delta STORI_{imag}(t_n)}{\delta STORI_{real}(t_n)}\right) \quad (4)$$

where $\delta STORI_{real}(t_n)$ is the time derivative of $STORI_{real}(t_n)$ and $\delta STORI_{imag}(t_n)$ is the time derivative of $STORI_{imag}(t_n)$; and determining the frequency correction as a function of time based on a slope of $\theta\delta_{STORI}(t_n)$ as a function of time.

Example 15. The system of any of examples 9-14, wherein the determining the charge state of the ion based on the regenerated STORI data comprises: determining $STORI_{mag}$ values versus time based on the regenerated STORI data in accordance with equation (3):

$$STORI_{mag}(t_n) = \sqrt{STORI_{real}(t_n)^2 + STORI_{imag}(t_n)^2}; \quad (3)$$

and determining the charge state of the ion based on a slope of $STORI_{mag}(t_n)$ and a relation between ion charge and the slope of $STORI_{mag}(t_n)$.

Example 16. The system of example 15, wherein: the process further comprises determining, based on the regenerated STORI data, a lifetime of the ion; and the determining the charge state of the ion is based on the slope of $STORI_{mag}(t_n)$ during the lifetime of the ion.

Example 17. A system for performing charge detection mass spectrometry, the system comprising: an ion trap mass analyzer that traps an ion within a trapping region and establishes a trapping field within the trapping region that causes the ion to undergo oscillatory motion; and a computing system configured to perform a process comprising: acquiring a time-varying signal representative of a current induced on a detector by oscillatory motion of an ion within a trapping region; processing the time-varying signal to derive a frequency of the oscillatory motion; generating, in accordance with equations (1) and (2), Selective Temporal Overview of Resonant Ion (STORI) data representing $STORI_{real}$ values versus time and $STORI_{imag}$ values versus time:

$$STORI_{real}(t_n) = S(t_n) * \cos(\omega * t_n) + STORI_{real}(t_{n-1}) \quad (1)$$

$$STORI_{imag}(t_n) = -S(t_n) * \sin(\omega * t_n) + STORI_{imag}(t_{n-1}) \quad (2)$$

where $S(t_n)$ is amplitude of the time-varying signal and w is the derived frequency of the oscillatory motion; regenerating the STORI data based on a variation of the frequency of the oscillatory motion over time; and determining a charge state of the ion based on the regenerated STORI data.

Example 18. The system of example 17, wherein the ion trap mass analyzer comprises an orbital electrostatic ion trap mass analyzer.

Example 19. A non-transitory computer-readable medium storing instructions that, when executed, direct at least one processor of a computing device for mass spectrometry to perform a process comprising: acquiring a time-varying signal representative of a current induced on a detector by oscillatory motion of an ion within a trapping region; processing the time-varying signal to derive a frequency of the oscillatory motion; generating, in accordance with equation (8), Selective Temporal Overview of Resonant Ion (STORI) data representing $STORI_{mag}$ values versus time:

$$STORI_{mag}(t_n) = \sqrt{STORI_{real}(t_n)^2 + STORI_{imag}(t_n)^2} + STORI_{mag}(t_{n-1}) \quad (8)$$

where values of $STORI_{real}(t_n)$ and $STORI_{imag}(t_n)$ at time $t_n$ are determined in accordance with equations (6) and (7):

$$STORI_{real}(t_n) = S(t_n) * \cos(\omega * t_n) \quad (6)$$

$$STORI_{imag}(t_n) = -S(t_n) * \sin(\omega * t_n) \quad (7)$$

where $S(t_n)$ is amplitude of the time-varying signal and w is the derived frequency of the oscillatory motion; and determining a charge state of the ion based on the STORI data.

Example 20. The non-transitory computer-readable medium of example 19, wherein the determining the charge state of the ion is based on a slope of $STORI_{mag}(t_n)$ and a relation between ion charge and the slope of $STORI_{mag}(t_n)$.

Example 21. A non-transitory computer-readable medium storing instructions that, when executed, direct at least one processor of a computing device for mass spectrometry to perform a process comprising: acquiring a transient for one or more ion species trapped and oscillating within a trapping region; generating a Fourier transform (FT) spectrum based on the transient; selecting, within the FT spectrum, a spectral interval including one or more FT components; estimating a frequency of each FT component within the spectral interval; processing the FT spectrum to determine a time-resolved frequency for an FT component within the spectral interval based on an isolated contribution of the FT component to the spectral interval; and determining, based on the time-resolved frequency for the FT component within the spectral interval, a charge state z of an ion species corresponding to the FT component.

Example 22. The computer-readable medium of example 21, wherein the process further comprises: determining, based on the time-resolved frequency of the FT component, a mass-to-charge ratio (m/z) of an ion species corresponding to the FT component.

Example 23. The computer-readable medium of example 21, wherein the time-resolved frequency for the FT component within the spectral interval is determined based on a time-resolved frequency correction applied to the estimated frequency of the FT component.

Example 24. The computer-readable medium of example 21, wherein the processing the FT spectrum to determine the time-resolved frequency for the FT component comprises: applying a filter of width w to each FT component within the spectral interval based on the estimated frequency of each FT component to generate filtered spectral data; generating, based on the filtered spectral data, a model transient for each FT component within the spectral interval, the model transient including an amplitude function and a phase function; determining, for each FT component based on the amplitude function and the phase function for the FT component, a spectral contribution of each FT component to the spectral interval; for the FT component, subtracting the spectral contributions of other FT components within the spectral interval; and determining, based on the phase function of the model transient, a time-resolved frequency for the FT component within the spectral interval.

Example 25. The computer-readable medium of example 24, wherein the generating the model transient comprises performing an inverse Fourier transform on the filtered spectral data.

Example 26. The computer-readable medium of example 24, wherein the amplitude function comprises a piecewise constant amplitude function.

Example 27. The computer-readable medium of example 26, wherein the piecewise constant amplitude function has a plurality of breakpoints.

Example 28. The computer-readable medium of example 27, wherein the determining the charge state z of the ion species is based on an amplitude of the piecewise constant amplitude function between adjacent breakpoints.

Example 29. The computer-readable medium of example 24, wherein the phase function comprises a piecewise polynomial function.

Example 30. The computer-readable medium of example 24, wherein the determining the spectral contribution of each FT component to the spectral interval comprises performing a FT on the model transient for each FT component based on the amplitude function and phase function for each respective FT component.

Example 31. The computer-readable medium of example 24, further comprising iteratively determining a width of the filter.

Example 32. The computer-readable medium of example 31, wherein: an iterative loop comprises: the applying the filter to each FT component within the spectral interval; the generating the model transient for each FT component within the spectral interval; the determining the spectral contribution of the FT component to the spectral interval; and the subtracting the spectral contributions of other components within the spectral interval; and the iteratively determining the width of the filter comprises performing the iterative loop until an iterative loop condition is satisfied.

Example 33. The computer-readable medium of example 32, wherein the iterative loop condition is satisfied when a temporal resolution reaches a threshold value.

Example 34. The computer-readable medium of example 32, wherein the iterative loop condition comprises performing a threshold number of iterative loops.

What is claimed is:

1. A non-transitory computer-readable medium storing instructions that, when executed, direct at least one processor of a computing device for mass spectrometry to perform a process comprising:

acquiring a time-varying signal representative of a current induced on a detector by oscillatory motion of an ion within a trapping region;

processing the time-varying signal to derive a frequency of the oscillatory motion;

generating, in accordance with equations (1) and (2), Selective Temporal Overview of Resonant Ion (STORI) data representing $STORI_{real}$ values versus time and $STORI_{imag}$ values versus time:

$$STORI_{real}(t_n) = S(t_n) * \cos(\omega * t_n) + STORI_{real}(t_{n-1}) \tag{1}$$

$$STORI_{imag}(t_n) = -S(t_n) * \sin(\omega * t_n) + STORI_{imag}(t_{n-1}) \tag{2}$$

where $S(t_n)$ is amplitude of the time-varying signal and ω is the derived frequency of the oscillatory motion;

regenerating the STORI data based on a variation of the frequency of the oscillatory motion over time; and determining a charge state of the ion based on the regenerated STORI data.

2. The non-transitory computer-readable medium of claim 1, wherein regenerating the STORI data comprises:

determining a frequency correction as a function of time relative to the derived frequency; and regenerating the STORI data based on the derived frequency and the frequency correction.

3. The non-transitory computer-readable medium of claim 2, wherein the STORI data is regenerated in accordance with equations (1') and (2'):

$$STORI_{real}(t_n) = S(t_n) * \cos(\omega(t_n) * t_n) + STORI_{real}(t_{n-1}) \tag{1'}$$

$$STORI_{imag}(t_n) = -S(t_n) * \sin(\omega(t_n) * t_n) + STORI_{imag}(t_{n-1}) \tag{2'}$$

where $\omega(t_n)$ is a frequency of the oscillatory motion as a function of time determined based on the derived frequency and the frequency correction as a function of time.

4. The non-transitory computer-readable medium of claim 2, wherein the process further comprises determining, based on the derived frequency and the frequency correction, m/z of the ion at a particular time during acquisition of the time-varying signal.

5. The non-transitory computer-readable medium of claim 4, wherein the process further comprises determining a mass of the ion at the particular time based on the charge state of the ion and the m/z of the ion at the particular time.

6. The non-transitory computer-readable medium of claim 2, wherein the determining the frequency correction as a function of time comprises:

generating δSTORI data based on the STORI data, the δSTORI data representing a time derivative of the STORI data;

generating, based on the δSTORI data and in accordance with equation (4), δSTORI phase data representing variation of a δSTORI phase angle $\theta_{\delta STORI}$ over time:

$$\theta_{\delta STORI}(t_n) = \tan^{-1}\left(\frac{\delta STORI_{imag}(t_n)}{\delta STORI_{real}(t_n)}\right) \tag{4}$$

where $\delta STORI_{real}(t_n)$ is the time derivative of $STORI_{real}(t_n)$ and $\delta STORI_{imag}(t_n)$ is the time derivative of $STORI_{imag}(t_n)$; and determining the frequency correction as a function of time based on a slope of $\theta_{\delta STORI}(t_n)$ as a function of time.

7. The non-transitory computer-readable medium of claim 1, wherein the determining the charge state of the ion based on the regenerated STORI data comprises:

determining $STOR_{Imag}$ values versus time based on the regenerated STORI data in accordance with equation (3):

$$STORI_{mag}(t_n) = \sqrt{STORI_{real}(t_n)^2 + STORI_{imag}(t_n)^2}\text{; and} \tag{3}$$

determining the charge state of the ion based on a slope of $STORI_{mag}(t_n)$ and a relation between ion charge and the slope of $STORI_{mag}(t_n)$.

8. The non-transitory computer-readable medium of claim 7, wherein:

the process further comprises determining, based on the regenerated STORI data, a lifetime of the ion; and the determining the charge state of the ion is based on the slope of $STORI_{mag}(t_n)$ during the lifetime of the ion.

9. A system for determining a charge state of an ion, comprising:

one or more processors; and memory storing executable instructions that, when executed by the one or more processors, cause a computing device to perform a process comprising:

acquiring a time-varying signal representative of a current induced on a detector by oscillatory motion of an ion within a trapping region;

processing the time-varying signal to derive a frequency of the oscillatory motion;

generating, in accordance with equations (1) and (2), Selective Temporal Overview of Resonant Ion (STORI) data representing $STORI_{real}$ values versus time and $STORI_{imag}$ values versus time:

$$STORI_{real}(t_n) = S(t_n) * \cos(\omega * t_n) + STORI_{real}(t_{n-1}) \tag{1}$$

$$STORI_{imag}(t_n) = -S(t_n) * \sin(\omega * t_n) + STORI_{imag}(t_{n-1}) \tag{2}$$

where $S(t_n)$ is amplitude of the time-varying signal and o is the derived frequency of the oscillatory motion;

regenerating the STORI data based on a variation of the frequency of the oscillatory motion over time; and determining a charge state of the ion based on the regenerated STORI data.

10. The system of claim 9, wherein regenerating the STORI data comprises:

determining a frequency correction as a function of time relative to the derived frequency; and regenerating the STORI data based on the derived frequency and the frequency correction.

11. The system of claim 10, wherein the STORI data is regenerated in accordance with equations (1') and (2'):

$$STORI_{real}(t_n) = S(t_n) * \cos(\omega(t_n) * t_n) + STORI_{real}(t_{n-1}) \tag{1'}$$

$$STORI_{imag}(t_n) = -S(t_n) * \sin(\omega(t_n) * t_n) + STORI_{imag}(t_{n-1}) \tag{2'}$$

where $\omega(t_n)$ is a frequency of the oscillatory motion as a function of time determined based on the derived frequency and the frequency correction as a function of time.

12. The system of claim 10, wherein the process further comprises determining, based on the derived frequency and the frequency correction, m/z of the ion at a particular time during acquisition of the time-varying signal.

13. The system of claim 12, wherein the process further comprises determining a mass of the ion at the particular time based on the charge state of the ion and the m/z of the ion at the particular time.

14. The system of claim 10, wherein the determining the frequency correction as a function of time comprises:

generating δSTORI data based on the STORI data, the δSTORI data representing a time derivative of the STORI data;

generating, based on the δSTORI data and in accordance with equation (4), δSTORI phase data representing variation of a δSTORI phase angle $\theta_{\delta STORI}$ over time:

$$\theta_{\delta STORI}(t_n) = \tan^{-1}\left(\frac{\delta STORI_{imag}(t_n)}{\delta STORI_{real}(t_n)}\right) \tag{4}$$

where $\delta STORI_{real}(t_n)$ is the time derivative of $STORI_{real}(t_n)$ and $\delta STORI_{imag}(t_n)$ is the time derivative of $STORI_{imag}(t_n)$; and determining the frequency correction as a function of time based on a slope of $\theta_{\delta STORI}(t_n)$ as a function of time.

15. The system of claim 9, wherein the determining the charge state of the ion based on the regenerated STORI data comprises:

determining $STORI_{mag}$ values versus time based on the regenerated STORI data in accordance with equation (3):

$$STORI_{mag}(t_n) = \sqrt{STORI_{real}(t_n)^2 + STORI_{imag}(t_n)^2}; \tag{3}$$

and determining the charge state of the ion based on a slope of $STORI_{mag}(t_n)$ and a relation between ion charge and the slope of $STORI_{mag}(t_n)$.

16. The system of claim 15, wherein:

the process further comprises determining, based on the regenerated STORI data, a lifetime of the ion; and the determining the charge state of the ion is based on the slope of $STORI_{mag}(t_n)$ during the lifetime of the ion.

17. A system for performing charge detection mass spectrometry, the system comprising:

an ion trap mass analyzer that traps an ion within a trapping region and establishes a trapping field within the trapping region that causes the ion to undergo oscillatory motion; and a computing system configured to perform a process comprising:

acquiring a time-varying signal representative of a current induced on a detector by oscillatory motion of an ion within a trapping region;

processing the time-varying signal to derive a frequency of the oscillatory motion;

generating, in accordance with equations (1) and (2), Selective Temporal Overview of Resonant Ion (STORI) data representing $STORI_{real}$ values versus time and $STORI_{imag}$ values versus time:

$$STORI_{real}(t_n) = S(t_n) * \cos(\omega * t_n) + STORI_{real}(t_{n-1}) \tag{1}$$

$$STORI_{imag}(t_n) = -S(t_n) * \sin(\omega * t_n) + STORI_{imag}(t_{n-1}) \tag{2}$$

where $S(t_n)$ is amplitude of the time-varying signal and ω is the derived frequency of the oscillatory motion;

regenerating the STORI data based on a variation of the frequency of the oscillatory motion over time; and determining a charge state of the ion based on the regenerated STORI data.

18. The system of claim 17, wherein the ion trap mass analyzer comprises an orbital electrostatic ion trap mass analyzer.

19. A non-transitory computer-readable medium storing instructions that, when executed, direct at least one processor of a computing device for mass spectrometry to perform a process comprising:

acquiring a time-varying signal representative of a current induced on a detector by oscillatory motion of an ion within a trapping region;

processing the time-varying signal to derive a frequency of the oscillatory motion;

generating, in accordance with equation (8), Selective Temporal Overview of Resonant Ion (STORI) data representing $STORI_{mag}$ values versus time:

$$STORI_{mag}(t_n) = \sqrt{STORI_{real}(t_n)^2 + STORI_{imag}(t_n)^2} + STORI_{mag}(t_{n-1}) \tag{8}$$

where values of $STORI_{real}(t_n)$ and $STORI_{imag}(t_n)$ at time $t_n$ are determined in accordance with equations (6) and (7):

$$STORI_{real}(t_n) = S(t_n) * \cos(\omega * t_n) \tag{6}$$

$$STORI_{imag}(t_n) = -S(t_n) * \sin(\omega * t_n) \tag{7}$$

where $S(t_n)$ is amplitude of the time-varying signal and ω is the derived frequency of the oscillatory motion; and determining a charge state of the ion based on the STORI data.

20. The non-transitory computer-readable medium of claim 19, wherein the determining the charge state of the ion is based on a slope of $STORI_{mag}(t_n)$ and a relation between ion charge and the slope of $STORI_{mag}(t_n)$.

* * * * *